United States Patent [19]
Kusaka

[11] Patent Number: 5,519,202
[45] Date of Patent: May 21, 1996

[54] FOCUS DETECTING DEVICE HAVING LIGHT DISTRIBUTION DETECTION

[75] Inventor: Yosuke Kusaka, Yokohama, Japan

[73] Assignee: Nikon Corporation, Tokyo, Japan

[21] Appl. No.: 482,769

[22] Filed: Jun. 7, 1995

Related U.S. Application Data

[62] Division of Ser. No. 311,896, Sep. 26, 1994, which is a continuation of Ser. No. 225,913, Apr. 11, 1994, abandoned, which is a continuation of Ser. No. 129,576, Sep. 30, 1993, abandoned, which is a continuation of Ser. No. 32,176, Mar. 15, 1993, abandoned, which is a continuation of Ser. No. 951,317, Sep. 25, 1992, abandoned, which is a continuation of Ser. No. 837,106, Feb. 18, 1992, abandoned, which is a continuation of Ser. No. 641,431, Jan. 15, 1991, abandoned.

[30] Foreign Application Priority Data

Jan. 18, 1990 [JP] Japan ......................... 2-11066

[51] Int. Cl.⁶ ........................... G01B 9/04; G02B 21/00
[52] U.S. Cl. .......................... 250/201.8; 354/400
[58] Field of Search ......................... 250/201.8, 204; 354/400, 402–408, 430

[56] References Cited

U.S. PATENT DOCUMENTS

| | | | |
|---|---|---|---|
| 4,239,357 | 12/1980 | Iida | 354/25 |
| 4,553,817 | 11/1985 | Ando et al. | 350/255 |
| 4,780,738 | 10/1988 | Fukahori et al. | 354/400 |
| 4,812,868 | 3/1989 | Utagawa et al. | 354/402 |
| 4,864,344 | 9/1989 | Arakawa et al. | 354/400 |
| 4,943,824 | 7/1990 | Nabeshima et al. | 354/400 |
| 5,159,364 | 10/1992 | Yanagisawa et al. | 354/400 |

FOREIGN PATENT DOCUMENTS

| | | |
|---|---|---|
| 3415424 | 12/1984 | Germany. |
| 3611784 | 1/1987 | Germany. |

OTHER PUBLICATIONS

Patent Abstracts of Japan, vol. 7, No. 78 (P–188), 31 Mar. 1983.
Patent Abstracts of Japan, vol. 8, No. 171 (P–293), 8 Aug. 1984.

*Primary Examiner*—Stephone Allen
*Attorney, Agent, or Firm*—Shapiro and Shapiro

[57] ABSTRACT

A focus detecting device for use in a camera provided with; phototaking optical system forming an image of the object on a reference plane; focus detecting optical system separating, at least a pair of light beams passing through spatially different areas on a first predetermined plane axially spaced by a first distance from the reference plane, forming images of the object; photoelectric converting device composed of plural photosensor elements generating object image signals corresponding to the intensity distribution of the object images formed by the focus detecting optical system; phototaking optical system information device generating information on the shape of exit pupil at fully-open diaphragm of the phototaking optical system and a second distance from the reference plane to the exit pupil; focus detecting optical system information device generating information on the form of the areas on the first predetermined plane and the first distance; light amount distribution detecting device determining the decrease in light amount on the plane of photosensor elements of the photoelectric converting device as light amount information relating to the position on the plane of photosensor elements, encountered when the phototaking optical system and the focus detecting optical system are combined, based upon information from the phototaking optical system information device and the focus detecting optical system information device; and focus detection calculation device effecting a process on the object image signals based on the light amount distribution information, thereby determining the defocus amount of the current object image plane relative to the reference plane.

4 Claims, 32 Drawing Sheets

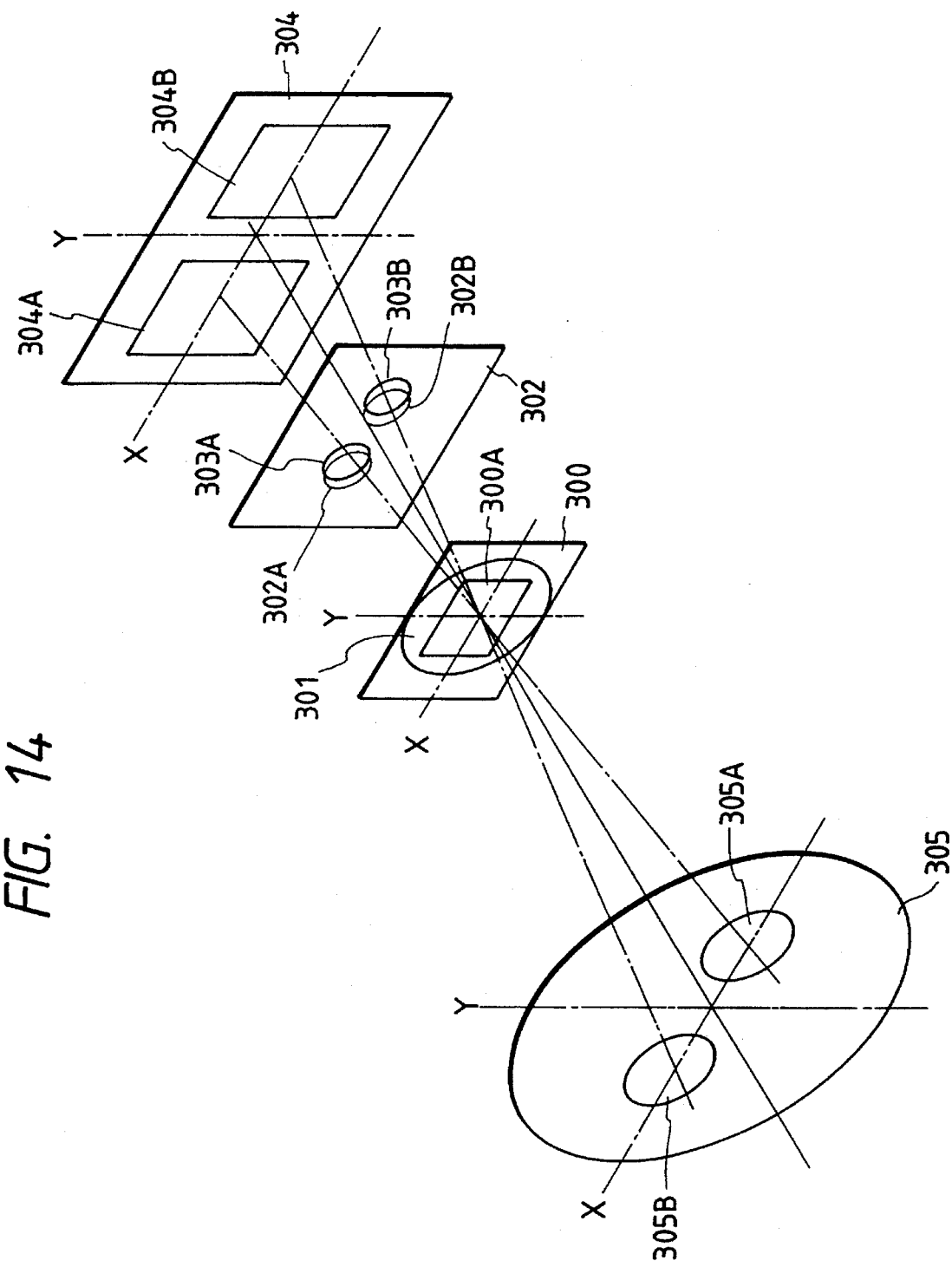

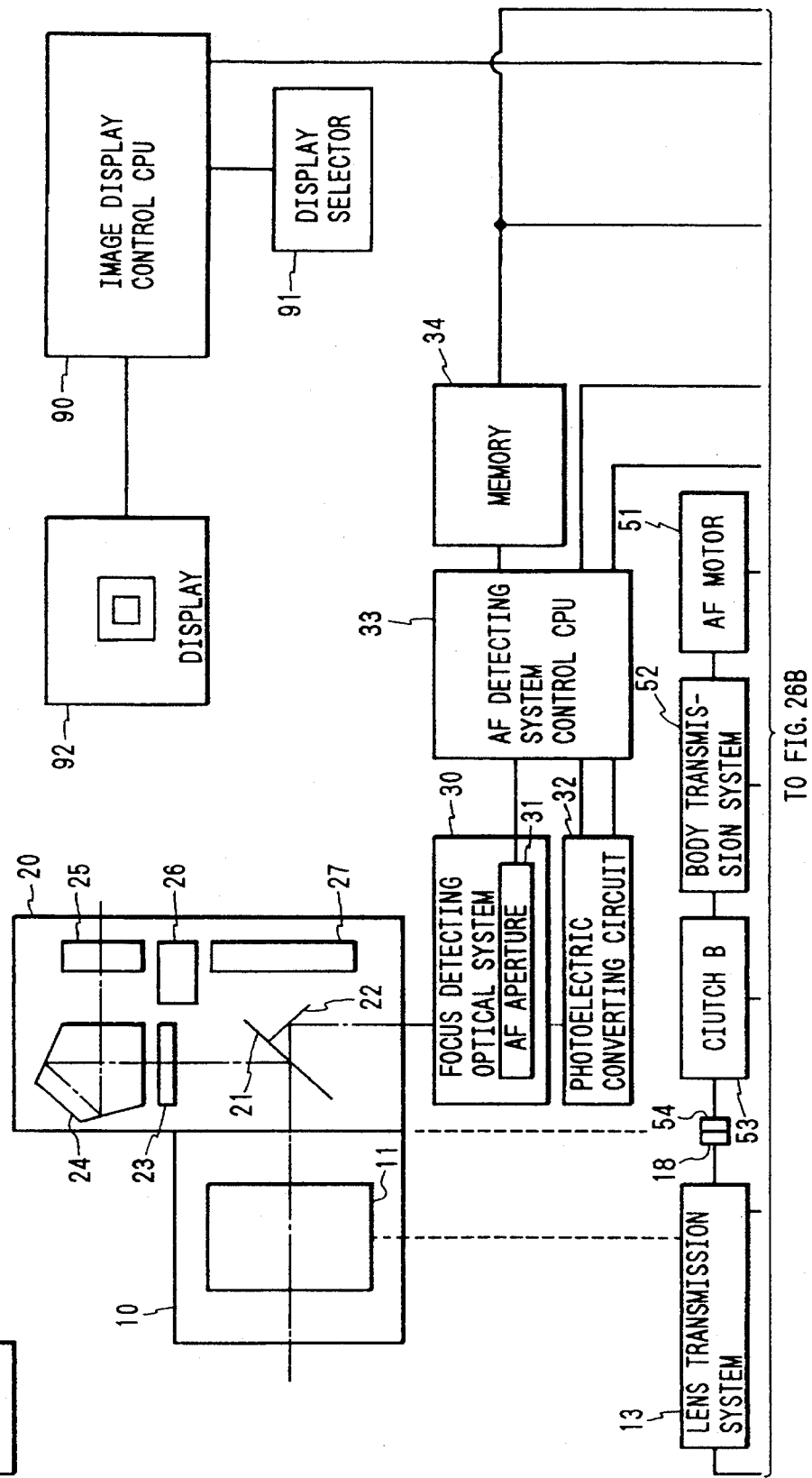

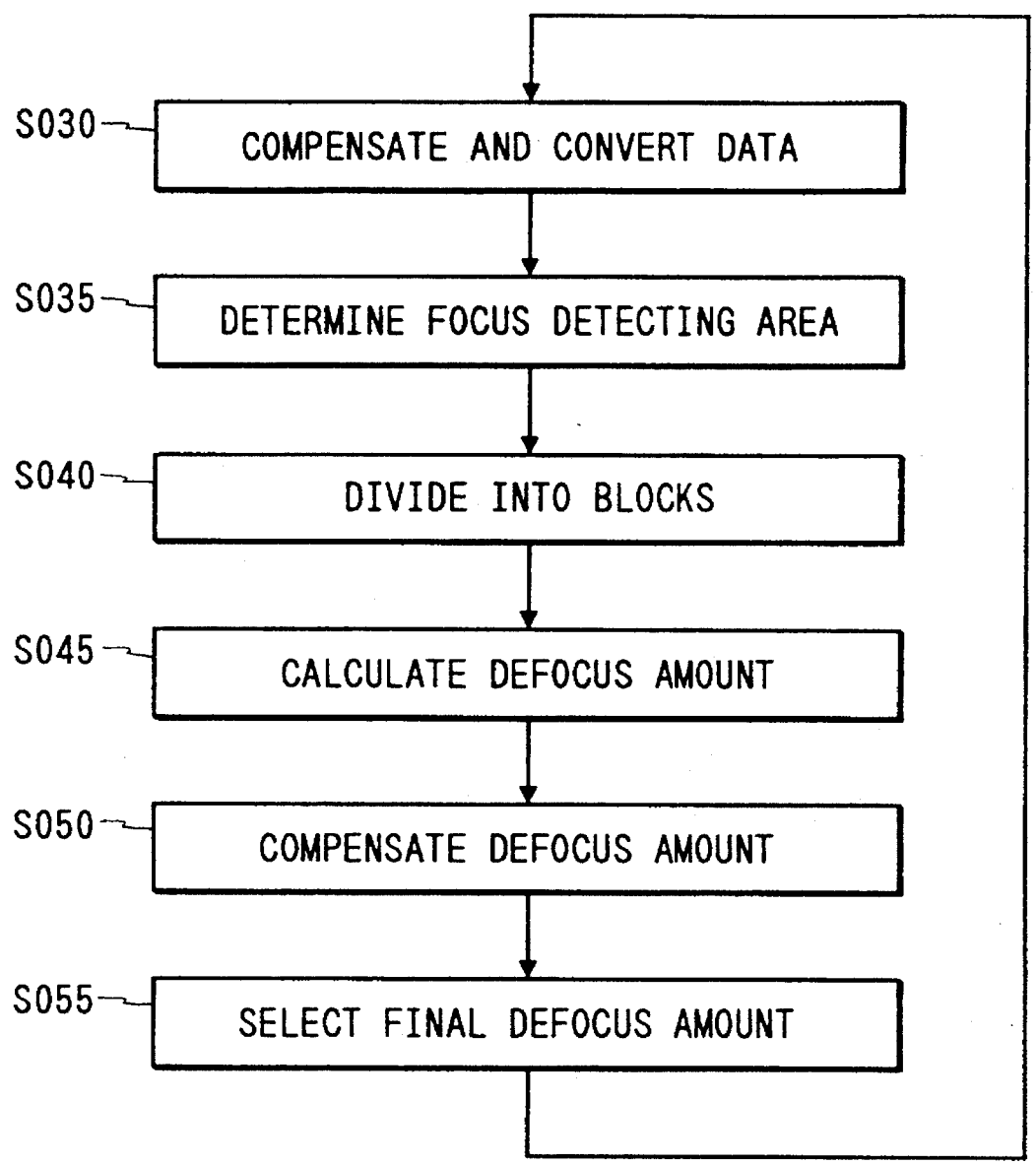

|  | IN-FOCUS DISPLAY | OUT OF FOCUS DISPLAY |
|---|---|---|
| FIG. 40A | 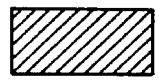 |  DISTANCE METERING AREA |
| FIG. 40B | 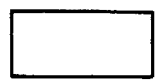 |  |
| FIG. 40C |  | 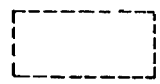 |
| FIG. 40D | 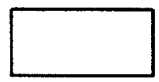 |  |
| FIG. 40E |  |  |
| FIG. 40F | 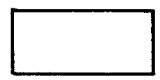 | 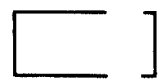 |

FIG. 45
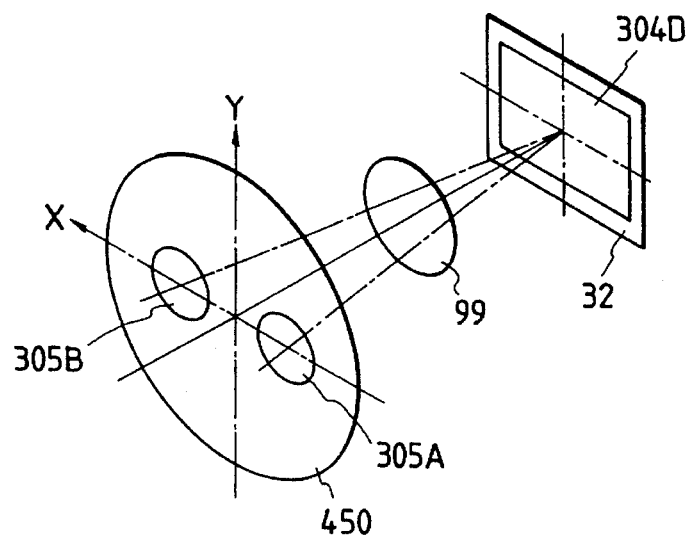
FIG. 46A        FIG. 46B        FIG. 46C
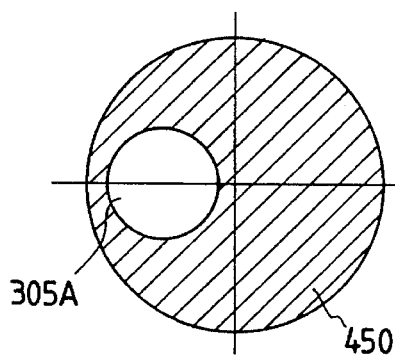 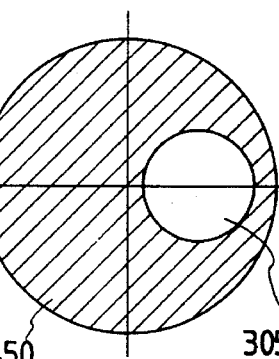 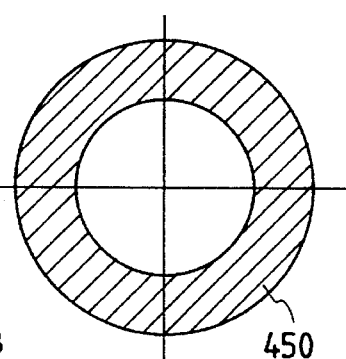

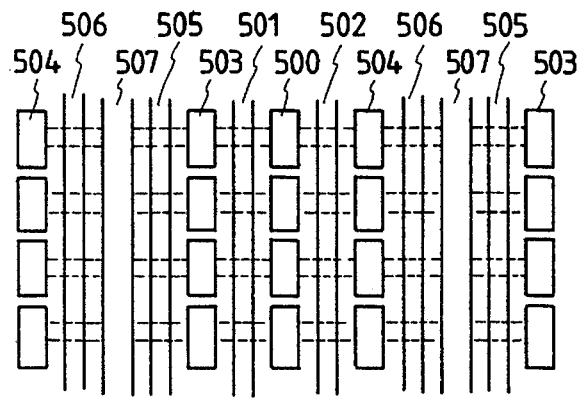
FIG. 47A
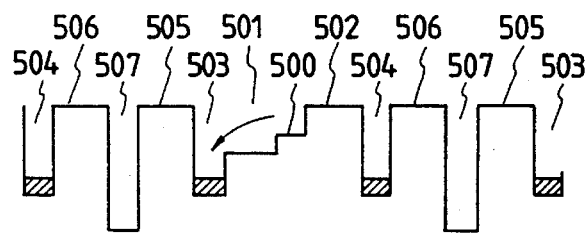
FIG. 47B
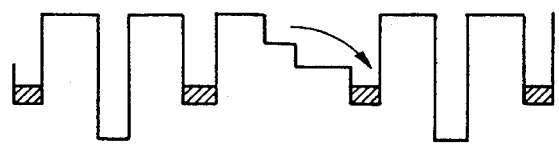
FIG. 47C
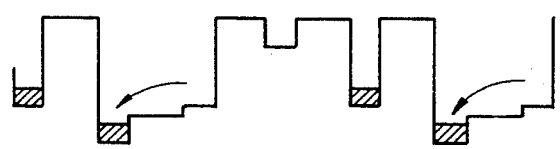
FIG. 47D
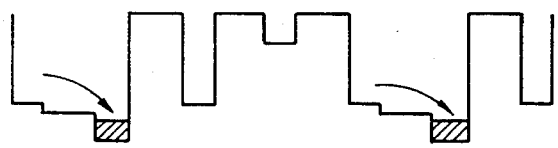
FIG. 47E
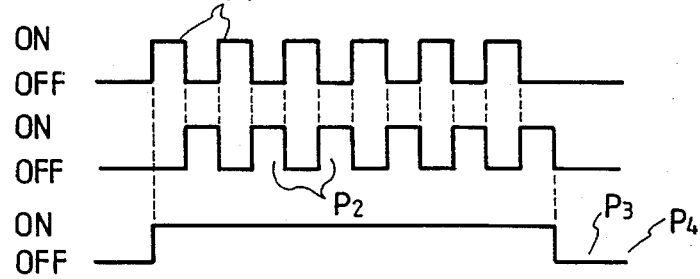
FIG. 48A
FIG. 48B
FIG. 48C

FOCUS DETECTING DEVICE HAVING LIGHT DISTRIBUTION DETECTION

This is a division of application Ser. No. 08/311,896 filed Sep. 26, 1994, which is a continuation of application Ser. No. 08/225,913 filed Apr. 11, 1994 (abandoned), which is a continuation of application Ser. No. 08/129,576 filed Sep. 30, 1993 (abandoned), which is a continuation of application Ser. No. 08/032,176 filed Mar. 15, 1993 (abandoned), which is a continuation of application Ser. No. 07/951,317 filed Sep. 25, 1992 (abandoned), which is a continuation of application Ser. No. 07/837,106 filed Feb. 18, 1992 (abandoned), which is a continuation of application Ser. No. 07/641,431 filed Jan. 15, 1991 (abandoned).

BACKGROUND OF THE INVENTION

1. Field of the Invention

The present invention relates to a focus detecting device for use in a camera or the like.

2. Related Background Art

There is already known a focus detecting device disclosed in the U.S. patent application Ser. No. 457,408 filed Dec. 26, 1989 by the present applicant. Said device is based on a principle of forming a pair of images of an object on a photoelectric converting device from a pair of light beams passing through a phototaking optical system by means of a focus detecting optical system of so-called split pupil type, obtaining image signals of said object by photoelectric conversion of said images by said photoelectric converting device, and edetermined calculation on said image signals thereby determining the defocus amount of the phototaking optical system.

However, in such focus detecting device of split pupil system, a certain combination of the phototaking optical system and the focus detecting optical system gives rise to a vignetting of the light beams used for focus detection, and, such vignetting, if not uniform, undesirably affects the precision of focus detection and may render the focus detecting operation totally impossible in the worst case.

In the following there will be explained the cause of such vignetting, with reference to FIG. 1.

FIG. 1 illustrates a focus detecting optical system of so-called split pupil system, disclosed in the U.S. patent application Ser. No. 457,408 of the present applicant. Said optical system is composed of a field mask 300 positioned at the primary image plane of the phototaking optical system and provided with an aperture 300A for defining the area of focus detection in the object field, a field lend 301 positioned behind said field mask; re-imaging lenses 303A, 303B, 303C, 303D arranged in two pairs for re-imaging the images of an object on a secondary image plane; and a diaphragm mask 302 positioned in front of said re-imaging lenses and provided with four apertures 302A, 302B, 302C, 302D for limiting the light beams entering said re-imaging lenses. Thus re-focused object images are respectively projected onto photosensor units (for example CCD image sensors) 304A, 304B, 304C, 304D of the photoelectric converting device 304 positioned at the secondary image plane, whereby object image signals corresponding to the light intensity distributions of the object images are generated from said photosensor units.

In the above-explained structure, the forms of four apertures 302A, 302B, 302C, 302D are projected by the field lens 301 onto a pupil plane 305 (hereinafter also called a focus detecting pupil) positioned at a predetermined distance d0 from the primary image plane, wherein the projected forms respectively constitute pupil areas 305A, 305B, 305C, 305D (hereinafter also called focus detecting pupil diaphragms). Consequently the object images re-focused on the secondary image plane are solely formed by the light beams passing through said pupil areas 305A, 305B, 305C and 305D.

FIG. 2 is a cross-sectional view, along a plane containing the X- and Z-axes, of the focus detecting optical system shown in FIG. 1.

The rays passing through the pupil area 305A or 305B and concentrated between end points A and C in the X-direction of the aperture 300A of the field mask 300 have always to pass through an area between hatched portions (said area being defined inside lines A–F and C–H from the primary image plane to the pupil plane 305 at a distance d0 therefrom, and inside extensions of lines C–F and A–H beyond said pupil plane 305, wherein F and H are external end points in the X-direction of the pupil areas 305A, 305B). Consequently if the phototaking optical system has a relatively small F-number so that the external end points of the exit pupil thereof are positioned in the hatched portions, the light beams used for focus detection do not cause vignetting and do not have undesirable effect on the focus detection. However, if the F-number becomes larger so that the external end points of the exit pupil are positioned in the internal area, said light beams show vignetting which undesirably affects the focus detection.

The influence of vignetting on the focus detection depends also on the pupil position as well as the size of the exit pupil 101. For example, if the apertures 302A, 302B of the diaphragm mask 302 are shaped like cat's eyes, the pupil areas 305A, 305B on the pupil plane 305 are shaped as shown in FIG. 3. Consequently, the rays which are concentrated on all the points of the aperture 300A of the field mask 300 and then pass through the apertures 302A, 302B should have passed the pupil areas 305A, 305B on the pupil plane 305. Thus, if the exit pupil 101 of the phototaking optical system is positioned at the pupil plane 305, the rays passing through the different points of the aperture 300A and falling onto the photoelectric converting device 304 are subjected to uniform vignetting even in the presence of vignetting. Therefore the vignetting does not cause any undesirable influence but merely results in a uniform loss in the light intensity received by the photosensor units of the photoelectric converting device 304.

However, in any other plane than the pupil plane 305, the rays passing through the different points of the aperture 300A of the field mask 300 and falling onto the photoelectric converting device 304 pass through spatially different areas. For example, light beams which are concentrated on points A, B and C of the aperture 300A shown in FIG. 1 and then pass through the aperture 302B of the diaphragm mask 302, pass through respectively different areas 306A, 306B and 306C shown in FIG. 4 on a plane at a position d1 different from that of the pupil plane 305. Consequently, in case of vignetting when the exit pupil 101 of the phototaking optical system is not positioned on the pupil plane 105, the amounts of vignetting on the light beams passing through different points of the aperture 300A and falling on the photoelectric converting device 304 are not uniform, thus resulting in different losses of light intensity depending on the locations on the photosensor units of the photoelectric converting device 304 and undesirably affecting the focus detection.

FIGS. 5A, 5B, 5C and 5D illustrate the states of such vignetting. In FIGS. 5B, 5C and 5D, points A', B', C', D', E', A", B", C", D" and E" correspond to the points A, B, C, D and E of the aperture 300A shown in FIG. 5A after refocusing by the lenses 303A, 303B.

FIGS. 5B and 5C show the vignetting in the image of the aperture 300A re-focused by the lenses 303A, 303B. For an object with uniform luminocity, the vignetting does not appear in an area inside the solid line (an area including the point A for the image formed by the re-focusing lens 303A; and an area including the point C for the image formed by the lens 303B), so that the amount of light is 100%. However the vignetting occurs in such a way that the amount of light is reduced to 90–100% in an area between the solid line and the broken line, and is reduced below 90% outside the broken line. When the images formed by the lenses 303A, 303B are superposed, the vignetting-free areas do not overlap each other as shown in FIG. 5D, and exact focus detection becomes impossible because two images to be compared for the focus detection do not coincide each other.

For the above-mentioned drawback, there have been proposed following countermeasures.

For example, in a focus detecting device disclosed in the Japanese Laid-open Patent Sho 55- 111927, the above-mentioned drawback is resolved by the use of two focus detecting systems with different F-numbers and by selecting a focus detecting system free from the vignetting, according to the F-number of the phototaking optical system. The F-number for focus detection is determined by the size of a circumscribed circle including the pupil areas 305A, 305B, 305C and 305D on the pupil plane 305 shown in FIG. 1 and the position d0 of said pupil plane.

Also in a focus detecting device disclosed in the U.S. Pat. No. 4,687,917 of the present applicant, the above-explained drawback is resolved by detecting the vignetting state of the focus detecting light beams from the output status of the focus detecting photoelectric converting device, and, in the presence of vignetting, eliminating the low frequency components from the output of the photoelectric converting device, thereby alleviating the influence of said vignetting prior to the calculation for focus detection.

Also in a focus detecting device disclosed in the U.S. Pat. No. 4,816,663 of the present applicant, the above-mentioned drawback is resolved by calculating the amount of vignetting from the F-number of the exit pupil of the phototaking optical system and the positional information of said exit pupil, and effecting the calculation for focus detection so as to reduce the influence of the vignetting according to thus calculated amount of vignetting.

However, such conventional focus detecting devices have been associated with considerable errors in the calculation of loss in the amount of light, because the losses in peripheral light in the phototaking optical system and in the focus detecting optical system are not included in the loss of light resulting from vignetting. For this reason 10 switching of focus detecting calculation process according to the loss of light amount cannot be conducted in exact manner. It has also been difficult to use the output of photoelectric conversion for the focus detection after the correction for loss of light amount, or to use a portion of said output free from loss in light amount. This drawback has become more serious with the recent expansion of the focus detecting area with respect to the photographing image area, as the losses in the peripheral light amount in the phototaking optical system and in the focus detecting optical system are no longer negligible.

SUMMARY OF THE INVENTION

The object of the present invention is to prevent the deterioration in the accuracy of focus detection resulting from the losses in the peripheral light amount in the phototaking optical system and in the focus detecting optical system.

Referring to FIG. 6, the focus detecting device of the present invention is provided with a phototaking optical system 1 for forming the image of an object on a reference plane; a focus detecting optical system 2 for separating, from the light beams passing through said phototaking optical system 1, at least a pair of light beams passing through spatially different areas on a first predetermined plane axially spaced by a first distance from said reference plane; a photoelectric converting device 3 consisting of plural photosensor elements and adapted to generate object image signals corresponding to the light intensity distribution of the image of the object, an information generating device 4 for the phototaking optical system, for generating information on the F-number of the exit pupil at the fully-open diaphragm aperture of the phototaking optical system 1, a second distance from said reference plane to the exit pupil, and the loss in the light amount in the peripheral area of the phototaking optical system 1; an information generating device 5 for the focus detecting optical system, for generating information on the size of said areas on said first predetermined plane, said first distance, and the loss in the light amount in the peripheral area of the focus detecting optical system 2; a light amount distribution detecting device 6 for determining the light amount distribution information representing the loss in the light amount on the photosensor elements of the photoelectric converting device 3 as a function of position on the photosensor elements, resulting from the loss in peripheral light amount and the aforementioned vignetting of the focus detecting light beams in the combination of the phototaking optical system 1 and the focus detecting optical system 2, based on the information supplied from said information generating devices 4, 5, and a focus detecting calculating device 7 for detecting the defocus amount of the current object image plane with respect to the reference plane, by applying a process according to the light amount distribution information to the object image signals.

The above-mentioned information generating device 4 for the phototaking optical system may be so designed to further generate information on the shape and position of the aperture portion of lens barrel (for example lens holding ring and hood), that may further limit the phototaking light beams in addition to the diaphragm, and such information may be utilized in the detecting device 6 for determining the light amount distribution on the photosensor elements of the photoelectric converting device 3 when the phototaking optical system 1 is combined with the focus detecting optical system 2.

The loss in the light amount in case the phototaking optical system 1 and the focus detecting optical system 2 are mutually combined is calculated as the light amount distribution information, based on the information of the phototaking system and of the focus detecting system. The object image signals generated by the photoelectric converting device 3 are processed according to said distribution information, and the focus detecting calculation is conducted by the image signals after said processing. Consequently, even in case the focus detecting optical system 2 is combined with various phototaking optical systems 1, the overall loss in the light amount, including the loss by the vignetting in the focus detecting light beams and the loss in peripheral light beams in the optical systems, can be exactly calculated.

The processing of the object image signals according to the light amount distribution information may be, for example, elimination of an image signal showing significant light amount loss, correction of the image signals according to the light amount loss, or elimination of low frequency components from the image signals in case of significant light amount loss.

BRIEF DESCRIPTION OF THE DRAWINGS

FIGS. 14 to 16 are perspective views showing structures of the focus detecting optical system;

FIG. 27 is a flow chart of the control sequence of an AF calculating CPU;

FIGS. 40A to 40F are views showing displays indicating focus detection states;

FIG. 45 is a perspective view of the focus detecting optical system only;

FIGS. 46A to 46C are views showing change in the form of a physical diaphragm;

FIG. 47A is a view showing the structure of photosensor units of the photoelectric converting device;

FIGS. 47B to 47E are schematic views showing concepts of potentials of the photosensor unit in the photoelectric converting device; and FIGS. 48A to 48C are timing charts showing function of the focus detecting device.

DESCRIPTION OF THE PREFERRED EMBODIMENTS

Figure 7:
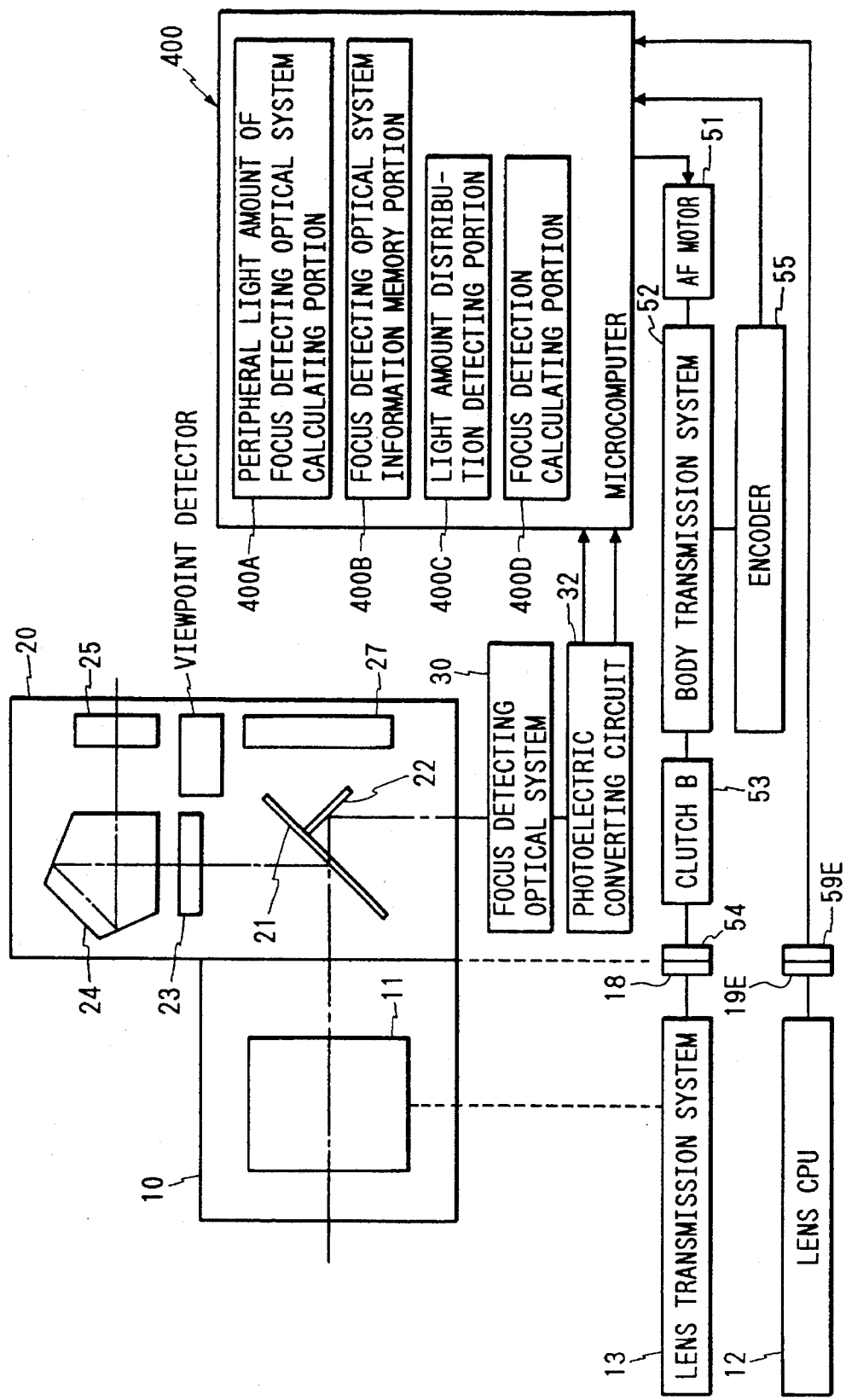
FIG. 7 is a block diagram of an embodiment of the focus detecting device of the present invention.

FIG. 7 is a block diagram showing the entire structure of a single-lens reflex camera equipped with a focus detecting device of the present invention.

Referring to FIG. 7, an interchangeable lens 10 is detachably mountable on a camera body 20. In the mounted state of the lens 10, a phototaking light beam coming from an object is transmitted by a phototaking lens 11, then partly reflected by a main mirror 21 provided in the camera body 20 toward a finder, and is further transmitted by a focusing screen 23, a pentagonal prism 24 and an eyepiece lens 25 whereby an image formed on the focusing screen is observed by the photographer. The remaining part of the light beam is transmitted by the main mirror 21, then reflected by a sub mirror 22 and guided as a focus detecting light beam to a focus detecting optical system 30.

Figure 1:
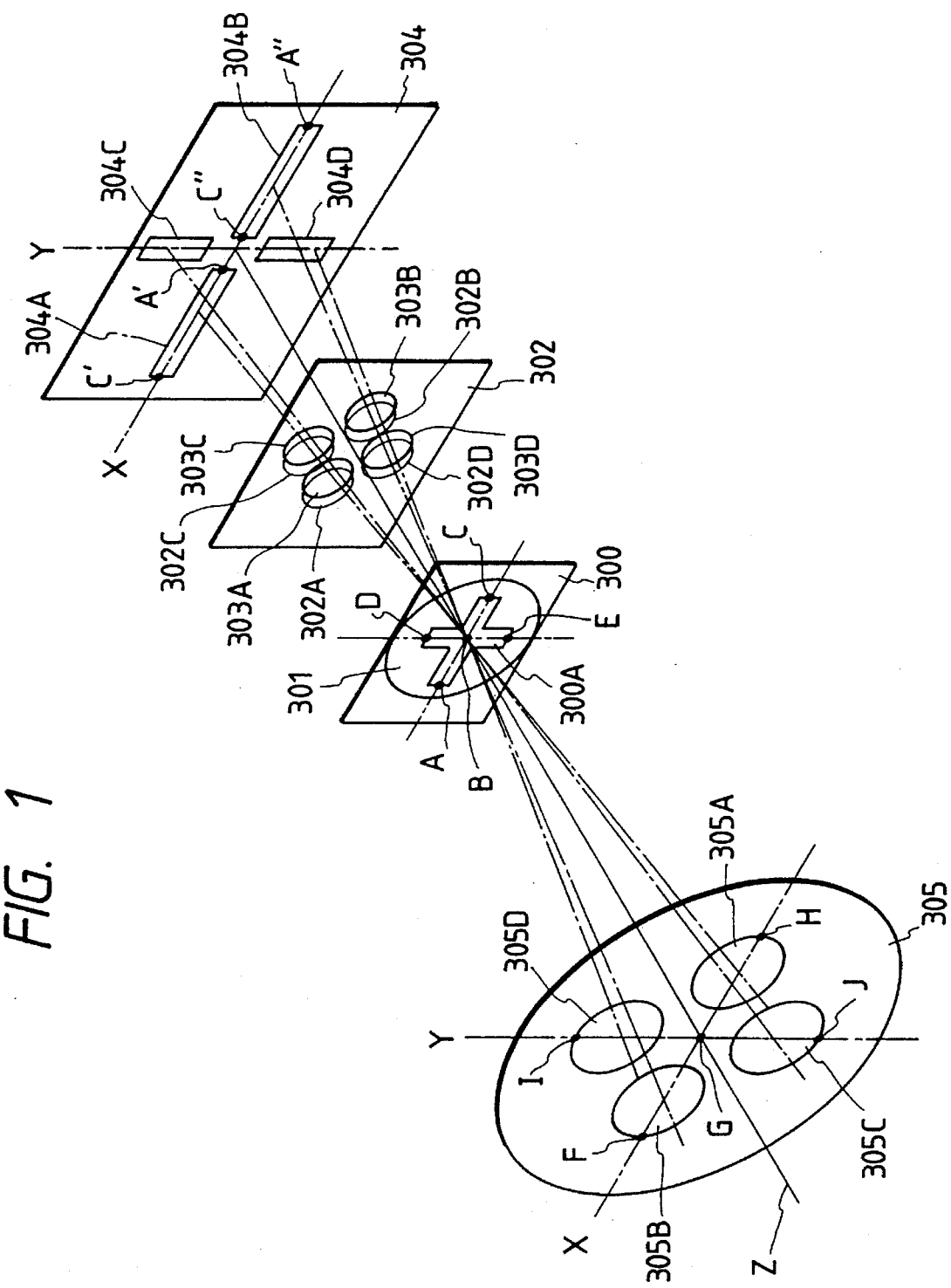
FIG. 1 is a schematic perspective view of a focus detecting optical system.

Said focus detecting optical system 30 can be constructed, for example, as shown in FIG. 1, wherein an object image focused by the phototaking lens 11 is re-focused on photosensor elements of a photoelectric converting device 32. The light-receiving face of the photosensor elements constitutes a focus detecting plane (conjugate with the film) of the focus detecting optical system 30. Thus the photosensor elements of the photoelectric converting circuit 32 effect photoelectric conversion on the object image re-focused by the focus detecting optical system 30 thereby generating object image signals.

Said image signals are supplied to a microcomputer 400 of the camera body, for use in various calculations to be explained later. Functionally, the microcomputer 400 is equipped with a portion 400A for calculating the peripheral light amount of the focus detecting optical system; a memory portion 400B for information on the focus detecting optical system; a light amount distribution detecting portion 400C; and a focus detecting calculating portion 400D, of which details will be explained later. there are also provided known internal mechanisms of camera, such as a shutter device 27 and an unrepresented film advancing mechanism.

An auto focusing (AF) motor 51 is driven according to the defocus amount calculated by the microcomputer 400, and axially moves a focusing lens of the phototaking lens 11, through a body transmission system 52, a clutch 53, couplings 54, 18 and a lens transmission system 13. An encoder 55 detects the number of rotations of the AF motor 51 and enters it into the microcomputer 400.

Figure 2:
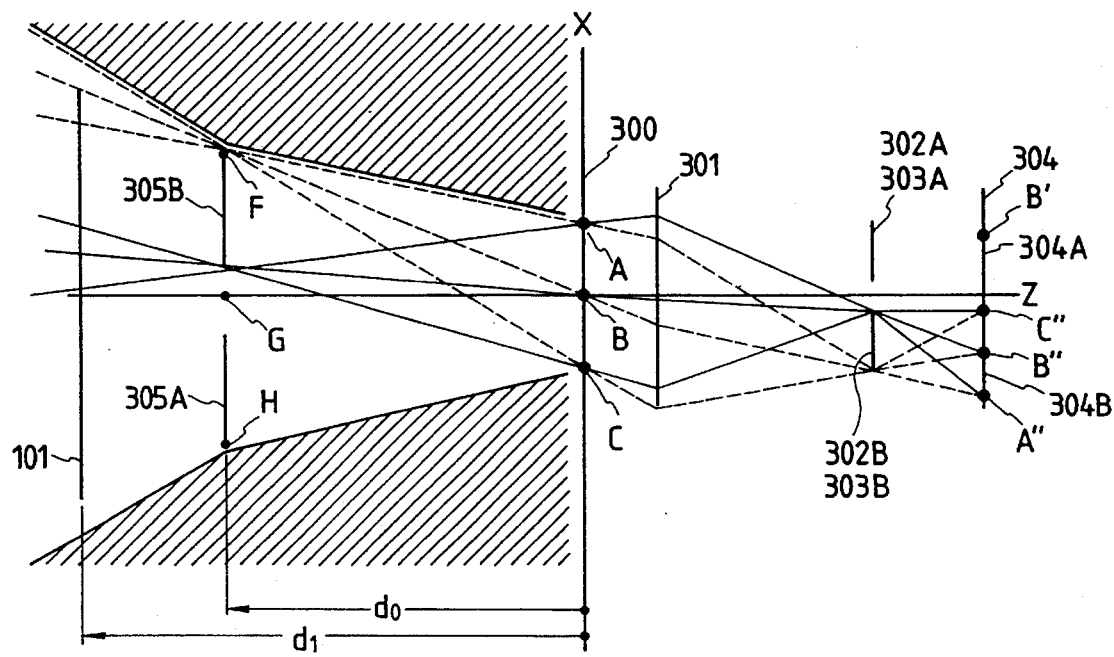
FIG. 2 is a cross-sectional view, along a plane including X- and Z-axes, of the focus detecting optical system shown in FIG. 1.

A lens CPU 12 generates information on the peripheral light amount of the phototaking lens 11, the F-number f0 of the exit pupil at the fully-open diagrams aperture, and the position of the exit pupil (d1 in FIG. 2) with respect to the film plane, and enters said information into the microcomputer 400 through couplings 59E, 19E. When said information varies by the focusing or zooming of the phototaking lens 11, the lens CPU 12 detects the focusing and zooming positions and varies said information according to the detected focusing and zooming positions.

Figure 8:
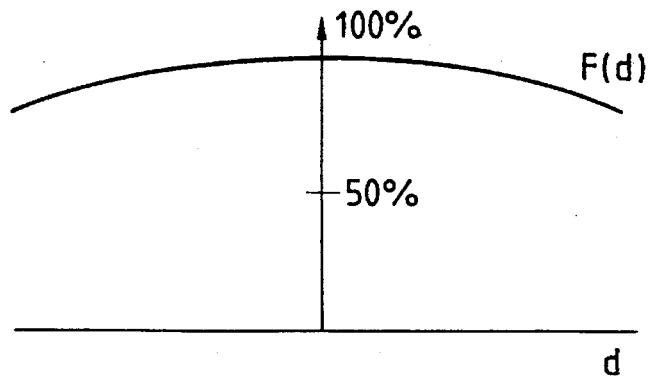
FIG. 8 is a chart showing information on the peripheral light amount of a phototaking lens 11 as a function F(d) of the distance d from the optical axis on the image plane.

The information on the peripheral light amount of the phototaking lens 11 is given as shown in FIG. 8, by a function F(d) of the distance d from the optical axis on the image plane. The information on the peripheral light amount can be generated by defining coefficients $a_0, \ldots a_n$ of the following polynomial approximation of d:

$$F(d) = a_0 \times d^0 + a_1 \times d^1 + a_2 \times d^2 + \ldots + a_n \times d^n \quad (1).$$

If the phototaking lens 11 has the exit pupil of a special shape, the lens CPU 12 generates information on the shape and position of the diaphragm instead of the F-number. For example, in case of a reflex lens, the lens CPU generates information on the circumscribed F-number and inscribed F-number of the diaphragm and the pupil positions thereof.

Figure 3:
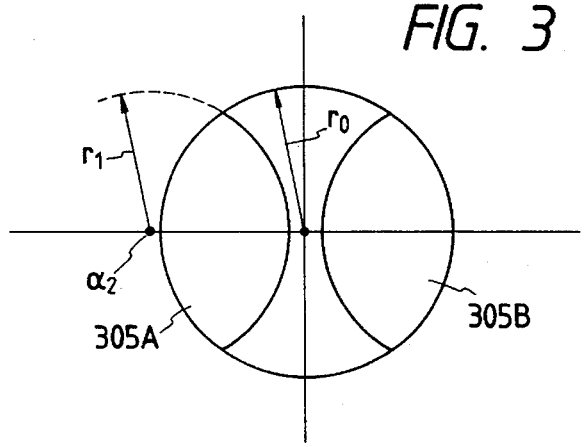
FIG. 3 is a view of pupil areas formed on a pupil plane.
Figure 4:
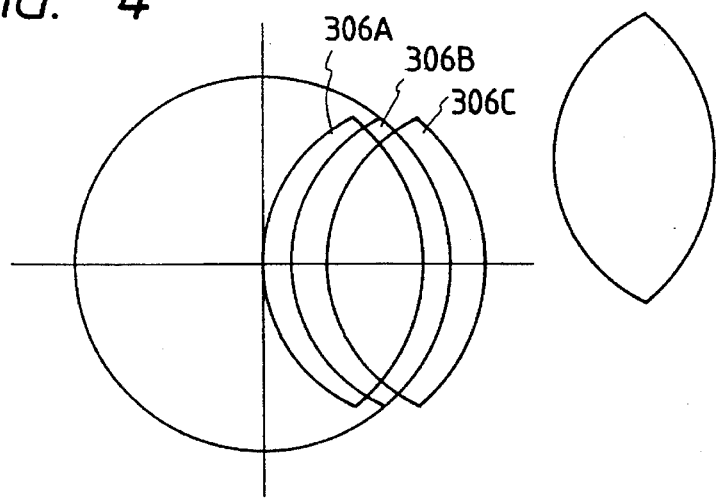
FIG. 4 is a view showing, on a plane at a position d1 different from that of the pupil plane 305, the passing areas of light beams which are respectively concentrated on points A, B and C of the aperture 300A in FIG. 1 and then pass through the aperture 302B of the diaphragm mask 302.

The memory portion 400B for the information of focus detecting optical system stores in advance information on the peripheral light amount of the focus detecting optical system 30, pupil position (d0 in FIG. 2) for focus detection, and shape and position of pupil diaphragm for focus detection. For example, in case of focus detecting pupil diaphragm 305A shown in FIG. 3, the information on the shape and position of the focus detecting pupil diaphragm are external radius r0, internal radius r1 and center d2 of the internal radius r1.

The peripheral light amount calculating portion 400A for the focus detecting optical system 30 converts the peripheral light amount on a plane of the photosensor elements of the photoelectric converting circuit 32 into the position of the photographed image plane, in a form similar to the information on the peripheral light amount of the phototaking lens 11. However, since the focus detecting optical system 30 is eccentric, the information on peripheral light amount is not point symmetric with respect to the center, as in the equation (1). In such case, the peripheral light amount can be represented by the following equation (2), utilizing two-dimensional axes X, Y with centers at points corresponding to the optical axis (for example B', B" in FIG. 2):

$$Ga(x, y) = Ha(x) \cdot Ia(y)$$

$$Ha(x) = b_0 \times x^0 + b_1 \times x^1 + \ldots + b_n \times x^n$$

$$Ia(y) = c_0 \times y^0 + c_1 \times y^1 + \ldots + c_n \times y^n \quad (2)$$

When there are provided two pairs of focus detecting optical systems 30 as shown in FIG. 1, the peripheral light amount information Ga(x, y), Gb(x, y), Gc(x, y) and Gd(x, y) are required for the respective separator lenses 303A, 303B, 303C and 303D, but, if the lenses 303A and 303B, and 303C and 303D, are symmetrical with respect to the optical axis, the amount of information can be compressed since Gb(x, y)=Ga(−x, y) and Gd(x, y)=Gc(x, −y). Also the peripheral light amount information may be represented by the light amount in each of small cells (x, y) into which the photoelectric converting plane is divided. Also the peripheral light amount information of the focus detecting optical system may be determined by the output of the photosensor elements in a state in which an object of uniform luminocity is focused on the focus detecting plane (conjuagate with the film) of the focus detecting optical system, or by the design data of the optical system.

The light amount distribution detecting portion 400C detects the distribution of light amount on the photosensor elements, for an object of uniform luminocity, based on the information from the lens CPU 12 and the peripheral light amount calculating portion 400A. Said distribution is determined for each image formed by the focus detecting optical system 30. For example, in case of the optical system shown in FIG. 1, the light amount distribution is determined for each of the four lenses 303A, 303B, 303C and 303D.

Calculation of the light amount distribution will be explained in the following.

Figure 9:
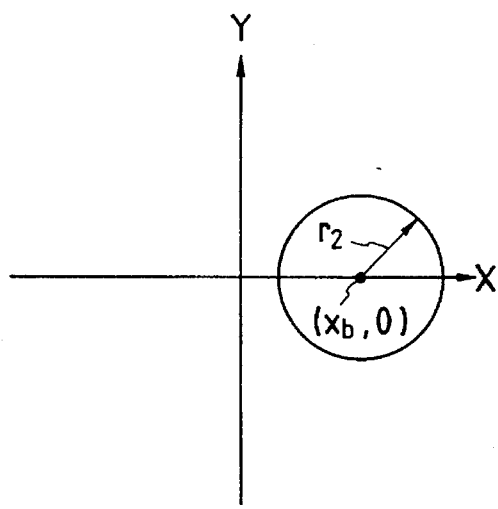
FIG. 9 is a view showing the form of a focus detecting pupil diaphragm on a focus detecting pupil plane.

The light amount distribution for example of the re-focusing lens 303B is determined in the following manner, in case the phototaking lens 11 has the exit pupil at d1, a fully-open F-number f0 and a peripheral light amount information F(x, y); and the focus detecting optical system 30 has a structure shown in FIG. 1 with the focus detecting pupil at d0, the focus detecting pupil diaphragm of circular shape with a radius r2 and the center at (xb, 0) on the focus detecting pupil plane as shown in FIG. 9 and with the peripheral light amount information Gb(x, y).

Figure 10:
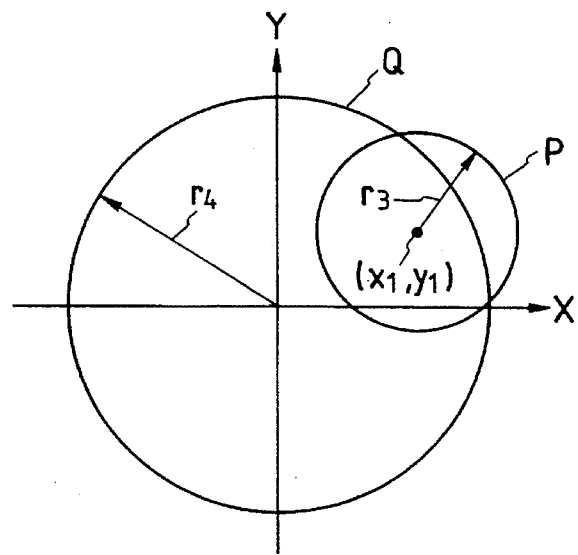
FIG. 10 is a view showing a circle formed on the exit pupil plane of the phototaking lens 11 by a light beam passing through a coordinate $(x_0, y^0)$ of the aperture 300A and the re-focusing lens 303B.

A light beam passing through a point (x0, y0) of the aperture 300A and the re-focusing lens 303B forms, on the exit pupil plane of the phototaking lens 11, a circle P with a radius r3 and with the center at (x1, y1) as shown in FIG. 10. On the other hand, the exit pupil of the phototaking lens 11 on the pupil plane forms a circle Q with a radius r4 and with the center at (0, 0). Consequently the vignetting information Jb(x0, y0) of the light beam passing through the coordinate (x0, y0) and the lens 303B is given by dividing the common area A1 of the circles P and Q with the area A2 of the circle P:

$$Jb(x, y)=A1/A2$$

$$x1=x0+(xb-x0)\cdot d1/d0$$

$$y1=y0-y0\cdot d1/d0$$

$$r3=r2\cdot d1/d0$$

$$r4=d1/(2f0) \quad (3)$$

Thus the vignetting information $Jb(x, y)$ can be determined for any arbitrary coordinate $(x, y)$. Consequently the final light amount distribution information $Kb(x, y)$ can be represented as (4):

$$Kb(x, y)=F(x, y)\cdot Gb(x, y)\cdot Jb(x, y) \quad (4)$$

Figure 11A:
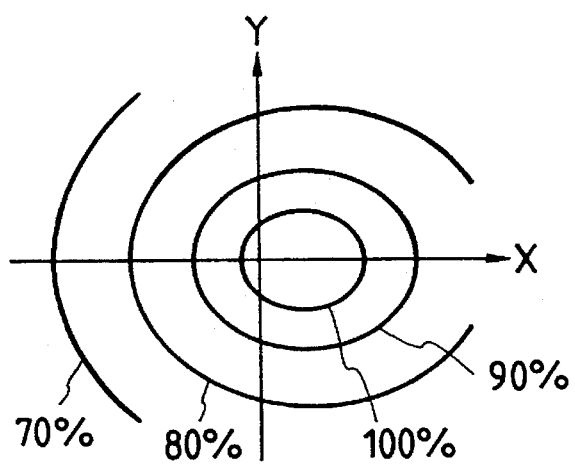
FIGS. 11A and 11B are charts showing the behavior of the light amount distribution information Ka(x, y)
Figure 11B:
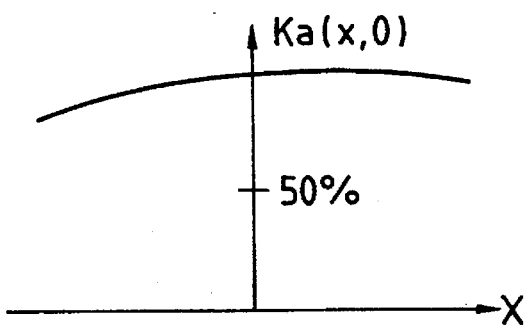

Similarly the vignetting information $Ja(x, y)$, $Jc(x, y)$ and $Jd(x, y)$ for the lenses 303A, 303C and 303D can be determined in a similar manner, and the light amount distribution information $Ka(x, y)$, $Kc(x, y)$ and $Kd(x, y)$ can be obtained based on other peripheral light amount information $Ga(x, y)$, $Gc(x, y)$ and $Gd(x, y)$ of the focus detecting optical system 30. FIGS. 11A and 11B illustrate the behavior of the light amount distribution information $Ka(x, y)$.

The focus detection calculating portion 400D detects the defocus amount between the current image plane of the phototaking lens 11 and the film plane, by applying a known focus detecting calculation on the object image signals released by the photoelectric converting circuit 32.

The defocus amount can be determined in the following manner, for example for a focus detecting optical system 30 shown in FIG. 1 and for data ap, bp (p=1–n) and cq, dq (m=1–m) obtained by A/D conversion from the image signals of the photosensor elements 304A, 304B, 304C, 304D of the photoelectric converting device 304.

For the purpose of simplicity, the following explanation on the correlation calculation is only given on the output data ap, bp, but a same process is applied also to the data cq, dq. At first a correlation amount $C(L)$ is determined from the output data ap, bp by a correlation calculation shown by the following equation (5):

$$C(L) = \sum_i |a(i+L) - b(i)| \quad (5)$$

wherein L is an integer, indicating the amount of relative shift of paired output data of the photosensor elements, represented by the pitch of arrangement of photosensor cells. Also in the summation of the equation (5), the range of the parameter i is suitably determined according to the shift amount L and the data number n.

The calculation of the equation (5) provides a minimum correlation $C(L)$ at a shift amount $L=kJ$ where the correlation is highest. Then a minimum value $C(L)min=C(km)$ for continuous correlation is determined by a three-point interpolation method shown in (6):

$$km=kj+D/SLOP$$

$$C(km)=C(kj)-|D|$$

$$D=\{C(kj-1)-C(kj+1)\}/2$$

$$SLOP=MAX(C(kj+1)-C(kj), C(kj-1)-C(kj)) \quad (6)$$

The defocus amount DEF can be determined in the following manner from the shift amount kj determined by the equations (6):

$$DEF=KX\times PY\times km \quad (7)$$

wherein PY is the pitch of arrangement of the photosensor cells constituting the photosensor elements of the photoelectric converting device 304, and KX is a coefficient determined by the structure of the focus detecting optical system shown in FIG. 1.

Also the parameters $C(km)$ and SLOP obtained from the equations (6) allow to judge the reliability of the defocus amount DEF, and said parameters are used for determining whether the focus detection is possible or not.

The foregoing explanation has been limited to the calculation of correlation between a pair of one-dimentional data, but said calculation can be easily expanded to a case where two-dimensional data are obtained from two-dimensional photosensor elements of the photoelectric converting circuit.

Figure 12:
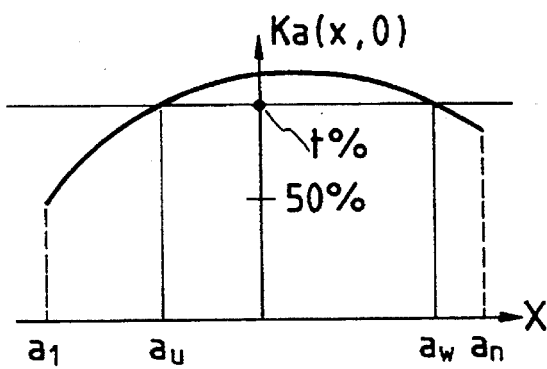
FIG. 12 is a chart showing the range of data to be employed in the correlation calculation.

The focus detection calculating portion 400D also determines the range data, to be employed in the correlation calculation according to the equations (5), based on the light amount distribution information. For example, when the light amount distribution information $Ka(x, y)$ is determined as shown in FIG. 12 and the data a1–an of the photosensor element 304A are set on the image field, data au–aw with light amounts at least equal to a predetermined value t% are employed in the correlation calculation. The range of data to be employed in the correlation calculation can be similarly determined for other data bi, ci and di. In this manner it is rendered possible to reduce the unbalance between the data resulting from loss in the light amount, in the correlation calculation, and to improve the accuracy of focus detection.

Furthermore, the calculating portion 400D may effect conversion of the data to be employed in the correlation calculation according to the equations (5), based on the light amount distribution information. For example, if said information indicates significant loss in light amount, data may be converted by a filtering calculation for low frequency components removal according to the equation (8):

$$a'i=-ai+2\cdot a(i+1)-a(i+2) \quad (8)$$

The data a'i, b'i, c'i and d'i converted according to the equation (8) are used, instead of the original data ai, bi, ci and di, in the correlation calculation according to the equations (5). Such conversion allows to eliminate the low frequency components of the image signals, resulting from the loss in light amount, thereby improving the accuracy of the focus detection.

Furthermore, the calculating portion 400D may vary, according to the light amount distribution information, the threshold reference value in judging the reliability of the defocus amount DEF by the parameters $C(km)$ and SLOP obtained from the equations (6). For example, if said distribution information indicates a significant loss in light amount, said reference value may be lowered to avoid the reduction in the reliability resulting from the loss in light amount. In this manner a constant determination whether the focus detection is possible or not can be obtained for a same object, regardless of the presence or absence of loss in light amount.

Furthermore, the object image signals may be corrected, according to the light amount distribution information, to image signals corresponding to a uniform state without loss in light amount. For example, if the photoelectric converting device is composed of a pair of two-dimensional sensors with output image signals $Sa(x, y)$ and $Sb(x, y)$, with light amount distribution information $Ka(x, y)$ and $Kb(x, y)$, said correction can be made according to the following equation (9):

$$S'a(x, y)=Sa(x, y)/Ka(x, y)$$

$$S'b(x, y)=Sb(x, y)/Kb(x, y) \quad (9)$$

Such correction corrects the loss in light amount included in the image signals, thereby enabling the calculating portion 400D to effect exact correlation calculation and improving the accuracy of focus detection.

The above-explained calculations are conducted according to a program of the microcomputer 400.

Figure 13A:
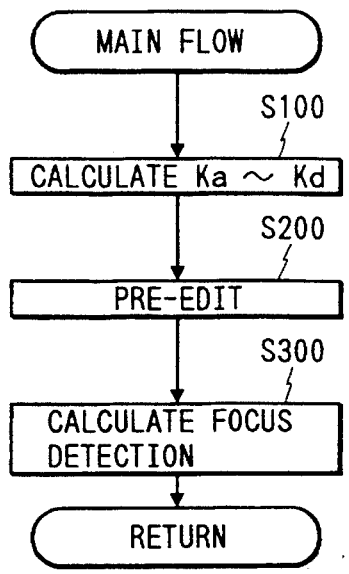
FIGS. 13A to 13F are flow charts showing the control sequence of focus detecting calculation in the present embodiment.

FIG. 13A shows a main flow chart of said program. At first a step S100 calculates the light amount distribution information ka–kd. Then a step S200 effects a predetermined process on the image signals, based on thus calculated distribution information ka–kd, and a step S300 determines the defocus amount by a focus detecting calculation based on thus processed image signals. The lens is driven based on said defocus amount, according to an unrepresented control sequence.

Figure 13C:
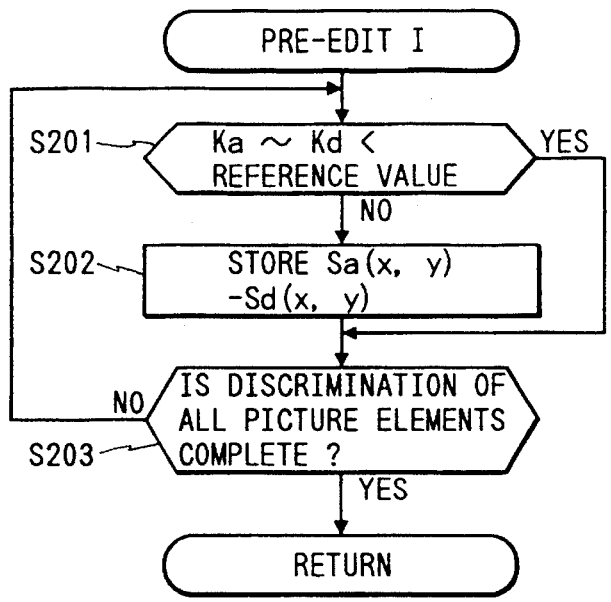
Figure 13B:
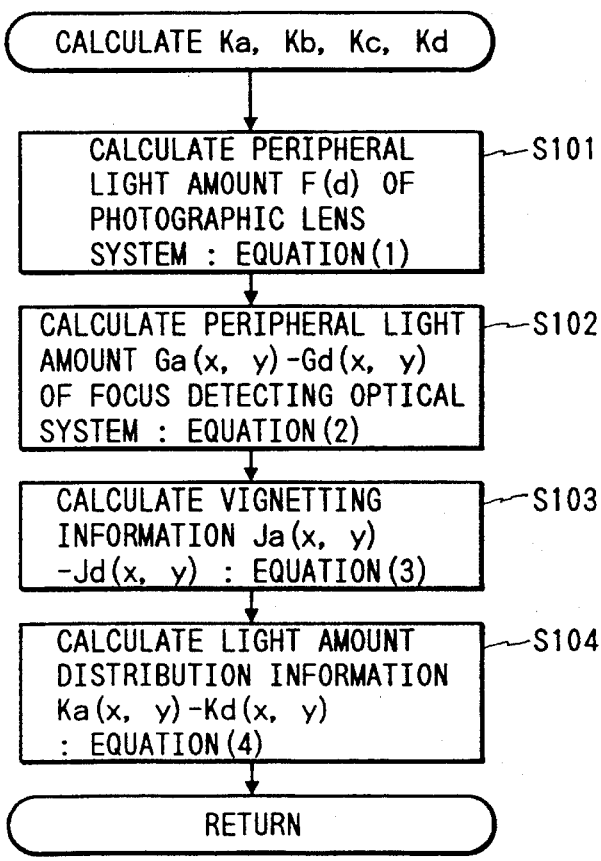

The light amount distribution information ka–kd are determined according to a flow chart shown in FIG. 13B.

A step S101 determines the peripheral light amount F(d) of the phototaking lens 11 according to the equation (1), by fetching said equation (1), stored in the lens CPU 12, into the microcomputer 400 of the camera body. A next step S102 determines the peripheral light amounts Ga(x, y)– Gd(x, y) of the focus detecting optical system from the equations (2). Then a step S103 determines the vignetting information Ja(x, y)–Jd(x, y) from the equations (3), and a step S104 determines the light amount distribution information ka(x, y)–kd(x, y) from the equation (4).

FIG. 13C shows a pre-editing procedure for the image signals.

A step S201 discriminates whether the light amount distribution information ka(x, y)– kd(x, y) are smaller than a reference value. If larger, said step S201 is negated and a step S202 stores the image signals as Sa(x, y)–Sd(x, y) in a memory. If smaller, the sequence jumps to a step S203 for discriminating whether the comparison has been completed for all the pixels, and, if completed, the sequence of FIG. 13C is terminated. Thus the image signals are stored in the memory only when the distribution information ka(x, y)–kd(x, y) are larger than the reference value.

Figure 13D:
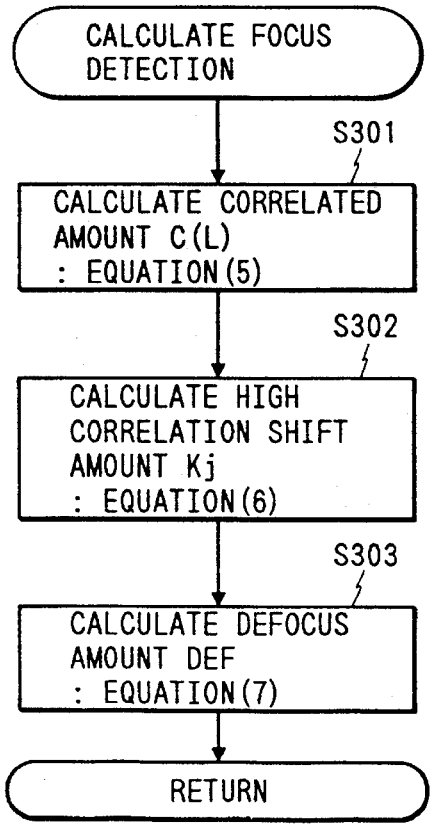
Figure 13E:
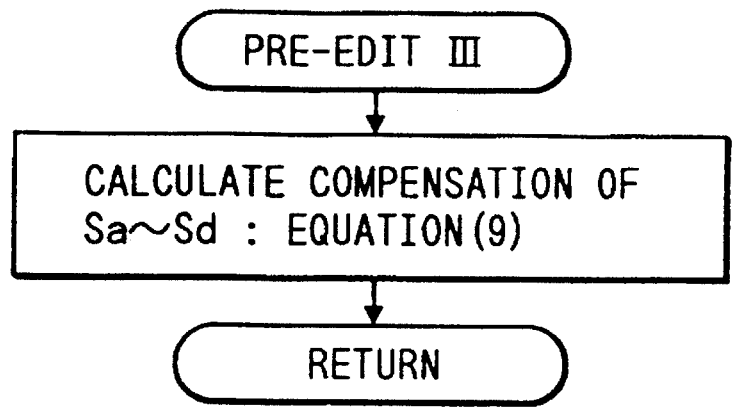

FIG. 13D is a flow chart of focus detecting calculation.

A step S301 determines the correlation C(L) from the pre-edited image signals, according to the known calculation of the equations (5). Then a step S302 determines the shift amount kj of high correlation according to the equations (6), and a step S303 determines the defocus amount from the equations (7).

The pre-editing procedure shown in FIG. 13C stores only the image signals of which light amount distribution information are larger than the reference in the memory, but it is also possible to store all the image signals in the memory by applying the correction of the equations (9) based on the light amount distribution information ka–kd.

Figure 13F:
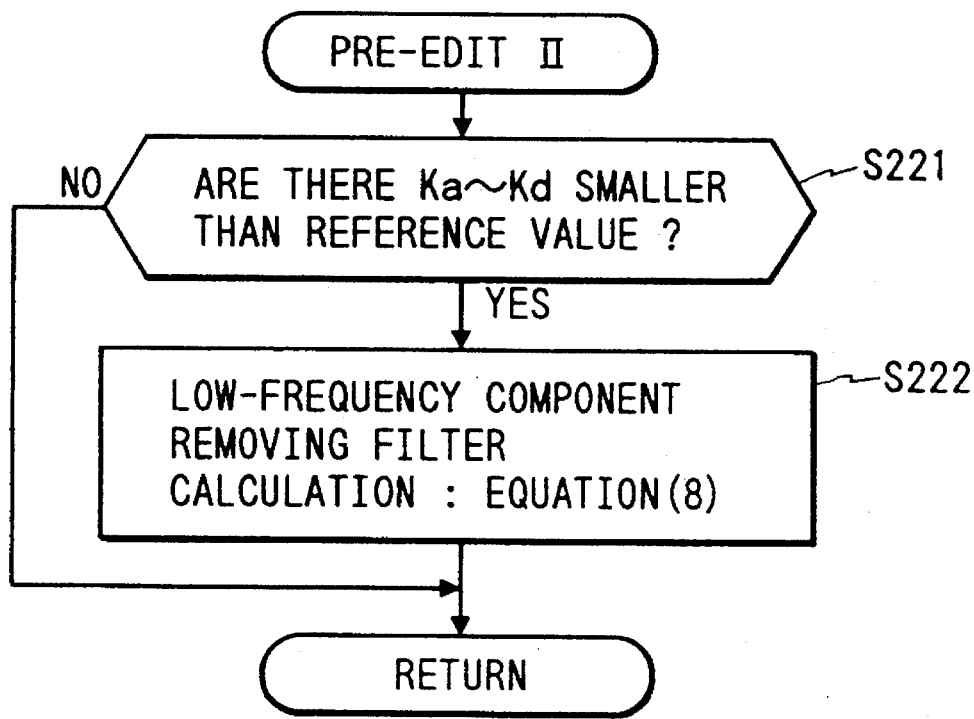

Also in a pre-editing procedure shown in FIG. 13F, a step S221 discriminates the presence of light amount distribution information ka–kd smaller than the reference value, and, if affirmative, a step S222 effects filtering for removing the low frequency components according to the equations (8), and thus filtered image signals are used for focus detecting calculation.

The focus detecting optical system may be constructed as shown in FIG. 1, or as shown in FIG. 14. The structure shown in FIG. 14 is composed of a field mask 300 having a two-dimensional aperture 300A; a field lens 301; a diaphragm mask 302 having a pair of apertures 302A, 302B; a pair of re-focusing lenses 303A, 303B; and a photoelectric converting device 304 provided with photosensor areas 304A, 304B in which photosensor elements are two-dimensionally arranged. Such structure realizes two-dimensional arrangement of focus detecting areas (AF areas) on the image plane, and enables arbitrary change of the focus detecting areas based on the selection of AF areas or on the result of viewing point detection to be explained later.

Figure 15:
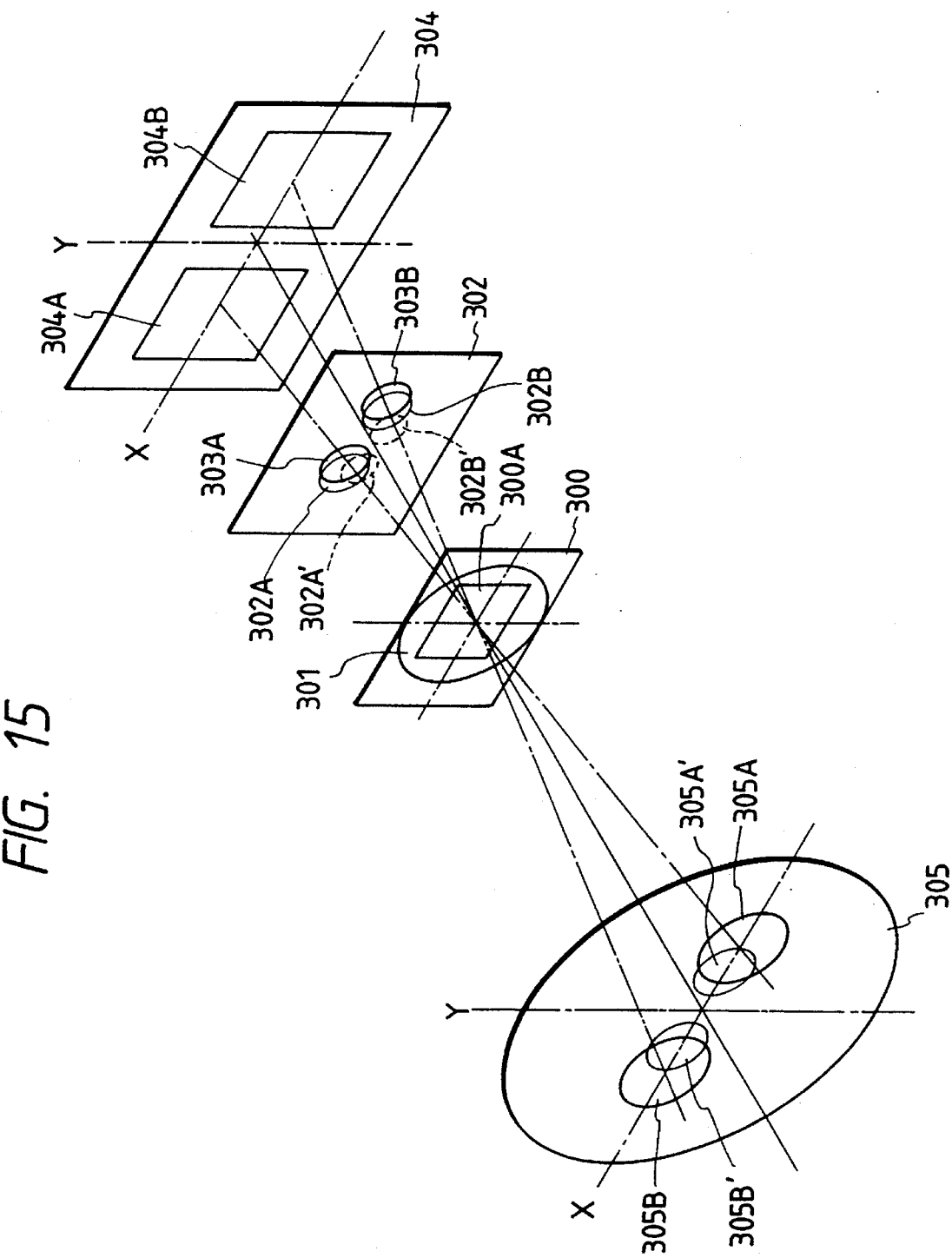

Also the focus detecting optical system 30 may be constructed as shown in FIG. 15. In said system, the diaphragm mask 302 is composed of a physical device capable of electrically varying the light transmittance, such as an electrochromic (EC) or liquid crystal (LC) device, and the apertures thereof can be shifted between those 302A, 302B shown in FIG. 14 and those 302A', 302B' with smaller radius of circumscribed circles as shown in FIG. 15, by electrical control from the outside. Thus, in case of vignetting with the apertures 302A, 302B, said apertures can be switched to the apertures 302A', 302B' with smaller radius of circumscribed circles thereby reducing the focus detecting diaphragms on the focus detecting pupil plane and thus avoiding the vignetting. In the structure shown in FIG. 15, the circumscribed circles are reduced by a size reduction of the apertures 302A', 302B', but for a lens with an annular exit pupil such as a reflex lens, the inscribed circles of the apertures 302A', 302B; can be increased in order to avoid vignetting of the focus detecting diaphragm inside the annular exit pupil.

Figure 16:
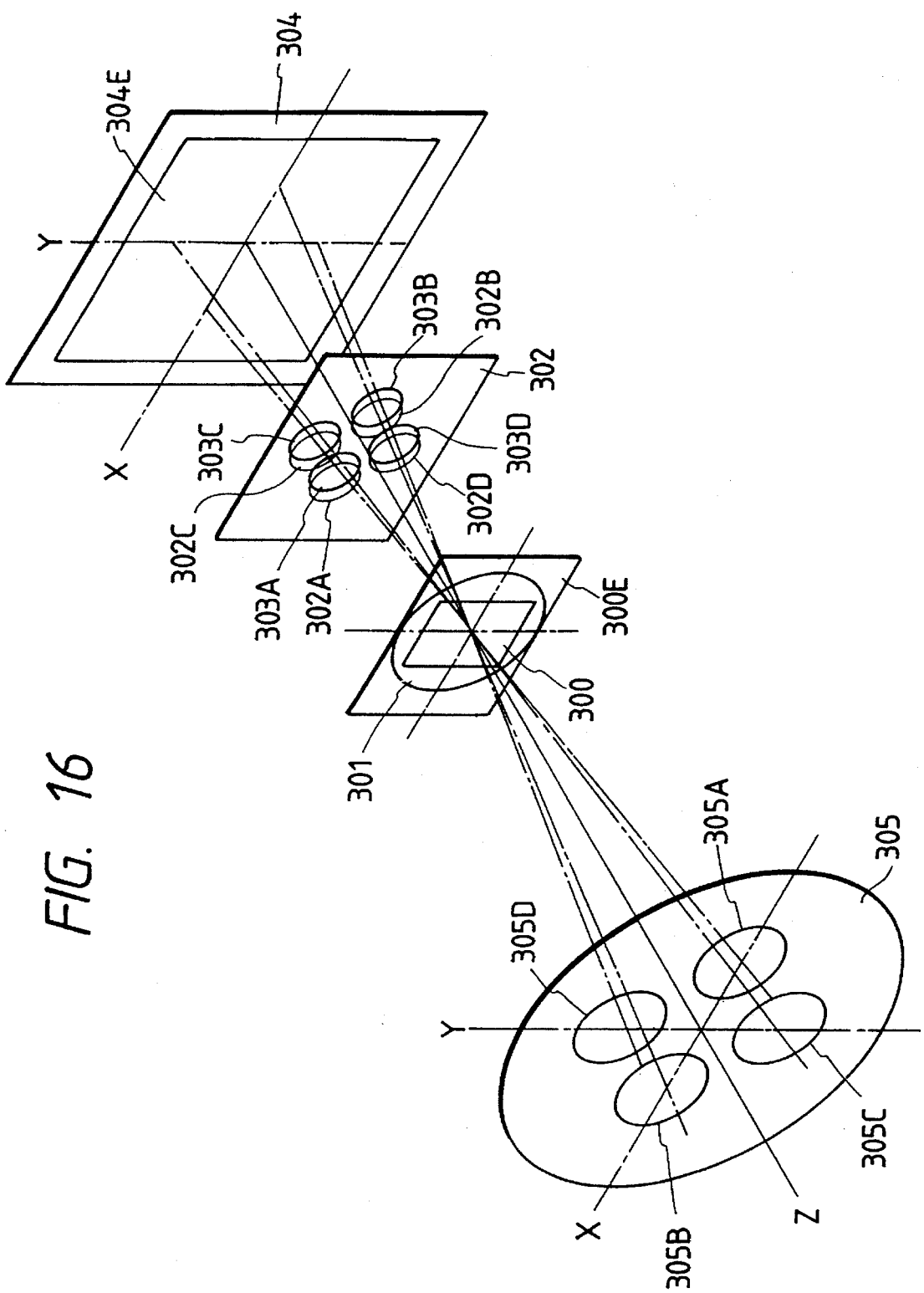

Furthermore, the focus detecting optical system 30 may be constructed as shown in FIG. 16. In this case the diaphragm mask 302 and the re-focusing lenses are different in structure from those in FIG. 15, and the apertures 302A, 302B of the diaphragm mask 302 shown in FIG. 15 can be shifted to those 302C, 302D with a different direction of arrangement by external electrical control. Re-focusing lenses 303C, 303D are provided behind said apertures 302C, 302D. Such structure allows to select the apertures arranged in a direction of easier focus detection, depending on the pattern of the object, thereby improving the accuracy of focus detection. As the photoelectric converting device 304 has a two-dimentional photosensor area 304E, a common photoelectric converting area may be used for the apertures 302A, 302B and re-focusing lenses 303A, 303B, or the apertures 302C, 302D and re-focusing lenses 303C, 303D. The problem of image overlapping can be avoided because the images by the lenses 303A, 303B and those by the lenses 303C, 303D are not formed at the same time.

In the structure shown in FIG. 16, the direction of arrangement of the apertures 302C, 302D is perpendicular to that of the apertures 302A, 302B, but there may be naturally selected other directions of arrangement.

In the sturctures shown in FIGS. 15 and 16, a physical device is employed for switching the form of the apertures, but plural apertures may be switched in mechanical manner.

In the following there will be explained an embodiment of the present invention applied to a single-lens reflex camera, with reference to FIG. 17 and ensuing drawings.

Function of AF Detection System Controlling CPU

The AF detection system controlling CPU 33 has the functions of selecting the aforementioned AF diaphragm according to an instruction by the AF calculating CPU 40 to be explained later or according to its own discretion, controlling the functions such as charge accumulation and charge transfer of the photoelectric converting device 32 with already known control signals and transfer clock signals, and storing the transferred image signals into the memory 34 after A/D conversion.

The operations of said controlling CPU 33 will now be explained in detail, with reference to FIGS. 17 to 25.

Figure 17:
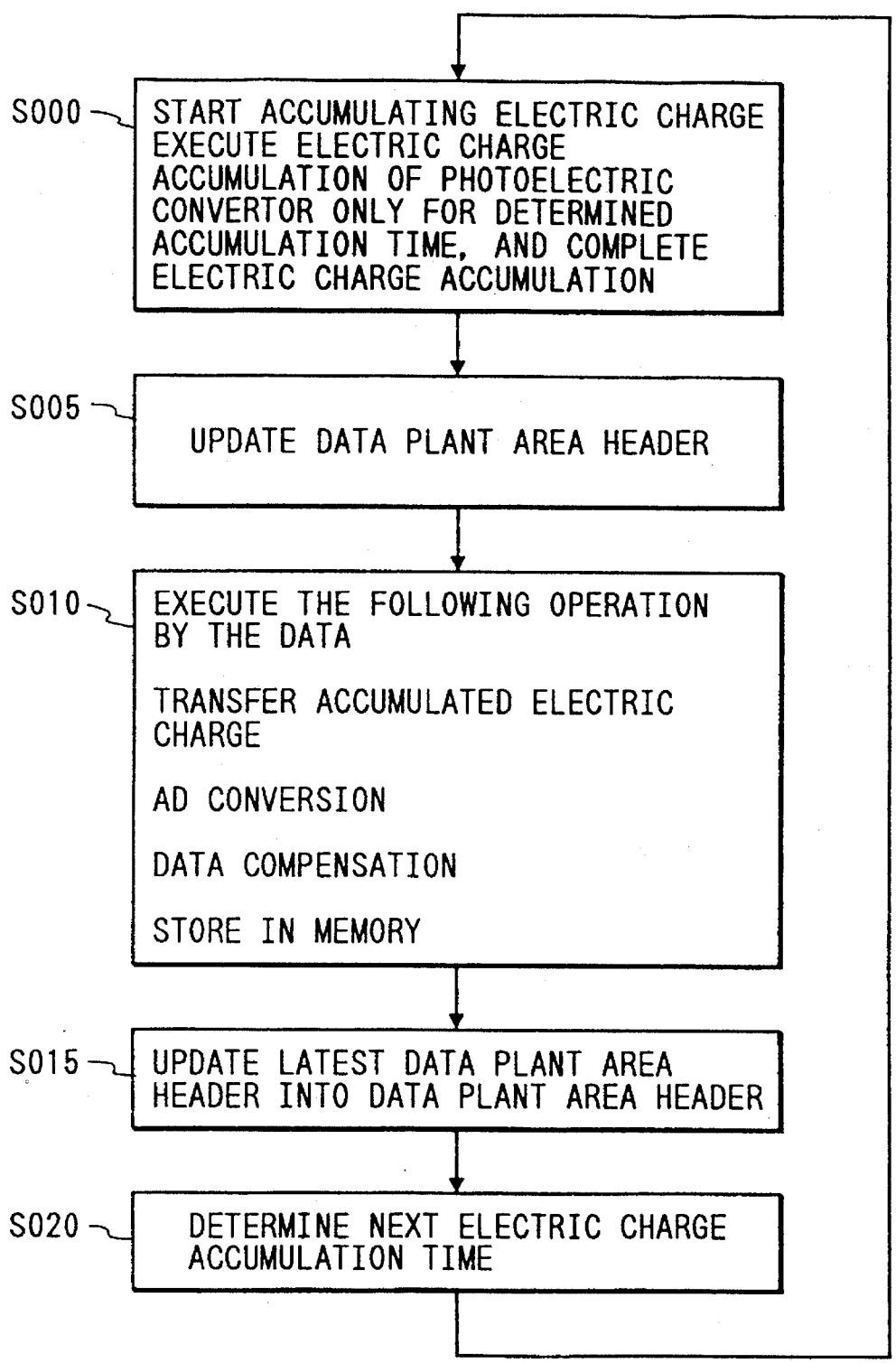
FIG. 17 is a flow chart of the control sequence of a CPU for controlling the AF detecting system.

FIG. 17 is a flow chart showing an example of control sequence of the AF detection system controlling CPU 33. A step S000 effects charge accumulation in the photoelectric converting device 32 for a predetermined accumulating time. Upon completion of the accumulation, a step S005 changes a header indicating the memory storage area of the A/D-converted output data of the photoelectric converting device 32. Then a step S010 effects transfer of the output of said device 32, A/D conversion, data correction and storage in the memory, for each data. Said data correction includes the calculation according to the equations (9) for correction for the peripheral light amount. For said correction the controlling CPU 33 incorporates the information of the focus detecting optical system, and receives the information on the phototaking optical system from the lens CPU 12. Upon completion of transfer of all the output data, a step S015 changes the header, indicating the latest data storage area, to the current data storage area, and a step S020 determines the next accumulating time in such a manner that the peak value of the obtained image data becomes equal to a predetermined value. Then the sequence returns to the step S000 to repeat the above-explained sequence.

Figure 18:
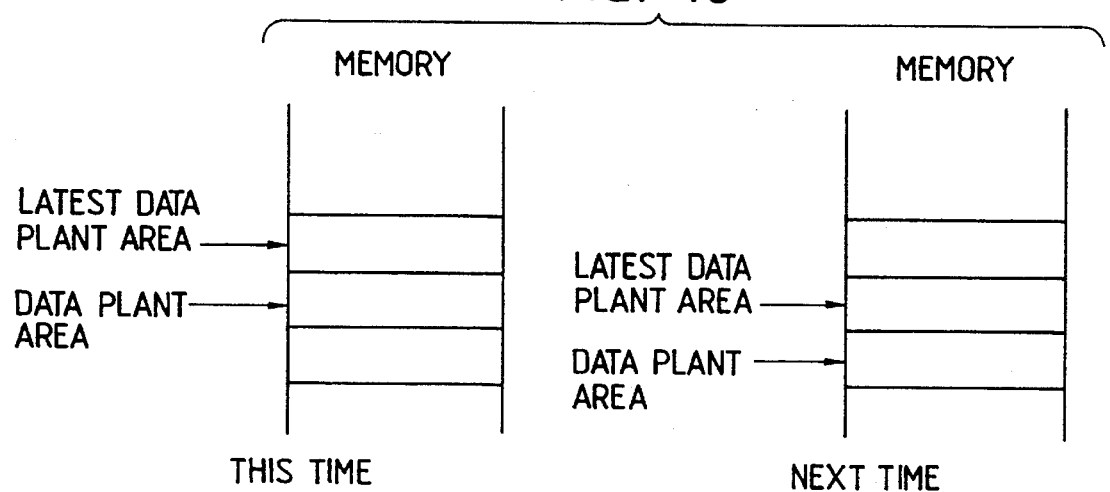
FIG. 18 is a view showing the change in data storage areas of the memory.

FIG. 18 conceptually shows the changes in the data storage areas in the memory 34 in the above-explained procedure. If a latest data storage area and a data storage area currently under data storage are arranged as indicated "this time", the current data storage area will become the latest data storage area in the next time. Since the headers of the latest data storage area and the current data storage area are stored in the memory 34, the AF calculating CPU 40 can always utilize the latest data from the latest data storage area for the focus detecting calculation by reading the header of said area from the memory 34. Also since the control operation for the photoelectric converting device 32 and the focus detecting calculation are separated, these two operations can be conducted in parallel manner, so that the efficiency in time or the response of focus detection can be improved.

Figure 19A:
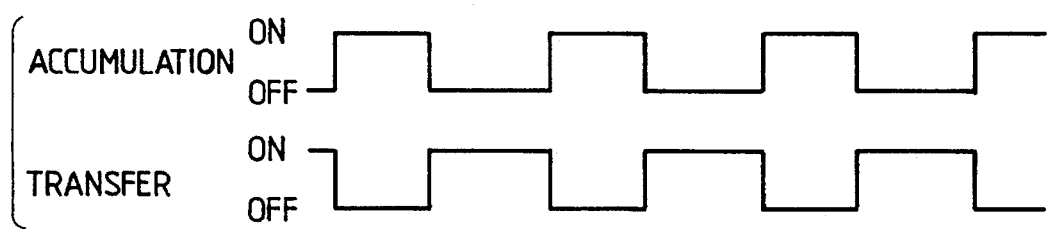
FIGS. 19A to 19D are timing charts of the function of the CPU for controlling the AF detecting system.
Figure 19B:
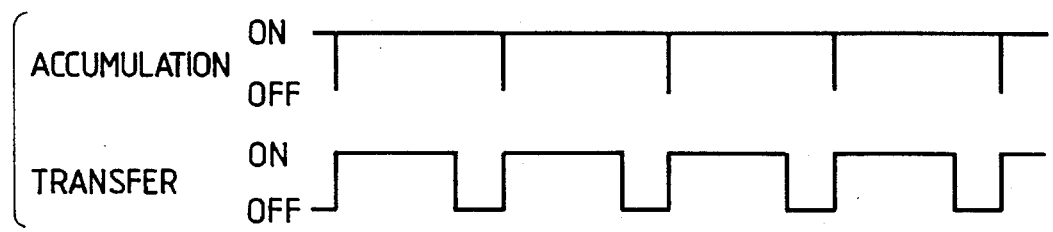
Figure 19C:
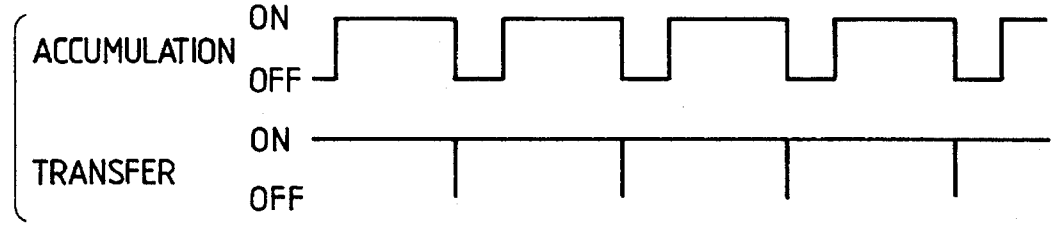

FIG. 19A is a timing chart of the above-explained procedure, in which the signal transfer is started immediately after the completion of the charge accumulation of the photoelectric converting device 32, and the next charge accumulation is started immediately after the completion of the signal transfer. In case of FIG. 19A the charge accumulation and the signal transfer are mutually separated in time, but these operations may mutually overlap as shown in FIGS. 19B or 19C. If the charge accumulating time is longer than the signal transfer time, the signal transfer and the next charge accumulation are started immediately after the completion of the charge accumulation, as shown in FIG. 19B. On the other hand, if the charge accumulating time is shorter, as shown in FIG. 19C, the signal transfer is started immediately after the completion of the charge transfer, and the next charge accumulation is started at a suitable timing in such a manner that said next charge accumulation will be completed immediately after the completion of the signal transfer. Such mutually overlapping charge accumulation and signal transfer in time improves the efficiency in time, or the response of the focus detecting operation, and allows to absorb the loss in response, resulting from the increase in number of data in the use of a two-dimensional photoelectric converting device.

Figure 20A:
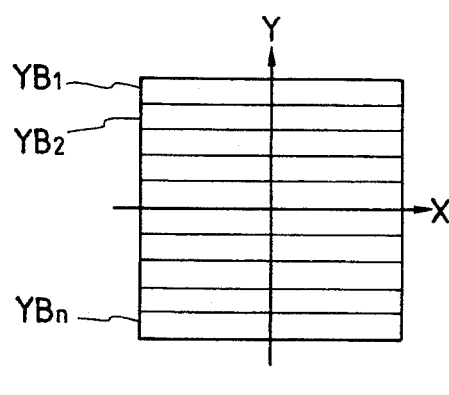
FIGS. 20A and 20B are views showing two-dimensional photosensor units.
Figure 20B:
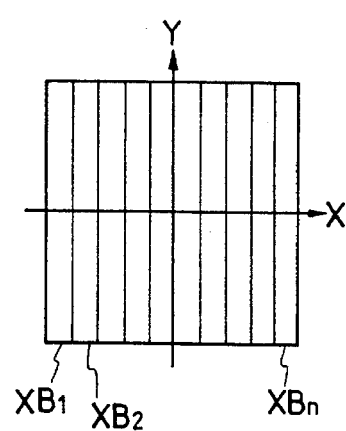

As alternative method for absorbing such loss in response, a rectangular two-demensional photosensor area as shown in FIG. 20A may be divided into n blocks YB1–YBn oblong parallel to the X-axis, and charge accumulation and signal transfer may be conducted in time-separated manner for each block. A structure shown in FIG. 20A ensures the simultaneous character of data in the X-direction, and is therefore better matched with the apertures 302A, 302B arranged in the X-direction, on the diaphragm mask shown in FIG. 21. On the other hand, in case of using the apertures 302C, 302D arranged in the Y-direction, it is preferable to divide the photosensor area into n blocks XB1–XBn oblong in a direction perpendicular to the X-axis, as shown in FIG. 20B, and to effect the charge accumulation and the signal transfer in time-separated manner for each block, thereby ensuring simultaneous character of the data in the Y-direction.

Figure 19D:
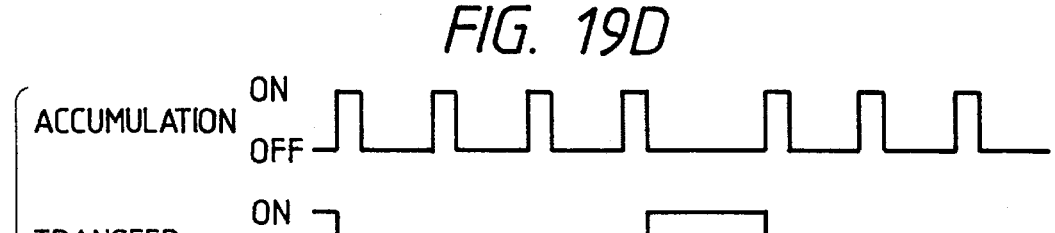
Figure 21:
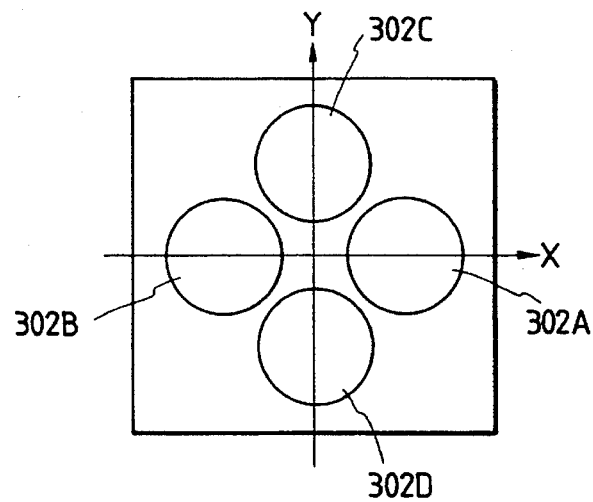
FIG. 21 is a view of a diaphragm mask.
Figure 22A:
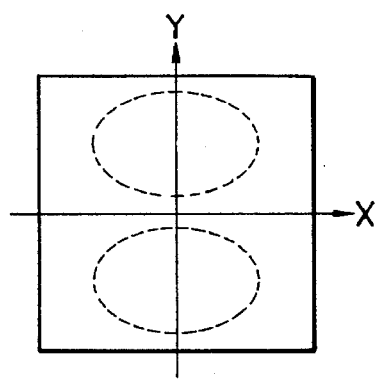
FIGS. 22A and 22B are views showing data, on the photosensor units, usable for the calculation for focus detection.
Figure 22B:
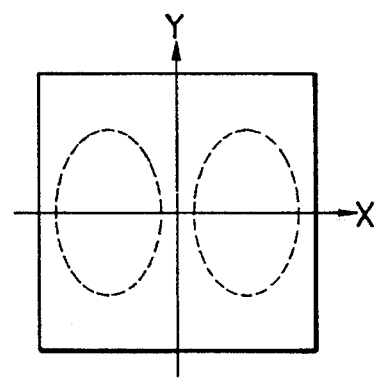

Also in case the light source is of a high luminocity and involves flickering, whereby the output of the charge accumulation varies even for a same accumulating time, depending on the timing of charge accumulating operation in the flickering cycle, the charge accumulating operation may be divided into plural portions as shown in FIG. 19D, thereby effecting the accumulation plural times in a flickering cycle of the light source, thereby alleviating the influence of said flickering.

Figure 5A:
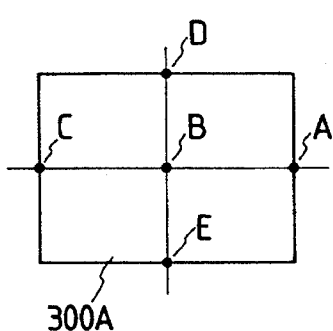
FIGS. 5A to 5D are views showing different states of vignetting in case the focus detecting light beams show vignetting.
Figure 5B:
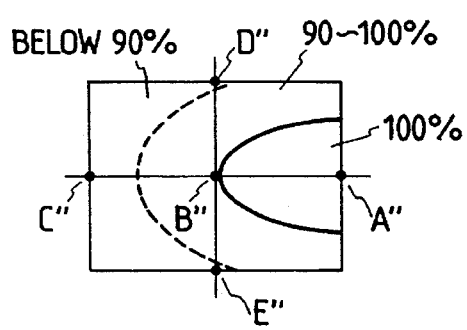
Figure 5C:
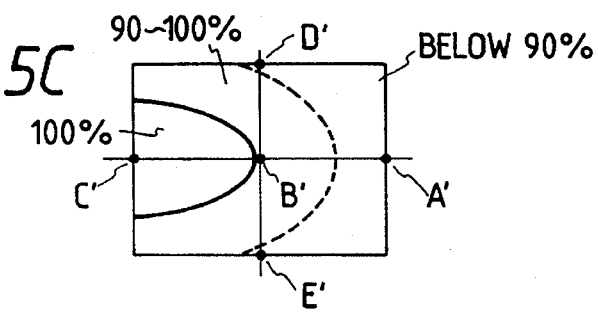
Figure 5D:
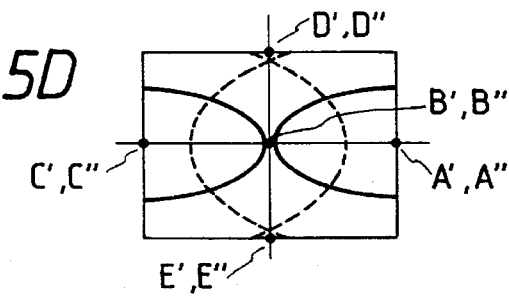
Figure 6:
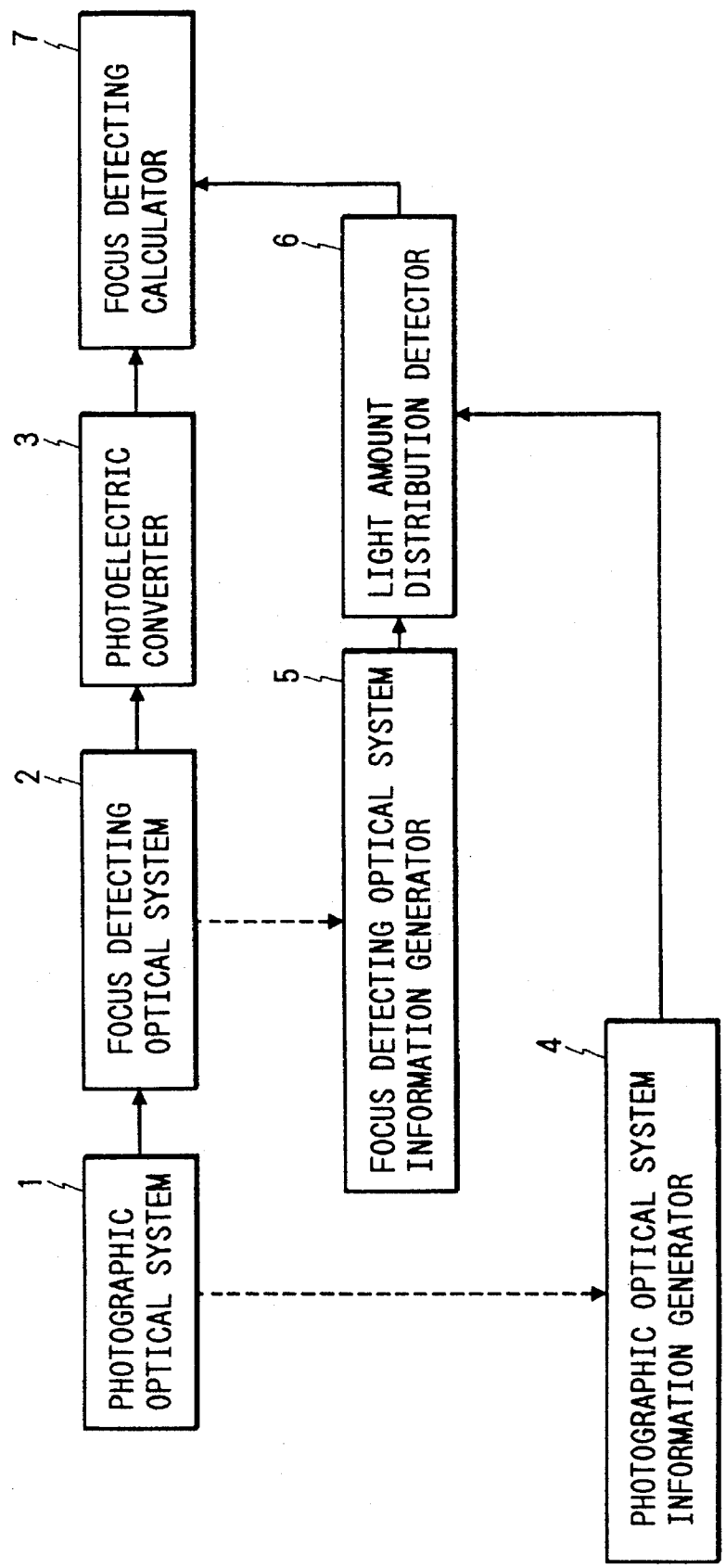
FIG. 6 is a schematic view of the structure of a focus detecting device of the present invention.

Also in case the peripheral light amount is lowered as shown in FIGS. 11A and 11B or in FIGS. 5B to 5D, the charge transfer time may be saved by effecting the normal transfer operation only in an image area to be used in the focus detecting calculation and a high-speed transfer operation in other areas. For example, if the data usable for focus detection are defined by broken-lined areas in FIG. 22A or 22B respectively corresponding to the use of apertures 302A, 302B arranged in the X-direction on the diaphragm mask shown in FIG. 21 or those 302C, 302D arranged in the Y-direction, the normal transfer operation is conducted only for the output data corresponding to the interior of the broken lines and high-speed transfer operation is conducted, without the A/D conversion and the storage in the memory, for other areas. Also information indicating the correlation between the data stored in the memory by normal transfer operation and the areas thereof on the photosensor areas is stored in the memory and is utilized in the focus detecting calculation by the AF calculating CPU 40.

In case a two-dimensional image sensor is used as the photoelectric converting device 32, the amount of signal is enormous, so that a considerable time is consumed in the signal transfer and the A/D conversion. Therefore, if the charge accumulating time is extended due to a low light intensity, the charge accumulation and the signal transfer of the image sensor cannot be accommodated within a predetermined time and the response is deteriorated. In order to avoid such situation, it is possible, at a low light intensity, to use only a part of the entire output of the image sensor for the focus detection, to effect the transfer and A/D conversion at the normal rate only such used part of the sensor output while to transfer the output of other unused parts at a higher rate without A/D conversion, or to extract the image sensor output only in the used part, thereby accommodating the sum of the charge accumulating time and the signal transfer time in a predetermined period. In such low light intensity situation, the data used for focus detection are desirably obtained from the central portion of the image field.

In the foregoing description, the charge accumulating time of the photoelectric converting device 32 is so determined that the image data have a predetermined peak value, but such determination of the next accumulating time by the image data may result in an oscillation phenomenon in case the object is illuminated by a light source with cyclically varying intensity, such as a fluorescent lamp. Though there may be provided a monitor device in the vicinity of the photoelectric converting device for monitoring the average intensity of object image on real time basis and terminating the charge accumulation of the photosensor area when the monitor signal reaches a predetermined value, the peak value may exceed the range of A/D conversion for certain objects composed for example of white lines on a black background.

Figure 23:
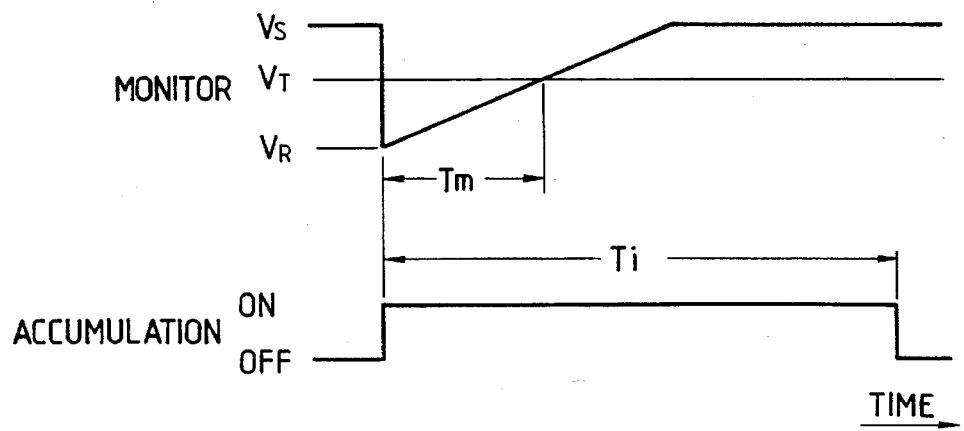
FIG. 23 is a chart showing a method for controlling the accumulating time.
Figure 24:
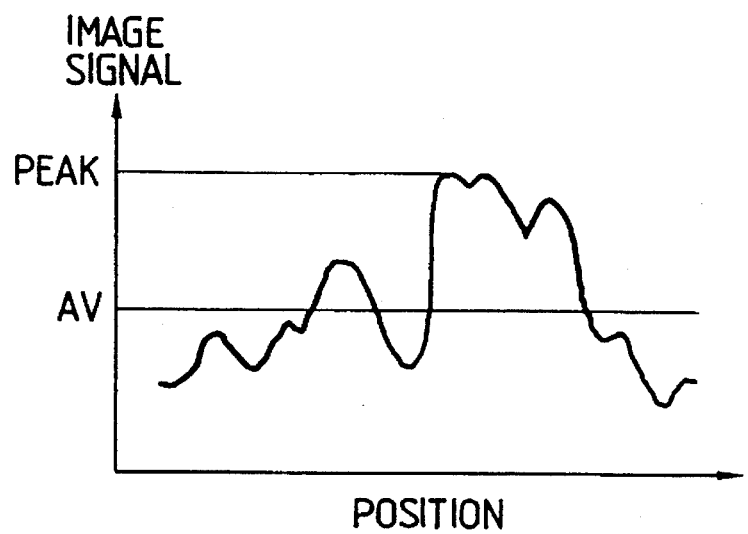
FIG. 24 is a chart showing a peak value PEAK and an average value AV of the previous object image data.

FIGS. 23 and 24 show a method for controlling the charge accumulating time for resolving such drawback.

Referring to FIG. 23, the monitor signal is reset to a value VR simultaneously with the start of charge accumulation. The monitor signal increase according to the average brightness of the object image, and reaches a predetermined value Vs after a time Tm from resetting. The AF detection system controlling CPU 33 determines the current accumulating time Ti according to the following equation, based on the peak value PEAK of the previous image data shown in FIG. 24, the average value AV thereof, the previous accumulating time Ti1, the target peak value, the current monitor time Tm, and a predetermined value K1, and terminates the accumulation at the time Ti from the start thereof:

$$Ti=(K1 \times Pt \times Tm)/AV \text{ or}$$

$$Ti=(Pt \times Tm \times Ti1)/(PEAK \times Tm1) \qquad (10).$$

Figure 25:
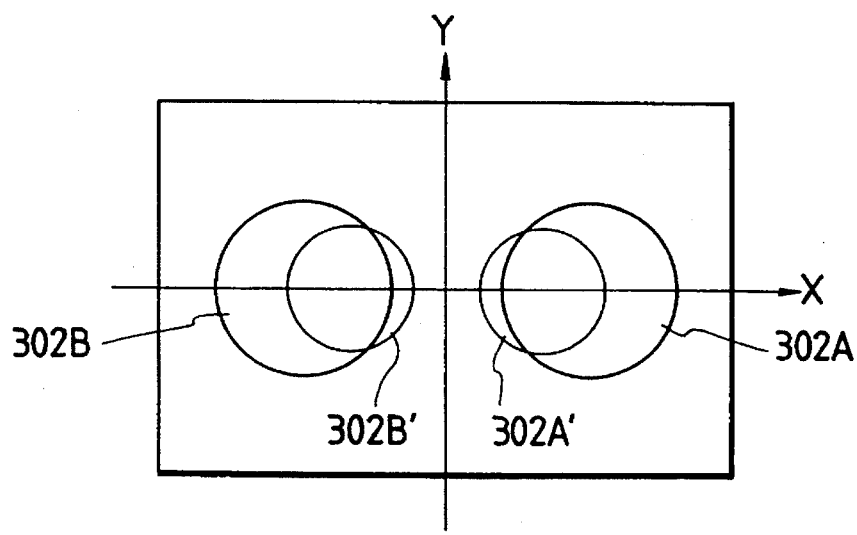
FIG. 25 is a view of a diaphragm mask.

Also in case a lowered peripheral light amount is identified from the information on the focus detecting optical system and the information on the phototaking optical system received from the lens CPU 12, or in case of a request from the AF calculating CPU 40 (for example for expanding the range of detectable defocus amount in case of disabled focus detection), the AF detection system controlling CPU 33 may switch the apertures 302A, 302B of the diaphragm mask shown in FIG. 25 to those 302C, 302D with less tendency of vignetting. Also in response to a request from the AF calculating CPU 40 (for example in case of disabled focus detection due to absence of vertical patterns), or in response to a vertical/horizontal selection by an AF area selecting device 66 to be explained later (for selecting either the horizontal photosensor elements 304A, 304B or the vertical photosensor elements 304C, 304D for focus detection), or in response to the detection by a body position detecting device 69, the apertures 302A, 302B of the diaphragm mask shown in FIG. 21 may be switched to those 302C, 302D. Information on such switching is supplied to the AF calculating CPU 40, which effects processing accordingly.

Function of AF Calculating CPU

Figure 26B:
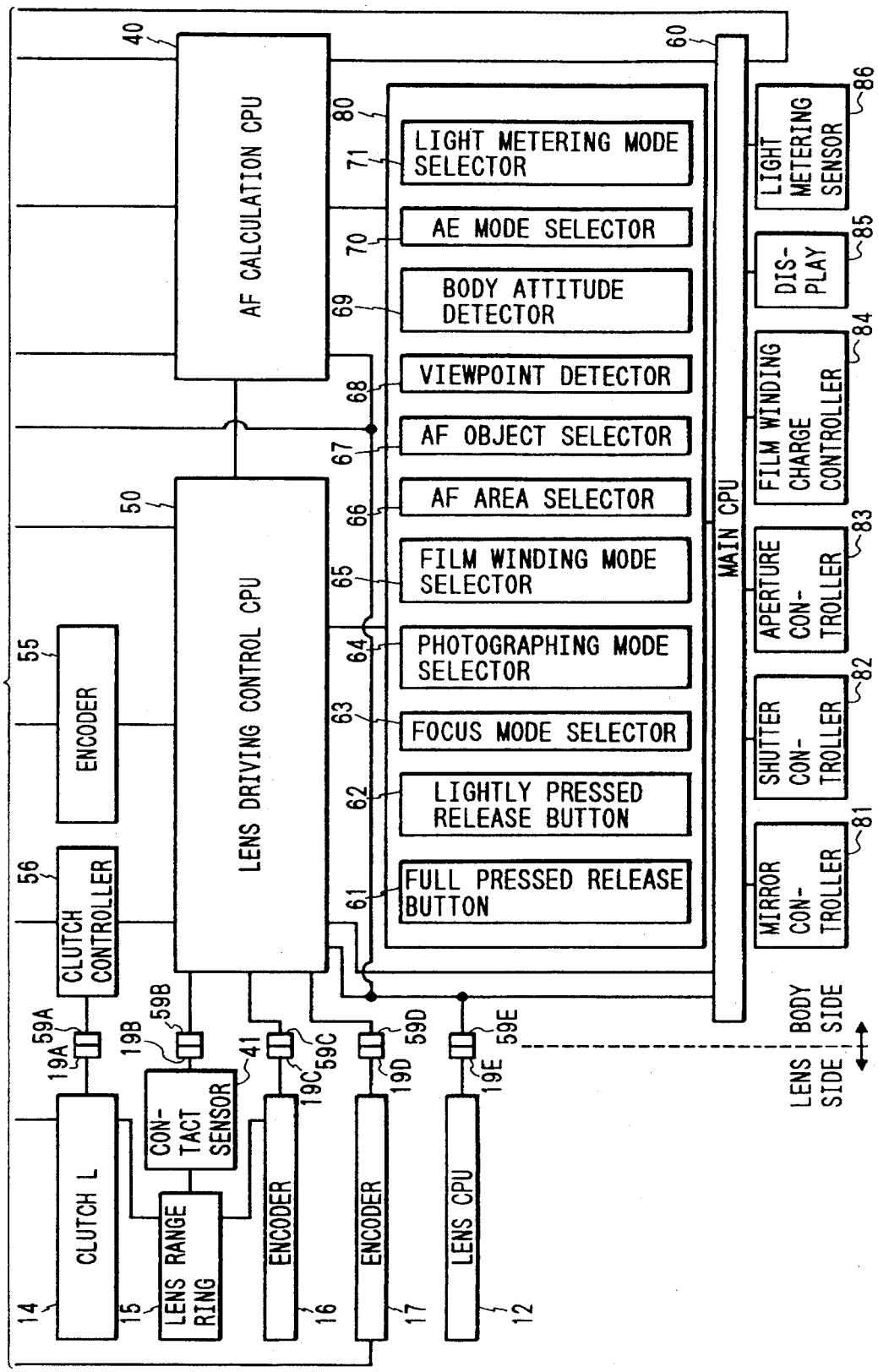
FIG. 26 is a block diagram showing a more detailed embodiment of the focus detecting device.

Referring to FIG. 26, the AF calculating CPU 40 has a function of effecting known focus detecting calculation on the image data stored in the memory 34, thereby determining the defocus amount of the phototaking optical system. For example, in case of employing a focus detecting optical system as shown in FIG. 1, said CPU effects, as disclosed in the U.S. patent application Ser. No. 457,408 of the present applicant, the focus detecting calculation on each of plural blocks formed in the focus detecting area, and selects an optimum defocus amount from thus calculated plural defocus amounts, according to various principles. The focus detecting calculation conducted by the AF calculating CPU 40 is principally composed, as shown in FIG. 27, of a step S030 for data correction and conversion, a step S035 for selecting the focus detecting area, a step S040 for block division, a step S045 for defocus amount calculation for each block, and a step S050 for final defocus amount selection, and said CPU 40 repeats these steps. These steps will be explained in detail in the following.

The data correction/conversion step also includes the calculation according to the equations (9) for peripheral light amount correction. The AF calculating CPU 40 executes the correction of the equations (9) by determining the light amount distribution information, based on the information of the focus detecting optical system incorporated in said CPU or received from the AF detection system controlling CPU 33 and the information of the phototaking optical system received from the lens CPU 12.

Figure 28A:
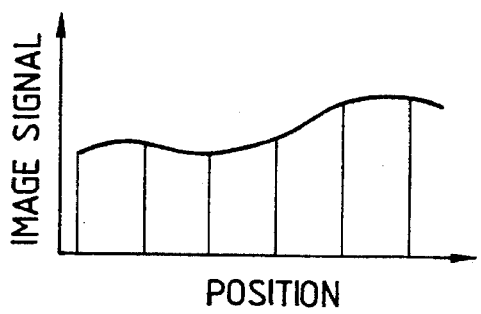
FIGS. 28A to 28D are charts showing image signals.
Figure 28B:
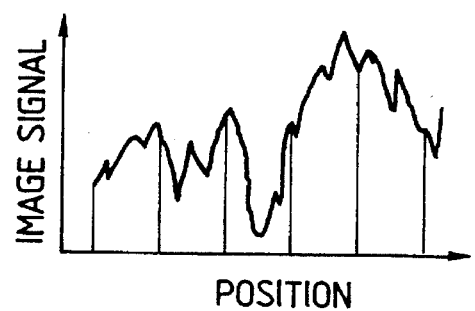

If the loss in light amount is identified significant from the obtained light amount distribution information, data conversion is conducted by filtering for eliminating the low frequency components as shown by the equations (8). Such data conversion may be applied solely to an object containing a large amount of high frequency components, as identified by the contrast of the object. For example, an image signal as shown in FIGS. 28A or 28B is divided into plural blocks, and contrast CON is detected in each of said blocks according to the equation (11). A predetermined contrast is not obtained in any of the blocks, the object is identified as a low-frequency object and the data conversion of the equations (8) is not applied. If said predetermined contrast is obtained in at least a block, said data conversion is conducted:

$$CON=\Sigma|ai-a(i+1)| \qquad (11).$$

Such selective application of the data conversion by filtering, according to the image contrast, enables focus detecting calculation on an object containing a large amount of low frequency components without filtration of such low frequency components, thereby improving the accuracy of focus detection.

Figure 29A:
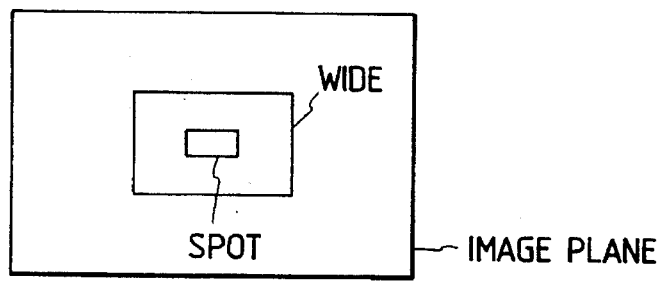
FIGS. 29A and 29B are views showing focus detecting areas in the image plane.
Figure 29B:
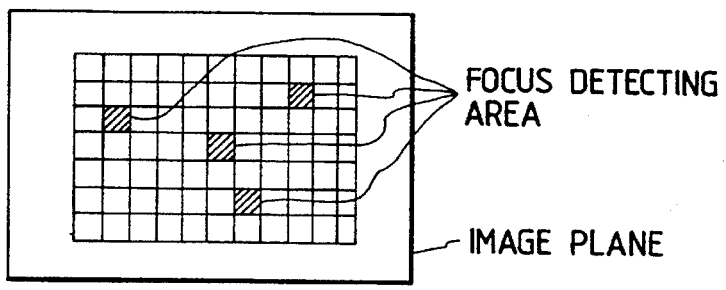

The focus detection area selecting step selects, for example, either a narrow spot area at the center of image field or a wide area for focus detection, as shown in FIG. 29A, by a suitable method. Also there may be arbitrarily selected a focus detecting area or areas at arbitrary position(s), as shown in FIG. 29B, either manually by the AF area selecting device 66 or by the viewing point detecting device 68.

Figure 30A:
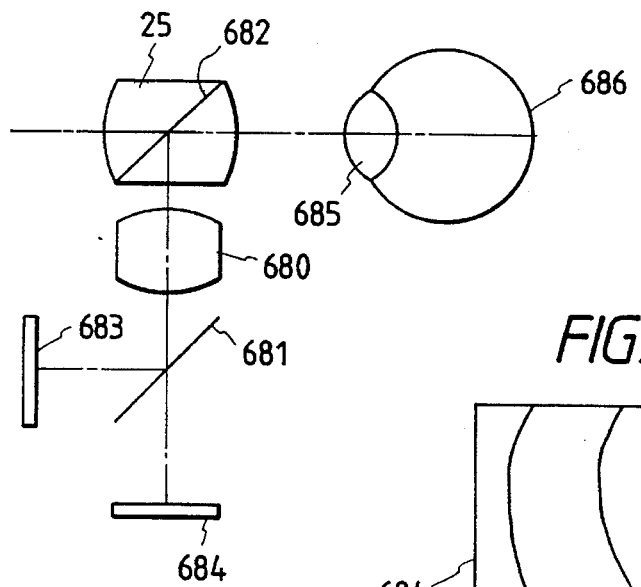
FIGS. 30A and 30B are views showing structure of a viewing point detecting device.
Figure 30B:
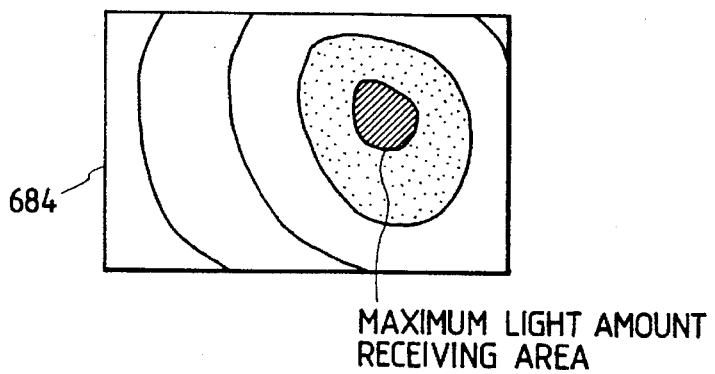

FIGS. 30A and 30B illustrate an example of the viewing point detecting device 68. A planar infrared-emitting element 683 projects infrared light through a half mirror 681, a lens 680 and an infrared-reflecting dichroic mirror 682 provided in the eyepiece lens 25, to an eye 685 of the finder viewing person. In this optical system, the shapes and positions of the optical components are so selected that the light-emitting face of said element 683 overlaps in shape and position with the image field in the view-finder. The infrared light projected to the eye 685 of the observer is reflected by a retina 686, reflected by the dichroic mirror 682 in the eyepiece lens 25, transmitted by the lens 680 and the half mirror 681 and is received by a planar photosensor 684. As the reflecting efficiency is higher in the viewing direction than in other directions, an area of the photosensor 684 receives a larger amount of light, corresponding to an area of the finder screen watched by the observer. In order to avoid the influence of infrared light eventually coming from the view-finder, there is detected the difference in the light amount distribution received by the planar photosensor 684 between the light-emitting state of the planar infrared-emitting device 683 and the deactivated state thereof, as shown in FIG. 30B, and the viewing point is detected from an area of maximum light reception in said distribution.

The result of said viewing point detection may be used for selecting the focus detecting area as explained before, or for selecting an area for spot light metering. In the above-explained structure, the planar photosensor 684 may be composed of a two-dimensional CCD sensor, or a position sensor for detecting the center of gravity of light reception. Also the planar infrared-emitting device 683 may be replaced by a two-dimensional beam scanning. Also since said detection of viewing point may be erroneously affected by the winking of the observer, the total received light is monitored and data with lowered total received light are excluded from said detection. Also the stability of detection is improved by reducing the response in time, for example by statistical treatment, in order not to follow the winking or momentary fluctuation of the viewing point.

Figure 28C:
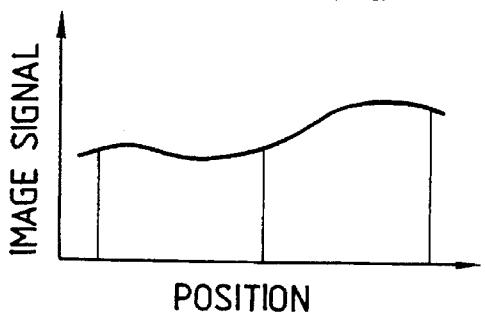
Figure 28D:
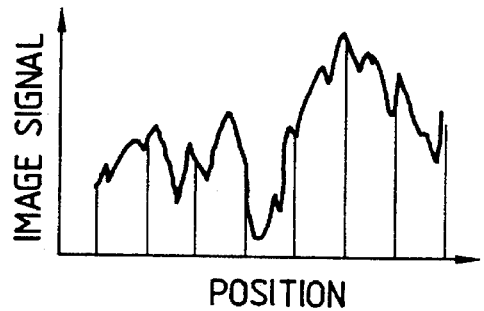

The step S040 for block division in FIG. 27 divides the focus detecting area, selected in the preceding step, into plural blocks according to the object pattern. For example, an image signal as shown in FIG. 28A or 28B is divided into plural blocks, and a contrast detection according to the equation (11) is conducted in each block. If a predetermined contrast is not obtained in any of the blocks, the object is identified as a low-frequency object, and the focus detecting area is divided into a fewer number of blocks as shown in FIG. 28C (broken lines indicating the boundaries of blocks). If said predetermined contrast is obtained in at least one block, the area is divided into a larger number of blocks as shown in FIG. 28D.

The step S045 for defocus amount calculation for each block applies the known focus detecting calculation to each of the blocks divided in the preceding step. Thus the defocus amount can be determined in each of the blocks.

The step S050 for defocus amount correction applies a correction, based on the optical aberrations of the phototaking optical system, to the defocus amount, according to the position of the block. For example, if the information on image plane curvature is sent from the lens CPU 12 in the form of coefficients $M_2$, $M_4$, . . . defining a function S (d) of the distance d from the center of image field, as indicated by:

$$S(d)=M_2 \times d^2 + M_4 \times d^4 + \ldots \quad (12)$$

the correction on the defocus amount of a block can be determined by substituting the distance dc from the center of image field to the center of said block into the equation (12).

Corrections for other aberrations can be made in a similar manner.

The step S055 for selecting final defocus amount determines a defocus amount from the above-mentioned plural defocus amounts, according to a predetermined algorithm. For example, if the selecting algorithm is based on priority in the center, there is selected the defocus amount of a block which is closest to the center of image field and in which the focus detection is possible. Also there is selected a defocus amount indicating a shortest object distance in case of priority to the shortest distance; a defocus amount indicating a longest object distance in case of priority to the longest distance; an average of the calculated defocus amounts or an average weighted by reliability in case of priority to the average; or a defocus amount with the smallest absolute value in case of priority to the current status.

Thus a defocus amount is finally determined through the above-explained steps. In the following there will be given a detailed explanation on the variations of area selection and algorithm selection in the final defocus amount selecting step.

In the manual area selection, the AF area can be selected as shown in Tab. 1, by an AF area selecting device 66 provided on the camera body.

Referring to Tab. 1, a view point detection mode selects an area based on the result obtained by said viewing point detecting device 68; a center spot mode selects a spot area at the center of image field as shown in FIG. 29A; a selected spot mode selects spot areas arbitrarily selected in the image field as shown in FIG. 29B; a wide mode selects a wide area shown in FIG. 29A; and horizontal and vertical modes select areas respectively corresponding to horizontal photosensor elements 304A, 304B or vertical photosensor elements 304C, 304D in the focus detecting optical system shown in FIG. 1. Also a center spot-wide mode selects the center spot area before focusing and then the wide AF area after in-focus state is once obtained. Such manual selection of the AF area enables the photographer to select an optimum area for the object.

Also the algorithm may be switched as indicated in the right-hand column of Tab. 1 in connection with the selection of the AF area. As plural AF areas may be selected in the view point detection mode or in the selected spot mode, the algorithm is shifted to an average priority mode to approximately focus to all the plural objects. In the center spot mode of the AF area selection, as the AF area is selected at the center of image, the algorithm is shifted to a center priority mode to focus to the object at the center or image field. Also as a wide AF area is selected in the center spot-wide mode, the wide mode or the horizontal mode, the algorithm is set at a minimum distance priority→present condition priority mode, thereby focusing to a closest object until an in-focus state is obtained and then increasing the stability by the present priority mode avoiding the unnecessary lens drive by an eventual obstacle at the even shorter distance. In the vertical mode where the AF area is relatively narrow with limited chance of appearance of an unwanted object, the algorithm is set at the minimum distance priority mode to constantly focus to an object at the shortest distance.

In case of manual algorithm selection, the algorithm can be selected as shown in Tab. 2, by an AF object selecting device 67 provided on the camera body.

Referring to Tab. 2, a center priority-present condition priority mode indicates to adopt the center priority mode before focusing and the present condition priority mode after the in-focus state is reached, and a minimum distance priority-present condition priority mode indicates to adopt the minimum distance priority mode before focusing and the present condition priority mode after the in-focus state is reached. Such manual algorithm selection enables the photographer to select an optimum algorithm for the object.

Also the AF area may be switched as indicated in the center column of Tab. 2, in connection with the algorithm selection. As the center priority mode or the minimum distance priority mode of algorithm matches better with a smaller AF area, the center spot mode is selected for the AF area. In the average priority mode, the maximum distance priority mode or the minimum distance priority-present condition priority mode of the algorithm selection, there is preferred a larger AF area so that the wide mode is selected for the AF area. In the center priority→present condition priority mode of algorithm selection, the AF area is selected at the center spot-wide mode in order to maintain a small AF area before focusing and to improve the stability with a wide AF area after the in-focus state is reached.

In the following there will be explained an embodiment in which the AF area and the algorithm are not selected by exclusive selecting devices therefor but are selected in connection with the function of a selecting device for other operations of the camera.

In connection with the selection of the light metering mode by a selecting device 71 as shown in the left-hand column in Tab. 3, among a center spot mode (light metering in a relatively narrow area at the center of image field), a selected spot mode (light metering in relatively narrow areas at arbitrary positions in image field), a partial mode (light metering in a wider area at the center of image), a center weighted mode (light metering over the entire image field with weight in the center), or a multi mode (light metering with the entire image field divided into plural areas), the AF area and the algorithm are selected as respectively indicated in the center and right-hand columns in Tab. 3. In the center spot light metering mode in which emphasis is given to the central part of the image field, the center spot AF area is selected and the center priority mode is selected for the algorithm. In the selected spot light metering mode, selecting plural positions in the image field, the selected spot mode is selected also for the AF area, and the minimum distance priority mode is selected for the algorithm. In case of the partial or center weighted light metering mode, selecting a relatively wide area, the AF area selection is set at the center spot-wide mode and the algorithm is set at the center priority-present condition priority mode. In case of the multi light metering mode where the entire image field is used for metering, the wide mode is selected for the AF area and the minimum distance priority-present condition priority mode is selected for the algorithm. In this manner satisfactory correlation is maintained between the AF area and the light metering area, and there can be improved the stability of auto focusing and the selectively for the object.

Also in connection with the selection of the auto exposure (AE) mode by a selecting device 70 as shown in the left-hand column in Tab. 4, among an aperture priority mode, a shutter speed priority mode or a programmed mode, the AF area and the algorithm may be selected as respectively shown in the center and right-hand columns. In case of the aperture priority AE mode, which is mostly used for photographing an object stopped at the center of image field, the center spot→wide mode is selected for the AF area and the center priority→present condition priority mode is selected for the algorithm, in order to improve the selectivity for the object. In case of the shutter speed priority AE mode, mostly used for a moving object, the wide mode is selected for the AF area and the minimum distance priority mode is selected for the algorithm, in order to improve the object following ability. In case of the programmed mode, often used by beginners or in snap photography, the wide AF area mode is selected and the minimum distance priority-present condition priority mode is selected for the algorithm, in order to improve the object following ability and the stability. In this manner the AF area and the algorithm optimum for the object can be selected by merely selecting the AE mode according to the object.

Also in connection with the selection of the film winding mode by a selecting device 65 as shown in the left-hand column of Tab. 5, among a single frame mode, a continuous high-speed mode, a continuous low-speed mode and a self-timer mode, the AF area and the algorithm may be respectively selected as shown in the center and right-hand columns. In case of the single frame winding mode, often used for photographing an object stopped at the center of image field, the AF area and the algorithm are respectively set at the center spot mode and the center priority mode, in order to improve the selectivity for the object. In the continuous high-speed winding mode, often used for a moving object, the AF area and the algorithm are respectively set at the wide mode and the minimum distance priority-present condition priority mode, in order to improve the object following ability and the auto focusing stability.

In case of the continuous low-speed winding mode, which is between the single frame mode and the continuous high-speed mode, the AF area is set at the center spot-wide mode while the algorithm is set at the minimum distance priority-present condition priority mode, thereby mixing the following ability and the selectivity for the object. In case of the self-timer winding mode, in which the position of the main object cannot be predicted in the image field, there are selected the wide AF area mode and the minimum distance priority algorithm, in order to securely follow the object. In this manner, mere selection of the film winding mode according to the photographing situation enables to select the optimum AF area and algorithm for said situation.

Also in connection with the selection of the photographing mode by a selecting device 64 as indicated in the left-hand column of Tab. 6, among a sports mode, a portrait mode, a snap mode, a landscape mode and a close-up mode, the AF area and the algorithm may be selected respectively as shown in the center and right-hand columns. Selection of a photographing mode automatically selects a light metering mode, an AE mode, a film winding mode and a focusing mode optimum for each photographing condition. In the sports photographing mode, mostly used for a moving object, there are selected the wide AF area and the minimum distance priority→present condition priority mode for the algorithm, for improving the object following ability. In case of the portrait photographing mode, mostly used for a stopped object, there are selected the center spot mode for the AF area and the minimum distance priority mode for the algorithm, for improving the selectivity for the object. In case of the snap photographing mode in which the object is not necessarily positioned at the center, there are selected the wide AF area mode and the minimum distance priority→ present condition priority mode for the algorithm, thereby improving the object following ability and the auto focusing stability. In case of the landscape photographing mode, in which enough time is often available for changing the image framing with focus locking after focusing with the main object at the center, there are selected the center spot mode for the AF area and the center priority mode for the algorithm, thereby improving the selectivity for the object. In case of the close-up photographing mode, in which the area of object to be focused is often narrow, there are selected the center spot AF area mode and the center priority mode for the algorithm, thereby improving the selectivity for the object. In this manner the selection of the photographing mode according to the object allows to select the optimum AF area and algorithm for said object.

Also in connection with the selection of the focusing mode by a selecting device 63 as indicated in the left-hand column of Tab. 7, among a single mode (focusing locked after focusing), a continuous mode, a focus tracking mode (correcting lens drive amount for a moving object), a power focus mode and a manual mode, the AF area and the algorithm may be respectively selected as shown in the center and right-hand columns. In case of the single focus mode, mostly used for a stopped object, there are selected the center spot mode for the AF area and the center priority mode for the algorithm, thereby improving the selectivity for the object. In case of the continuous focus mode, mostly used for a moving object, there are selected the wide mode for the AF area and the minimum distance priority-present condition priority mode for the algorithm, thereby improving the object following ability and the auto focusing stability. In case of the focus tracking mode, which is often used for an object moving closer to the camera, there are selected the center spot→wide mode for the AF area and the minimum distance priority mode for the algorithm, thereby improving the object selectivity and the object following ability. In case of the power focus mode, in which time for image frame change is not available in most cases, there are selected the wide AF area and the minimum distance priority→present condition priority mode for the algorithm, thereby improving the object following ability. In case of the manual focus mode, which is often used when an exact focusing to a part of the object is desired, there are selected the center spot mode for the AF area and the center priority mode for the algorithm, thereby improving the object selectivity. In this manner the selection of a photographing mode according to the object allows to select the AF area and the algorithm optimum for said object.

In the foregoing there has been explained the switching of the AF area and algorithm in response to the manual selection of one of various photographing modes, but a similar effect can be obtained by the switching of the AF area and algorithm in connection with an automatic selection of such photographing modes.

The switching of the AF area and algorithm may also be conducted, as shown in FIG. 8, based on the comparison of the time T elapsed from the half-stroke depression of a shutter release button 61 and a redetermined time T1. If the elapsed time T is shorter than said predetermined time T1, there are selected the center spot mode for the AF area and the minimum distance priority mode for the algorithm, thus giving emphasis to the object selectivity. If the former is equal to or longer than the latter, there are selected the wide AF area and the present condition priority mode for the algorithm, thus giving emphasis to the object following ability and the auto focusing stability.

In the following there will be explained embodiments for selecting the AF area and algorithm according to information obtained by various detecting devices of the camera itself, instead of selection by selecting devices for the camera operations.

In case information is obtained on the object distance, the AF area and algorithm may be selected as shown in the center and right-hand columns in Tab. 9, according to said information. As already known, the object distance information can be obtained for example from the defocus amount determined from the focus detection and the absolute position of the phototaking lens. When the object distance is short, the object is closed up, and the focus varies considerably depending on the position in the image field. Therefore, in order to increase the selectivity for the object, there are selected the center spot mode for the AF area and the center priority mode for the algorithm. When the object distance is long, the object appears smaller and more difficult to catch in the image field, there are selected the wide AF area and the minimum distance priority-present condition priority mode for the algorithm. If the object distance is medium, there are selected intermediate selections, namely the center spot-wide mode for the AF area and the minimum distance priority-present condition priority mode for the algorithm. In this manner optimum AF area and algorithm can be selected according to the object distance.

In case information is obtained on the photographing magnification, the AF area and algorithm may be selected as shown in the center and right-hand columns in Tab. 10, according to said information. As already known, the magnification information can be obtained, for example, from the defocus amount determined from focus detection, the absolute position of the phototaking lens, and the focal length thereof. When the magnification is large, the object appears large and the focus varies considerably depending on the position in the image field. Therefore, in order to increase the selectivity for the object, there are selected the center spot mode for the AF area and the center priority mode for the algorithm. When the magnification is small, the object appears smaller and more difficult to catch in the image field, there are selected the wide AF area and the minimum distance priority-present condition priority mode for the algorithm. If the magnification is medium, there are selected intermediate selections, namely the center spot-wide mode for the AF area and the minimum distance priority-present condition priority mode for the algorithm. In this manner optimum AF area and algorithm can be selected according to the photographing magnification.

In case information is obtained on the focal length, the AF area and algorithm may be selected as shown in the center and right-hand columns in Tab. 11, according to said information. As already known, the focal length information can be obtained, for example, from the lens information sent from the lens CPU 12. In a macro mode the object appears large and the focus varies considerably depending on the position in the image field. Therefore, in order to increase the selectivity for the object, there are selected the center spot mode for the AF area and the center priority mode for the algorithm. For a short focal length, the object appears smaller and more difficult to catch in the image field, there are selected the wide AF area and the minimum distance priority-present condition priority mode for the algorithm. For a long focal length, there are made intermediate selections, namely the center spot-wide for the AF area and the minimum distance priority-present condition priority mode for the algorithm. In this manner optimum AF area and algorith can be selected according to the focal length information.

In the above-explained selection of the AF area and the algorithm based on the object distance, magnification or focal length, the AF area and algorithm are selected for a smaller area to increase the object selectivity if the object appears larger in the image field, but for a larger area to facilitate the capture of object if the object appears smaller in the image field. It is possible also, however, to select the AF area and algorithm for a wider area if the object appears larger in the image field because the object itself is large already, thereby facilitating the capture of object and improving the auto focusing stability, and to select the AF area and algorithm for a smaller area if the object appears smaller in the image field thereby improving the selectivity for the object.

In case information is obtained on the aperture value, the AF area and algorithm may be selected as shown in the center and right-hand columns in Tab. 12, according to said information. As already known, the aperture value information can be obtained from the main CPU 60 controlling the aperture control device 83. In case the aperture value is small, requiring a higher accuracy in focusing, there are selected the center spot AF area and the center priority mode for the algorithm, thereby improving the object selectivity. In case the aperture value is large, where the depth of focus is large and does not require a high accuracy in focusing, there are selected the wide AF area and the average priority mode for the algorithm. In this manner there are selected optimum AF area and algorithm according to the aperture value information.

In case information is obtained on the shutter speed, the AF area and algorithm may be selected as shown in the center and right-hand columns in Tab. 13, according to said information. As already known, the shutter speed information can be obtained from the main CPU 60 controlling the shutter speed control device 82. For a high shutter speed, which is often used for a moving object, there are selected the wide AF area and the minimum distance priority-present condition priority mode for the algorithm, in order to improve the object capturing ability. For a low shutter speed, often used for a stopped object, there are selected the center spot AF area and the center priority-present condition priority mode for the algorithm, thereby improving the object selectivity. In this manner optimum AF area and algorithm can be selected according to the shutter speed information.

In case information is obtained on the object luminance, the AF area and the algorithm may be selected as shown in the center and right-hand columns in Tab. 14, according to said information. As already known, the object luminance information can be obtained, for example, from the result of luminance detection by the main CPU 60 based on the output of the light metering sensor 86. In case of a high luminance, where the object can be clearly identified in most cases, there are selected the center spot AF area and the center priority mode for the algorithm, thus giving emphasis on the object selectivity. In case of a low luminance, where the object may not be clearly identifiable, there are selected the wide AF area and the minimum distance priority mode for the algorithm, giving emphasis to the object capturing ability. In this manner optimum AF area and algorithm can be selected according to the object luminance information.

In case information is obtained on the electronic flash, the AF area and the algorithm may be selected as shown in the center and right-hand columns in Tab. 15, according to said information. As already known, the electronic flash information can be obtained by communication with the main CPU 60 controlling the built-in electronic flash unit or with a CPU incorporated in the electronic flash unit. In case the electronic flash is not used, the object is of a high luminance and is clearly identifiable in most cases, so that selected are the center spot AF area and the center priority mode for the algorithm, thereby giving emphasis to the object selectivity. In case the electronic flash is used, the object is of a low luminance and is not clearly identifiable in most cases, so that there are selected the wide AF area and the minimum distance priority mode for the algorithm, thus giving emphasis to the object capturing ability. In this manner optimum AF area and algorithm can be selected according to the electronic flash information.

In case information is obtained on the aberrations of the phototaking optical system, the AF area and the algorithm may be selected as shown in the center and right-hand columns in Tab. 16, according to said information. As already known, the aberration information can be obtained, for example, from the lens information supplied by the lens CPU 12. In case the difference in aberration between the axial and peripheral positions is large (for example a large image plane curvature), there are selected the center spot AF area and the center priority mode for the algorithm, because the focus detection on or near the axial position provides better accuracy. If said difference is small, there are selected the wide AF area and the minimum distance priority-present condition priority mode for the algorithm, since enough accuracy can be obtained even by the focus detection in the peripheral area. In this manner optimum AF area and algorithm can be selected according to the aberration information.

In case information is obtained on the camera body position, the AF area and the algorithm may be selected as shown in the center and right-hand columns in Tab. 17, according to said information. As already known, the body position information can be obtained, for example, from a position detecting device 69, such as a mercury switch, provided in the camera body. In case of vertical body position, as the focus detection in the vertical direction has a higher probability of object detection, the vertical photosensor elements shown in FIG. 1 are selected as the AF area, and the minimum distance priority mode is selected for the algorithm. In the horizontal body position, as the focus detection in the horizontal direction has a higher probability of object detection, the horizontal photosensor elements shown in FIG. 1 are selected as the AF area, and the minimum distance priority-present condition priority mode is selected for the algorithm. In this manner optimum AF area and algorithm can be selected according to the body position information.

In the following there will be explained embodiments in which the AF area and the algorithm are selected according to the result of focus detection or according to the object image data.

In case information is obtained on the object pattern, the AF area and the algorithm may be selected as shown in the center and right-hand columns in Tab. 18, according to said information. The object pattern information can be obtained in the AF calculating CPU 40 itself, for example by applying the equations (11) to the image data for focus detection. If the object pattern has a high contrast, the object can be clearly identifiable in most cases, so that there are selected the center spot AF area and the center priority mode for the algorithm, giving emphasis to the object selectivity. In case of a low contrast, where the object may not be clearly identifiable, there are selected the wide AF area and the minimum distance priority-present condition priority mode for the algorithm, in order to give emphasis to the object capturing ability. In this manner optimum AF area and algorithm can be selected according to the object pattern information.

In case information is obtained on the defocus amount, the AF area and the algorithm may be selected as shown in the center and right-hand columns in Tab. 19, according to said information. The defocus information can be obtained, for example, from the AF calculating CPU 40 itself executing the focus detecting calculation. If the defocus amount is small, the object is clearly identifiable in most cases, and there is required a limited mutual displacement of the image data in the correlation calculation for focus detection. Consequently there are selected the center spot AF area and the center priority mode for the algorithm, thus giving emphasis to the object selectivity. In case of a large defocus, where the object is often not clearly identifiable and the mutual displacement of image data becomes larger in the correlation calculation for focus detection, there are selected the wide AF area and the minimum distance priority mode for the algorithm, in order to give emphasis to the object capturing ability. In this manner optimum AF area and algorithm can be selected according to the defocus information.

In the foregoing there has been explained the selection of the AF area and the algorithm in relation to various conditions, but it is also possible to alter various discriminating conditions in the AF calculation according to such conditions. For example, the parameters C(km) and SLOP determined in the equations (6) are capable of determining the reliability of the defocus amount DEF, and can therefore be used for discriminating whether the focus detection is possible or not, as shown in the relations (13):

$$C(km) > Cs \text{ or } SLOP < Ss \ldots \text{ detection impossible}$$

$$C(km) \leq Cs \text{ and } SLOP \geq Ss \ldots \text{ detection possible} \quad (13)$$

Consequently, the discrimination of the status of focus detection optimum for said conditions can be realized by varying the values Cs, Ss in (13) in relation to said conditions. More specifically said values are selected tightly (smaller Cs and larger Ss) in a state where exact focus detection is possible or necessary (small AF area; algorithm in center priority mode or minimum distance priority mode; spot light metering mode; aperture value priority AE mode; single film winding mode; portrait photographing mode; single focusing mode; short object distance; high photographing magnification; long focal length; small aperture value; fast shutter speed; high luminance; small difference in aberrations; high contrast; or small defocus amount), and said values are selected loosely (larger Cs and smaller Ss) if exact focus detection is not possible or unnecessary (large AF area; present condition priority algorithm mode; multi light metering mode; programmed AE mode; continuous film winding mode; sports photographing mode; continuous focusing mode; long object distance; small photographing magnification; short focal length; large aperture value; slow shutter speed; low luminance; large difference in aberrations; low contrast; or large defocus amount).

It is also possible to vary the reference values Ns, Ws (>Ns) in focus detecting relations shown in (14), according to the above-mentioned conditions:

|DEF| (not during focusing)>Ns;

|DEF| (during focusing)>Ws . . . not in-focus

|DEF| (not during focusing)≦Ns;

|DEF| (during focusing)≦Ws . . . in-focus

More specifically, said values are selected tightly (smaller Ns and Ws) if exact focus detection is possible or required and emphasis is given to accuracy than to response (small AF area; center priority or minimum distance priority algorithm mode; spot light metering mode; aperture value priority AE mode; single film winding mode; portrait photographing mode; single focusing mode; short object distance; high photographing magnification; long focal length; small aperture value; fast shutter speed; high luminance; small difference in aberrations; high contrast; or small defocus amount), and said values are selected loosely (larger Ns and Ws) if exact focus detection is not possible or emphasis is given to response than to accuracy (large AF area; present condition priority algorithm; multi light metering mode; programmed AE mode; continuous film winding mode; sports photographing mode; continuous focusing mode; long object distance; small photographing magnification; short focal length; large aperture value; slow shutter speed; low luminance; large difference in aberrations; low contrast; or large defocus amount).

It is furthermore possible, in a predicted drive technology disclosed in the Japanese Patent Application Sho 63-247829 of the present applicant (in which a correction for object movement is added to the lens drive amount in auto focusing by detecting the axial movement of the object), to vary the discriminating reference values for a moving object (parameters α, δ, r and k in steps 450, 510 and 515 in FIG. 15 of the specification of said patent application) according to the above-mentioned conditions. More specifically, said values are so selected to preclude the predicted drive (larger δ, k and smaller α, r) in case of photographing a stopped object or emphasis being given to stability than to response (small AF area; center priority or minimum distance priority algorithm mode; spot light metering mode; aperture value priority AE mode; single film winding mode; portrait photographing model single focusing mode; short object distance; high photographing magnification; long focal length; small aperture value; slow shutter speed; low luminance; large difference in aberrations; low contrast; or small defocus amount), and said values are selected loosely (smaller δ, k and larger α, r) in case of photographing a moving object of emphasis being given to response than to stability (large AF area; present condition priority algorithm mode; multi light metering mode; programmed AE mode; continuous film winding mode; sports photographing mode; continuous focusing mode; long object distance; small photographing magnification; short focal length; large aperture value; fast shutter speed; high luminance; small difference in aberrations; high contrast; or large defocus amount). Thus, when the tracking mode is selected by a focus mode selecting device 63, the AF calculating CPU 40 discriminates a moving object and, upon identifying a moving object, adds a correction for the moving object to the defocus amount.

Function of Lens Drive Control CPU

When the AF calculating CPU 40 determines the final defocus amount and detects the focus state through the procedure shown in FIG. 27, the information on said defocus amount and focusing state (detection impossible or in-focus state) is sent to the lens drive control CPU 50 shown in FIG. 26. When an AF (single, continuous, or tracking) mode is selected by the selecting device 63, said CPU 50 calculates the lens drive amount to the in-focus point, based on said defocus amount, and drives the AF motor 51 in a direction to bring the photographing lens 11 toward the in-focus point. The rotation of said AF motor is transmitted through a body transmission system 52, composed of gears provided in the camera body, a clutch B53, a camera body coupling 54 and a lens coupling 18 provided at the mounting portions of the camera body 20 and the lens 10, and a lens transmission system 13 composed of gears provided in the lens, and finally drives the phototaking lens 11 toward the in-focus position. The drive amount of the AF motor 51 is converted from the rotational amount of gears constituting the body transmission system 52 into a pulse train signal by an encoder 55 composed for example of a photointerruptor, and fed back to the lens drive control CPU 50. Said CPU 50 detects the drive amount and drive speed of the AF motor 51 by measuring the number and interval of said pulses, and controls the AF motor 51 in such a manner that the lens is stopped exactly at the in-focus position.

When the power focus mode is selected by the focus mode selecting device 63, the lens drive control CPU 50 receives the direction, amount and speed of movement of a distance ring 15 of the lens 10, through an encoder 16 composed for example of a photointerruptor, a lens contact 19B and a camera body contact 59B, both provided in the mounting portion of the camera body 20 and the lens 10. Said moving direction can be identified by generating two signals by monitoring the movement of said ring with a phase difference of 90° and detecting the phase relationship of said signals. Based on these information, there are determined the amount, speed and direction of lens drive, and the AF motor 51 is controlled in a similar manner as in the AF mode, thereby moving the lens 11 corresponding to the movement of the lens distance ring.

In the AF mode and power focusing mode explained above, as the power for lens drive is supplied by the AF motor 51, the lens drive control CPU 50 maintains the clutch B53 in coupled state by a clutch control device 56, thereby transmitting the rotation of said motor 51 to the lens, and disconnects a clutch L14 of the lens 11 through contacts 19A, 59A provided in the lens mount portion, thereby preventing the movement of the lens distance ring 15 from being transmitted to the lens transmission system 13. The amount and speed of movement of the lens is monitored by the encoder 55 which monitors the movement of the lens transmission system 52, but such method may result in an error because of gear backlashes in the relative long transmission path from the camera body to the lens. In order to avoid this drawback, it is also possible to provide an encoder 17 for monitoring the movement of the lens transmission system 13, thereby directly monitoring the movement of the lens 11, and to feed thus obtained monitor signal to the lens drive control CPU 50 through the contacts 19C, 59C provided in the lens mount portion thus achieving more exact control on the amount and speed of movement of the lens.

When the manual mode is selected by the selecting device 6 3, as the lens driving power is supplied by the lens distance ring 15, the lens drive control CPU 50 disconnects the clutch B53 by the control device 56, thereby preventing the rotation of the AF motor 51 from being transmitted to the lens, and maintains the clutch L14 of the lens in connected state through the contacts 19A, 59A of the lens mounting portion, thereby transmitting the rotation of the lens distance ring 15 to the lens transmission system 13.

Figure 31:
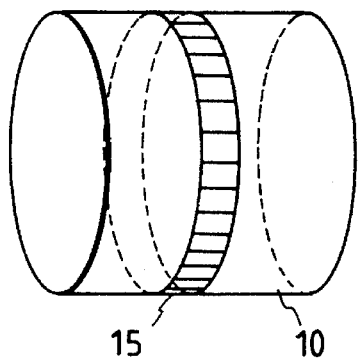
FIG. 31 is a view of a distance ring for lens focusing.

In the foregoing explanation, the power focusing mode and the manual focusing mode are selected by the focus mode selecting device 63 provided on the camera body, but it is also possible to provide a touch sensor device 41, as shown in FIG. 31, for detecting that the distance ring 15 is touched by the photographer for focusing of the lens 10, and to switch the focusing mode to the power focusing mode or manual focusing mode upon detection by said sensor 41 that said distance ring 15 is touched or manipulated by the photographer, and to another mode selected by the selecting device 63 in the absence of such detection. Such structure improves the convenience of operation, since, when the photographer wishes focusing in the power focus mode or manual mode, he need not to manipulate the selecting device 63 but has only to operate the distance ring as in the conventional manual focusing operation.

The aforementioned AF modes require exact control the lens drive amount, and such exact control generally necessitates a low drive speed in the vicinity of the in-focus position, The drive speed control of the lens is generally achieved by on/off pulse control of the AF motor 51 and by varying the duty ratio of-said pulses. Also such speed control can be achieved, as disclosed in the Japanese Laid-open Patent Sho 57-46216 of the present applicant, by dividing the deviation from the in-focus position to the current lens position into a certain number of zones and maintaining a constant drive speed in each zone. However, in such speed control method in which the speed is gradually reduced stepwise in plural zones, there results unnecessary speed control, eventually leading to a long time required to reach the in-focus position.

Figure 32:
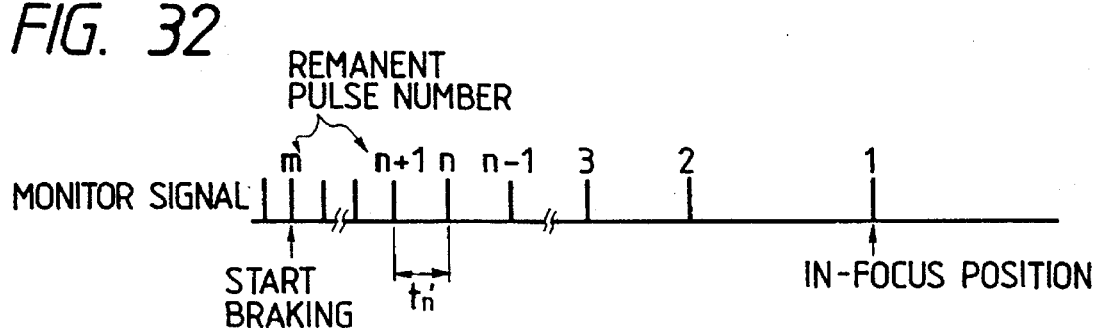
FIG. 32 is a chart showing monitor signals in case the lens is theoretically stopped at the in-focus position by brake application at m remaining pulses in front of the in-focus position.
Figure 34:
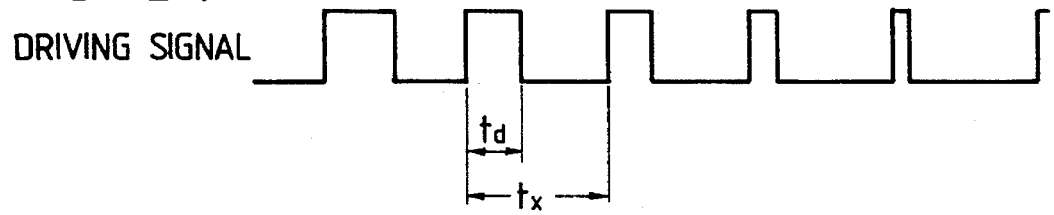
FIG. 34 is a chart showing drive signals for an AF motor.
Figure 33:
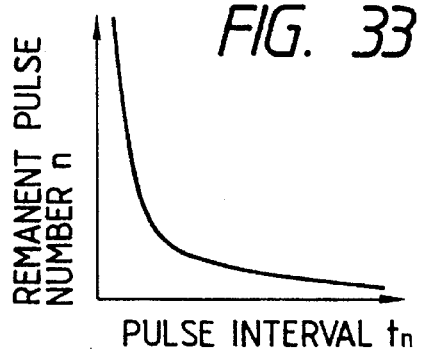
FIG. 33 is a chart showing the relation between the remaining pulse number n and the pulse interval tn.

In general, the stopping characteristics of a motor is represented by the equations (15), indicating that the revolution of the motor decreases exponentially:

$$N(t)=N0 \times \exp(-t/T0)$$

$$Wt=T0 \times N0 \qquad (15)$$

wherein N(t) is the rotating speed of the motor, N0 is the revolution at the start of braking, t is time, T0 is a time constant, and WT is the amount of rotation from the start of braking to the stopped state. Ideally, therefore, the motor can be stopped, with the applied braking, at the desired stop position if the braking is started when the remaining amount of rotation to said desired stop position becomes equal to WT. Though the behavior of actual lenses differ from the equations (15) for example due to fluctuations in the driving torque, the stopping at the desired stop position can be achieved within a shortest time by a control in which the rotating speed Nr at deceleration is proportional to the remaining amount Wr of rotation, such as Nr=Wr/T0. In the AF drive control, the remaining drive amount to the in-focus position can be determined by subtracting the number of pulses, generated by the encoder 16 or 55 from the start point of braking, from the amount of drive (number of pulses) from the braking start position to the in-focus position, and the drive speed can be determined from the interval of pulses. FIG. 32 shows the monitor signals in case the braking is applied at a point with remaining pulses m in front of the in-focus point, to the AF motor in full speed rotation, for theoretical stopping at the in-focus point. In such case, the in-focus point can be reached within a short time even in the presence of certain fluctuation in the stopping characteristics, by controlling the AF motor in such a manner that the pulse internal tn at the remaining pulses n is inversely proportional to the remaining pulses, as shown in the equation (16):

$$tn=t0/n \qquad (16)$$

wherein the time constant t0 is a theoretically determined value for each lens drive system. Consequently, the remaining pulse number n and the pulse interval tn are mutually correlated as shown in FIG. 33. Thus, if the pulse interval tn', measured at the remaining pulses n, is shorter or longer than the theoretical pulse interval tn shown in FIG. 33, the driving speed is respectively reduced or increased. The driving speed can be increased or decreased by varying the on/off duty ratio of the drive signal for the AF motor. For example, in drive signals shown in FIG. 34, the drive speed can be varied by increasing or decreasing the on-time td while maintaining the cycle time tx constant.

Figure 35:
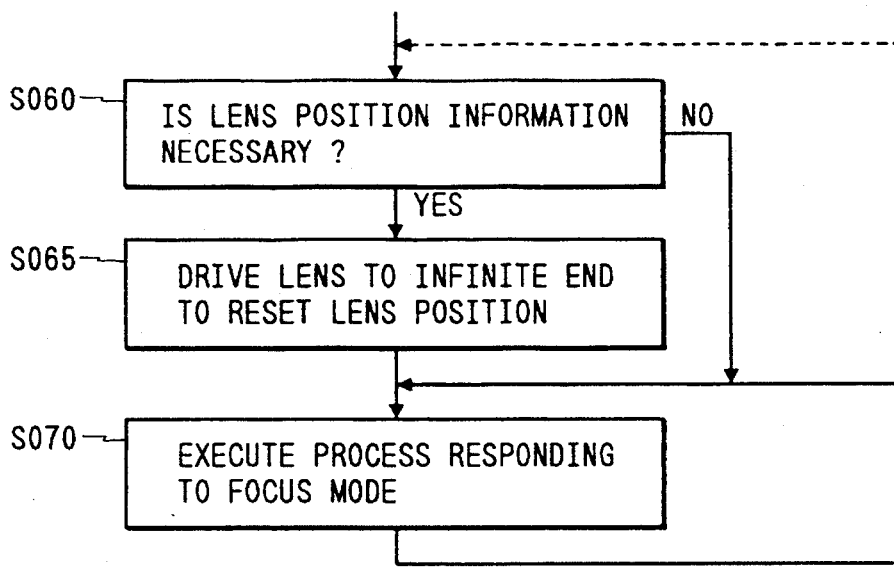
FIG. 35 is a flow chart of the control sequence of a lens drive control CPU.

In the following there will be explained the function of the lens drive control CPU 50 with reference to FIGS. 35 to 38. Referring to FIG. 35, upon start of power supply, a step S060 discriminates whether the lens position information is necessary, and, if necessary, a step S065 retracts the lens to the end position corresponding to the infinite object distance, and, taking said position as the lens reset position, measures the amount of lens advancement from said position by counting the encoder pulses. If said information is not required, the step S065 is omitted. Then a step S070 repeats an operation according to the focusing mode selected by the selecting device 63. However, if the focusing mode is varied, the sequence returns to the step S060. In the conventional process, the lens is always retracted even when the lens position information is not required, so that the photographer has to wait until the completion of lens retraction, even if a photographing operation is desired immediately after the start of power supply. The above-explained procedure avoids this drawback, since the lens is retracted only when the lens position information is required (for example for varying the AE or AF mode or parameters according to the lens position).

Figure 36:
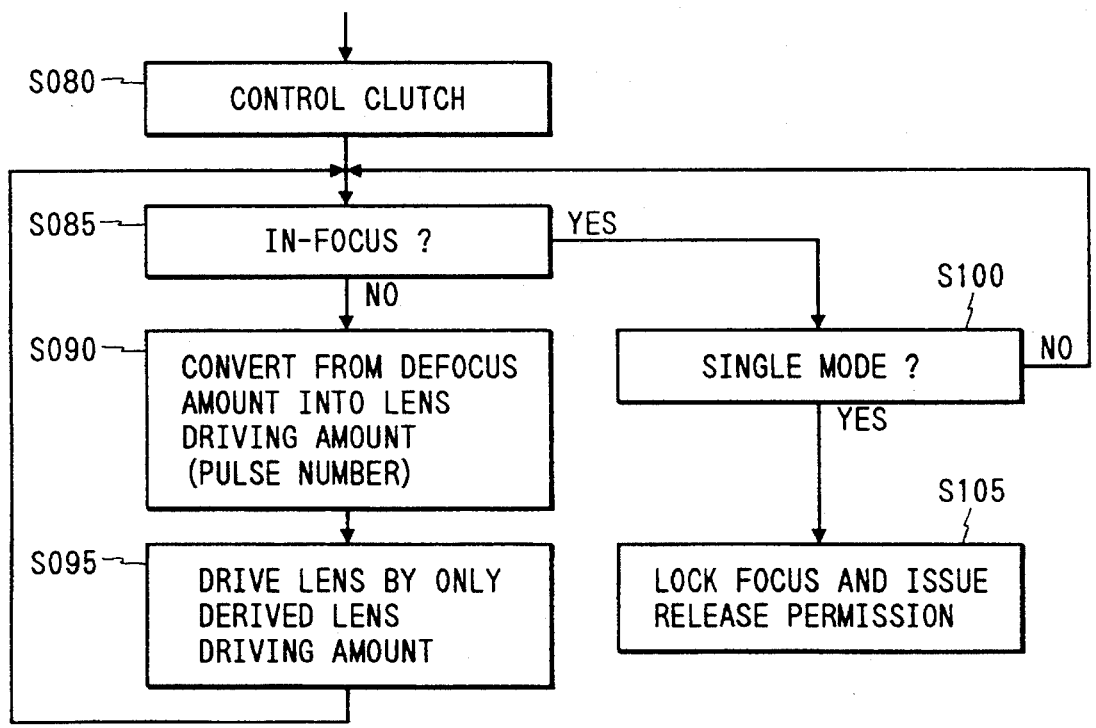
FIG. 36 is a flow chart of the control sequence in an AF drive mode.

FIG. 36 is a flow chart in the AF (single, continuous or tracking) mode. At first a step S080 executes clutch control so as to transmit the rotation of the AF motor to the phototaking lens and to disconnect the distance ring 15 therefrom. Then a step S085 discriminates whether the focus detection by the AF calculating CPU 40 has provided an in-focus state, and, if not, a step S090 converts the defocus amount into a lens drive amount. Then a step S095 drives the lens by the AF motor 51 corresponding to said drive amount, and, upon completion of said drive, the sequence returns to the step S085. If the in-focus state is identified in the step S085, a step S100 discriminates whether the single mode has been selected, and, if not, the sequence returns without lens drive to the step S085 to await the result of next focus detection. If the single mode has been selected, a step S105 locks the focusing thereby inhibiting the lens drive thereafter, and allows the main CPU 60 to release the shutter. The sequence thereafter returns to the step S085 in response to the turning-off of the half-stroke depression of the shutter release button 61 or to the shutter operation.

Figure 37:
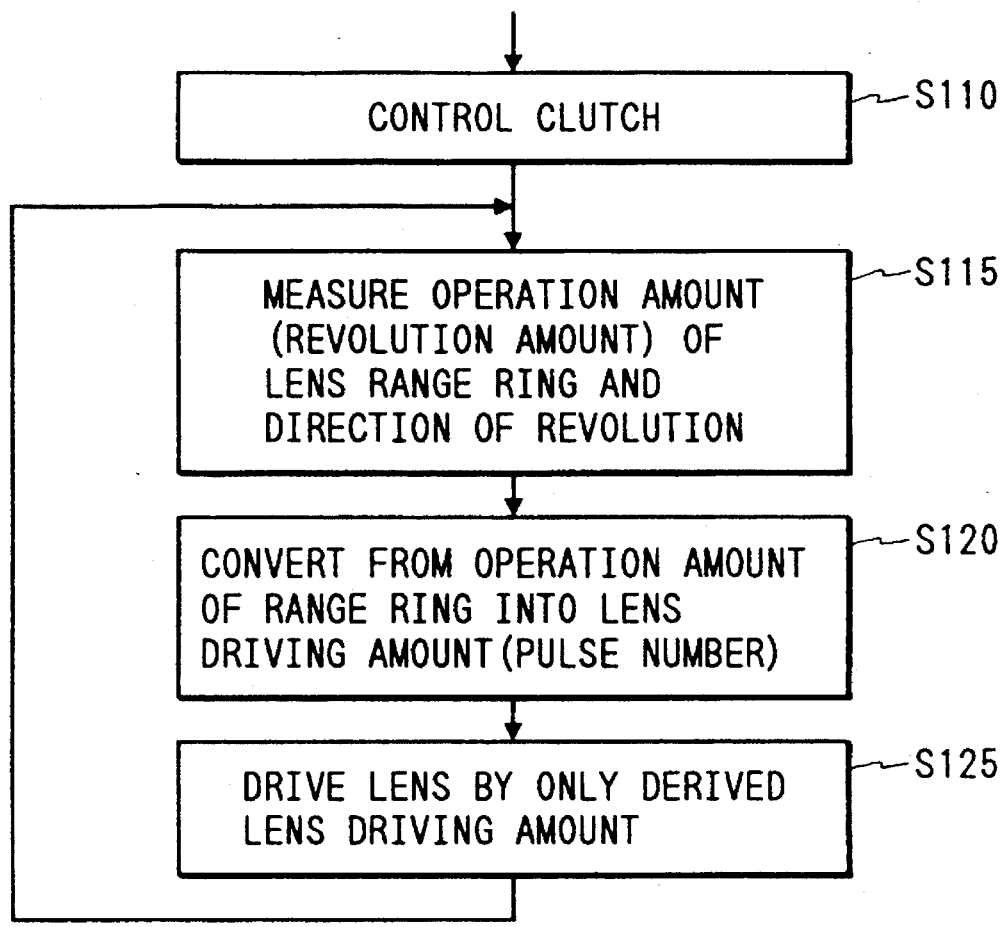
FIG. 37 is a flow chart of the control sequence in a power focus mode.

FIG. 37 shows a flow chart in the power focusing mode. A step S110 executes the clutch control, thereby transmitting the rotation of the AF motor 51 to the phototaking lens and disconnecting the distance ring 15 therefrom. A step S115 measure the amount and direction of movement of said distance ring 15, then a step S120 converts said amount of movement into a lens drive amount, and a step S125 drives the lens by the AF motor 51 corresponding to said drive amount. Thereafter the sequence returns to the step S115.

Figure 38:
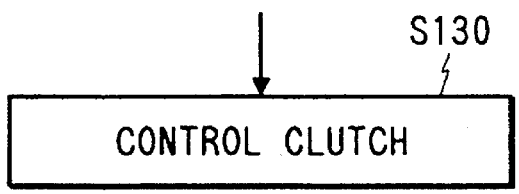
FIG. 38 is a flow chart of the control sequence in a manual mode.

FIG. 38 is a flow chart in the manual mode, in which a step S130 controls the clutch thereby transmitting the movement of the distance ring 15 to the phototaking lens and disconnecting the AF motor 51 therefrom. In the foregoing explanation of the function of the lens drive control CPU 50, the focusing modes are selected by the focus mode selecting device 63. In the following there will be explained embodiments in which the focusing modes are not selected by an exclusive selecting device but in relation to the function of a selecting device used for selecting other functions of the camera.

In case the AF area is selected by the selecting device 66 as shown in the left-hand column of Tab. 20, among the view point detection, center spot, selected spot, wide, and center spot-wide modes, the focusing mode may be selected in connection, as shown in the right-hand column. In case of the center spot or selected spot mode for the AF area, which is mostly used for photographing an object stopped in a certain point in the image field, the single focusing mode is selected to give emphasis to the stability. In case of the view point detection or wide mode for the AF area, where the object often changes one to another, the continuous focusing mode is selected in order to give emphasis to response. In case of the center spot→wide mode for the AF area, which is mostly used for a moving object, the tracking focus mode is selected in order to give emphasis to the object following ability. In this manner the AF area and the focusing mode are well matched and there can be improved the stability and response of auto focusing.

Also in connection with the selection of algorithm by the object selecting device 67 as shown in the left-hand column of Tab. 21, among the center priority, minimum distance priority, average priority, maximum distance priority, minimum distance priority→present condition priority, and center priority→present condition priority modes, the focusing mode may be selected as shown in the right-hand column. In case of the center priority or maximum distance priority mode of the algorithm, which is mostly used for photographing an object stopped at a certain point in the image field, the single focusing mode is selected in order to give emphasis to the stability. In the average priority, minimum distance priority→present condition priority, or center priority→present condition priority mode of the algorithm, where the object often changes from one to another, the continuous focusing mode is selected in order to give emphasis to the response. In the minimum distance priority mode of the algorithm, which is mostly used for a moving object, the tracking focus mode is selected in order to give emphasis to the object following ability. In this manner the algorithm and the focusing mode can be well matched, and there can be improved the stability and response of auto focusing.

Also in connection with the selection of the light metering mode by the mode selecting device 71 as shown in the left-hand column of Tab. 22, among the center spot, selected spot, partial, center weighted and multi modes, the focusing mode may be selected as shown in the right-hand column. In case of the center spot or selected spot light metering mode, which is mostly used for photographing an object stopped at a certain point in the image field, there is selected the single focusing mode for giving emphasis to the stability. In case of the partial or center weighted light metering mode, where the object may change from one to another, the continuous focusing mode is selected in order to give emphasis to the response. In case of the multi light metering mode, mostly used for a moving object, the tracking focus mode is selected for giving emphasis to the object following ability. In this manner the selection of the light metering mode according to the object allows to select the focusing mode optimum for said object.

Also in connection with the selection of the AE mode by the mode selecting device 70 as shown in the left-hand column of Tab. 23, among the aperture priority, shutter speed priority and programmed modes, the focusing mode may be selected as shown in the right-hand column. In case of the aperture priority AE mode, often used for photographing an object stopped in a certain point in the image field, the single focusing mode is selected for giving emphasis to the stability. In case of the programmed AE mode, in which the object often changes one to another, the continuous focusing mode is selected for giving emphasis to the response. In case of the shutter speed priority AE mode, often used for a moving object, the tracking focus mode is selected for giving emphasis to the object following ability. In this manner the selection of the AE mode according to the object enables to select a focusing mode optimum for said object.

In case the film winding mode is selected by the mode selecting device 65 as shown in the left-hand column of Tab. 24, among the single frame, continuous high-speed, continuous low-speed and selftimer modes, the focusing mode may be selected as shown in the right-hand column. In case of the single winding mode, often used for photographing an object stopped at a certain point in the image field, the single focusing mode is selected for emphasizing the stability. In case of the selftimer winding mode, in which the object may be added afterwards, the continuous focusing mode is selected for giving emphasis to the response. In case of the continuous high-speed or continuous low-speed winding mode, often used for a moving object, the tracking focus mode is selected in order to give emphasis to the object following ability. In this manner the selection of the film winding mode according to the object enables to select a focusing mode optimum for said object.

Also in connection with the selection of the photographing mode by the mode selecting device 64 as shown in the left-hand column of Tab. 25, among the sports, portrait, snap, landscape and closeup modes, the focusing mode may be selected as shown in the right-hand column. In case of the portrait or landscape photographing mode, which is often used for photographing an object stooped at a certain point in the image field, the single focusing mode is selected for giving emphasis to the stability. In case of the snap or closeup photographing mode, in which the object often changes from one to another, the continuous focusing mode is selected for giving emphasis to the response. In case of the sports photographing mode, mostly used for a moving object, the tracking focus mode is selected in order to give emphasis to the object following ability. In this manner the selection of the photographing mode according to the object enables to select a focusing mode optimum for said object.

In the foregoing there has been explained the switching of the focusing mode in response to the manual selection of various modes for photographing, but a similar effect can also be obtained in case of automatic switching of such various modes for photographing, by switching the focusing mode in response.

Furthermore, the focusing mode may be switched based on the comparison of the time T, elapsed from the start of half-stroke depression of the shutter release button 61, with a predetermined time T1. In such case, if the elapsed time T is shorter than the predetermined time T1, the continuous or tracking focusing mode is selected, emphasizing the response to the moving object, and, if the former is longer, the single focusing mode is selected in consideration of the stability of auto focusing.

In the following there will be explained embodiments in which the focusing mode is selected not in relation to the operation of a selecting device of the camera but according to the result of detection by various detecting devices provided on the camera itself.

In case information is obtained on the object distance, the focusing mode may be selected as shown in the right-hand column of Tab. 27, according to said information. As already known, the object distance information can be obtained, for example, from the defocus amount as the result of focus detection and the absolute position of the phototaking lens. In case of a short object distance, which is often used for photographing an object stopped at a certain point in the image field, the single focusing mode is selected for giving emphasis to the stability. In case of a medium object distance, where the object often varies from one to another, the continuous focusing mode is selected for giving emphasis to the response. In case of a long object distance, in which the object is often moving, the tracking focus mode is selected for giving emphasis to the object following ability. In this manner the focusing mode can be selected according to the object distance.

In case information is obtained on the photographing magnification, the focusing mode may be selected as shown in the right-hand column of Tab. 28, according to said information. In case of a large magnification, which is often used for photographing an object stopped at a certain point in the image field, the single focusing mode is selected for giving emphasis to the stability. In case of a medium magnification, where the object often changes from one to another, the continuous focusing mode is selected for giving emphasis to the response. In case of a small magnification, in which the object is often moving, the tracking focus mode is selected for giving emphasis to the object following ability. In this manner the focusing mode can be selected according to the photographing magnification.

In case information is obtained on the focal length, the focusing mode may be selected as shown in the right-hand column of Tab. 29, according to said information. In case of a short focal length, which is often used for photographing a stopped object such as a landscape, the single focusing mode is selected for giving emphasis to the stability. In case of a long focal length, which is often used for a moving object, the continuous or tracking focus mode is selected for emphasizing the response. In case of a macro focal length, where the point to be focused often varies according to the intention of the photographer, the manual or power focusing mode is selected, thereby giving emphasis to the selectivity of object. In this manner an optimum focusing mode can be selected according to the focal length.

In case information is obtained on the aperture value, the focusing mode may be selected as shown in the right-hand column of Tab. 30, according to said information. In case of a small aperture value, which is often used for photographing a stopped object such as a landscape or a person, the single focusing mode is selected thereby giving emphasis to the stability. In case of a large aperture value, often used for a moving object, the continuous or tracking focus mode is selected, in order to give emphasis to the response. In this manner an optimum focusing mode can be selected according to the aperture value information.

In case information is obtained on the shutter speed, the focusing mode may be selected as shown in the right-hand column of Tab. 31, according to said information. In case of a low shutter speed, which is mostly used for photographing a stopped object such as a landscape or a person, the single focusing mode is selected thereby giving emphasis to the stability. In case of a high shutter speed, which is mostly used for a moving object, the continuous or tracking focus mode is selected, giving emphasis to the response. In this manner an optimum focusing mode can be selected according to the shutter speed information.

In case information is obtained on the object luminance, the focusing mode may be selected as shown in the right-hand column of Tab. 32, according to said information. In case of a low luminance, which is often encountered in photographing a stopped object such as a landscape or a person, the single focusing mode is selected in order to give emphasis to the stability. In case of a high luminance, often encountered in photographing a moving object, the continuous or tracking focusing mode, thereby giving emphasis to the response. In this manner an optimum focusing mode can be selected according to the luminance information.

In case information is obtained on the use of electronic flash, the focusing mode may be selected as shown in the right-hand column of Tab. 33, according to said information. In case of electronic flash emission, which is often used for photographing a stopped object such as a person, the single focusing mode is selected in order to give emphasis to the stability. In case of absence of electronic flash emission, where the object is often moving, there is selected the continuous or tracking focusing mode in order to give emphasis to the response. In this manner an optimum focusing mode can be selected acording to the electronic flash information.

In case information is obtained on the aberrations of the phototaking optical system, the focusing mode may be selected as shown in the right-hand column of Tab. 34, according to said information. In case of a large difference between the axial and peripheral aberrations, which is unsuitable for photographing with an AF mode, the manual or power focusing mode is selected. In case of a small difference, which is suitable for photographing with an AF mode, the single, continuous or tracking focusing mode is selected. In this manner an optimum focusing mode can be selected according to the aberration information.

In the following there will be explained embodiments in which the focusing mode is selected according to the result of focus detection or the image data.

In case information is obtained on the focus state, the focusing mode may be selected as shown in the right-hand column of Tab. 35, according to said information. Before the in-focus state is reached, the single focusing mode is selected for executing photographing with an AF mode. After the in-focus state is reached, the manual or power focusing mode is selected in order to enable a fine focus adjustment by the photographer. In this manner an optimum focusing mode can be selected according to the focus state information.

In case information is obtained on the detection propriety, the focusing mode may be selected as shown in the right-hand column of Tab. 36, according to said information. In case the focus detection is possible, the single or continuous focusing mode is selected in order to enable photographing with an AF mode. In case the focus detection is impossible, the manual or power focusing mode is selected in order to enable focusing by the photographer. In this manner an optimum focusing mode can be selected according to the information on detection propriety.

In case information is obtained on the objected pattern, the focusing mode may be selected as shown in the right-hand column of Tab. 37, according to said information. In case of a low object contrast, which is unsuitable for photographing a moving object, the single focusing mode is selected in order to give emphasis to the stability. In case of a high contrast, which is suitable for photographing a moving object, the continuous or tracking focusing mode is selected in order to give emphasis to the response. In this manner an optimum focusing mode can be selected according to the object pattern information.

In case information is obtained on the defocus amount, the focusing mode may be selected as shown in the right-hand column of Tab. 38, according to said information. In case of a large defocus amount, the continuous focusing mode is selected, giving emphasis to the response. In case of a small defocus amount, the single focusing mode is selected giving emphasis to the stability. In this manner an optimum focusing mode can be selected according to the defocus information.

Function of Main CPU

Referring to FIG. 26, the camera body 20 incorporates a main CPU 60 for mainly controlling the camera sequence and the exposure operation. Said main CPU 60 obtains the object luminance from a light metering sensor 86 and exposure setting information such as film sensitivity, aperture value, shutter speed etc. from unrepresented setting devices, determines the aperture value and the shutter speed based on these information, and displays these information on a display device 85. In the photographing operation, it also controls the up-down movement of a main mirror 21 by a mirror control device 81, the function of a diaphragm aperture mechanism by an aperture control device 83 and the function of a shutter mechanism by a shutter control device 82. Also after the photographing operation, it controls the function of a film winding-charging mechanism by a winding-charging control device 84, in preparation for the next phototaking operation. The main CPU 60 is also linked with various camera operation device 80, lens CPU 12, lens drive control CPU 50, AF calculating CPU 40 and AF detection system controlling CPU 33, thus receiving information necessary for the camera sequence and the exposure control from other CPU's and sending camera sequence information to other CPU's. For example, in case the single focusing mode is selected, the shutter releasing operation is controlled by a release enabling instruction supplied from the lens drive control CPU 50.

Also the main CPU 60 is connected with the AF detection system controlling CPU 33 and the memory 34, so that the object luminance information can be obtained not only from the exclusive light metering sensor 86 but also from the image data used for focus detection and the charge accumulating time of the photoelectric converting device. For example the object luminance can be determined from Bv/Tv, wherein Bv is the average value of data in an image area used for light metering, and Tv is the charge accumulating time.

The object image area used for light metering can be selected as follows. For example, the areas shown in FIG. 29A or 29B may be used as light metering areas, according to the operation of the AF area selecting device 66 or the function of the view point detecting device 68. In this manner the AF area always coincides with the light metering area, so that the focus and exposure can be optimized to a same object. Also in case a loss in the peripheral light amount is detected by the AF detection system controlling CPU 33 or the AF calculating CPU 40, whereby the image data area used for focus detection is limited, the image data area to be used for light mete ring may be limited accordingly.

Function of Image Display Control CPU

Referring to FIG. 26, the camera body 20 also incorporates an image display control CPU 90 for controlling the information display relating to focus detection. Said CPU 90 obtains focus detection information (focus detection area, selected point, in-focus/out-of-focus, focusing direction etc.) from the AF calculating CPU 40 and displays said information on a display device 92. The display may be manually turned on or off by a display selecting device 91.

Figure 39A:
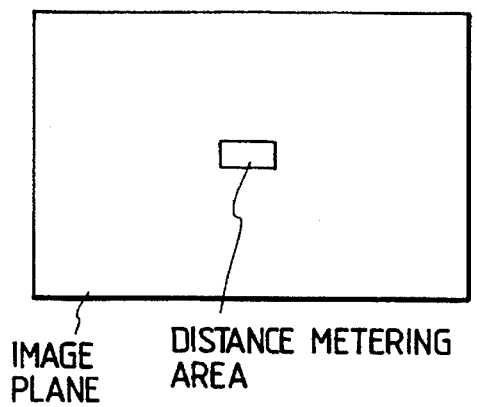
FIGS. 39A, 39B and 39C are views showing selection of focus detecting areas displayed in the image field.
Figure 39B:
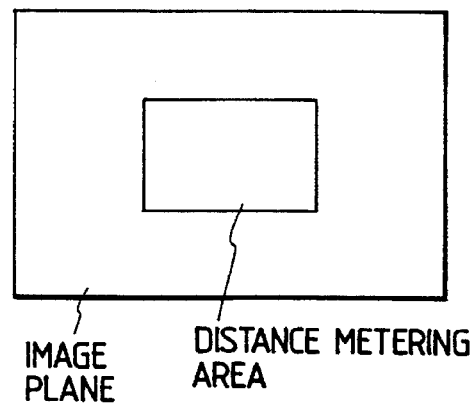
Figure 39C:
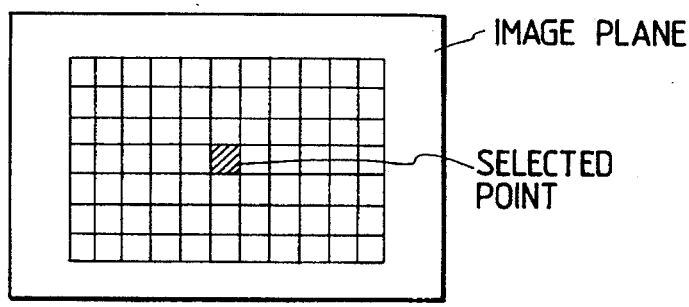

The display device 92 may also be turned on or off in relation to the operation of other devices. For example, the display device 92 is automatically turned off when the manual mode is selected by the focus mode selecting device 63. In this manner the photographer can turn off the display if it is unnecessary. The display device 92 is composed of an electrooptical device and transparent electrodes, such as an electrochromic device or an electroluminescence device, positioned on a plane, conjugate with the film plane, in the view finder. For example the wide or spot focus detection area is displayed within the image field, as shown in FIGS. 39A and 39B. As explained in the foregoing, the focus detection area is selected according to the result of detection by the light amount distribution detecting device, or according to the operation of the AF area selecting device 66 or other operating devices. Also in case plural focus detection areas are set within the image field by the AF area selecting device 66 or the view point detecting device 68, the areas finally selected by the AF calculating CPU 40 are displayed as shown in FIG. 40C.

The focus detection states (in-focus or out-of-focus) are displayed as shown in FIGS. 40A to 40F. In an embodiment shown in FIG. 40A, the frame alone of the distance measuring area is displayed in the out-of-focus state, and in the in-focus state, the interior of said frame is changed to semi-transparent to indicate the in-focus state. As variations of said display, the color of the interior may be changed between the in-focus and out-of-focus states, or may be changed according to the direction of defocus in the out-of-focus state. In an embodiment shown in FIG. 40B, the frame of the distance measuring area is displayed thinner and thickers, respectively in the out-of-focus state and in the in-focus state. As variations of said display, the color of said frame may be changed between the in-focus and out-offocus states, or may be change according to the direction of defocus in the out-of-focus state. In an embodiment shown in FIG. 40C, said frame is displayed in broken lines or solid lines respectively in the out-of-focus and in-focus states. In FIG. 40D, said frame is displayed in a form of parentheses or a rectangular form, respectively in the out-of-focus and in-focus states. In FIG. 40E, said frame is displayed only in the out-of-focus state, and is not displayed in the in-focus state. This mode of display improves the convenience of operation, since the focus detection area is displayed only when the object is to be selected, and the image field becomes easier to watch after the in-focus state is reached, by the disappearance of the frame. In case of FIG. 40F, in the out-of-focus state, a part of the rectangular frame is cut off, and the amount and direction of defocus are indicated by the position of said cut-off portion. In the in-focus state the rectangular frame is displayed entirely. The display of focus detection information in the image field as explained above allows the photographer to constantly watch the object, without the necessity of looking at another display outside the image field, so that the photographer can confirm the focus detection information while tracking even a moving object.

In case the display device 92 is provided on the screen 23, while the light metering sensor 86 is positioned in the view finder and measures the light transmitted by said screen 23, the light metering may be affected by the function state of the display device 92. For avoiding such influence, the functions of said display device 92 and said sensor alternated on time-sharing basis. The period of said alternation is selected as 100 ms or shorter, in consideration of human visual characteristics, so that the display does not appear flickering.

Figure 41:
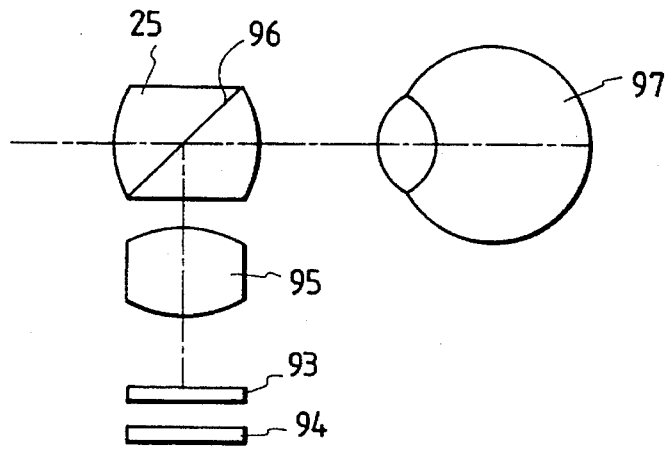
FIG. 41 is a view showing the structure of a display device.

Also the display device 92 may be constructed as shown in FIG. 41, in order to avoid the influence of the display on the light metering sensor. In FIG. 41, a display device 93, illuminated by an illuminating device 94, is projected to an eye 97 of the observer through a lens 95, and a half mirror 96 provided in the eyepiece lens 25. The shapes and positions of said optical components are so selected that the display face of the display device 93 overlaps with the image field of the view finder. In the displays shown in FIGS. 40A to 40F, the display face is positioned substantially conjugate with the surface of the screen in order to display the focus detection area, but, if an in-focus display alone is required, the optical system may be simplified without said conjugate relationship and may be so constructed as to project the light for example of a light-emitting diode toward the eye of the observer. Such structure also saves the space in the view finder.

Figure 42:
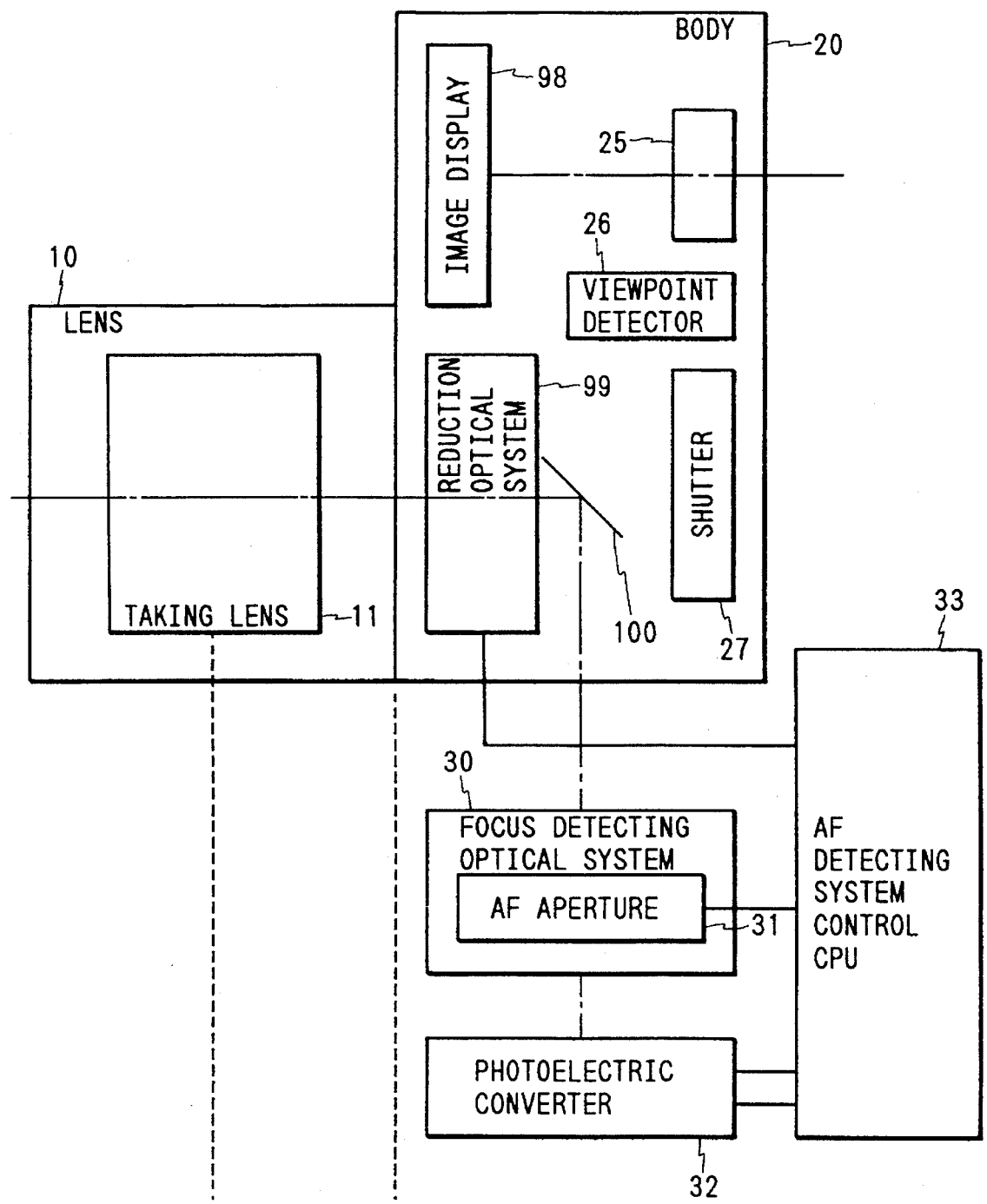
FIG. 42 is a view showing the structure of a focus detecting device employing an image display device.

The structure shown in FIG. 26 is designed to observe an optical object image in the view finder, but a structure for observing an object image displayed by a display device 98 based on electrical signals, as shown in FIG. 42, allows the synthesis of the object image and the AF information relatively easily.

Referring to FIG. 42, in a state where the lens 10 is mounted on the camera body 20, a light beam from the object is transmitted by the phototaking lens 11 and a reduction optical system 99 insertable into the optical path in the camera body 20, then reflected by a mirror 100 and guided, as a light beam for focus detection and observation, to the aforementioned focus detecting optical system 30. Said reduction optical system 99 is provided to reduce the image size, after passing the focus detecting optical system 30, to the photosensor area of the two-dimensional photoelectric converting device 32 for auto focusing, and is retracted, together with the mirror 100, from the light path by the AF detection system control CPU 33, at the exposure of the film. The image data of plural pairs obtained in the photoelectric converting device 32 are stored in the memory 34, then read by the image display control CPU 90, and, after the synthesis of AF information by said CPU 90, displayed on the image display device 98 for observation through the eyepiece lens 25. For example the focus detecting optical system shown in FIG. 16 provides a pair of two-dimensional image data, but the displayed data may be either of said pair, or synthesized from both of said pair, or switched between both of said pair. Display with either of said paired data facilitates observation of the object because the image is not blurred much even in the out-of-focus state, but display with synthesized data is convenient for confirming the state of image blur because the state of blur is close to that in the actual photograph. Also the image magnification on the display device 98 can be varied by moving a part of the reduction optical system 99 under the control of the AF detection system control CPU 33, and such performance is convenient for focus detection or observation of an enlarged part of the object without change in the phototaking optical system 11.

In the foregoing embodiment, the display device 98 is incorporated in the camera body 20. In the following there will be explained an embodiment for image display outside the body, with reference to FIG. 43.

Figure 43:
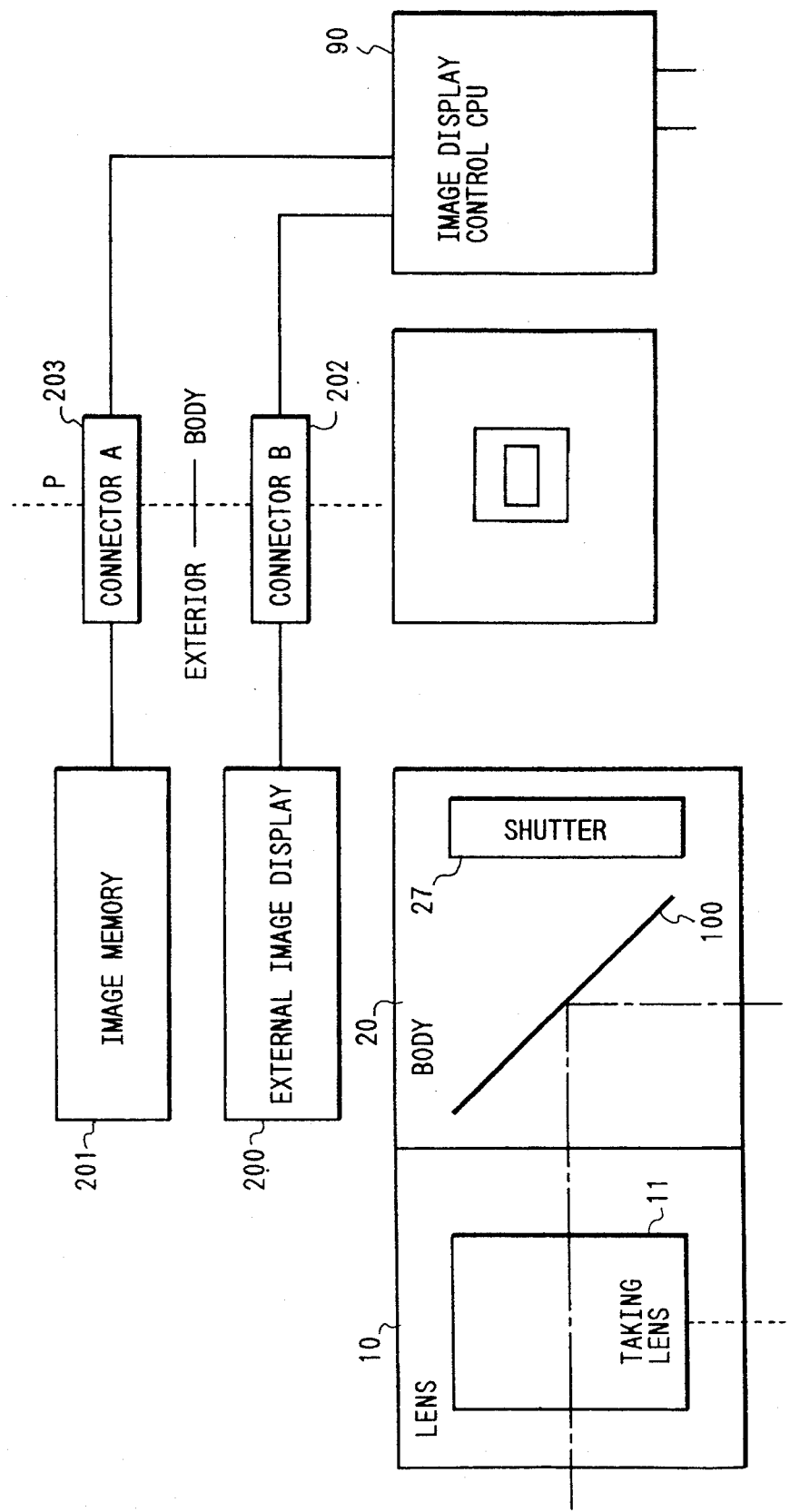
FIG. 43 is a view showing an embodiment of image display outside the camera body

In FIG. 43, image data synthesized from the object image data and the AF display information in the image display control CPU 90 are displayed, through a coupling device B202 for connecting the body 20 with an external device, on an external image display device 200 such as a liquid crystal display. Said coupling device B202 may be with wires or wireless. Such structure allows to observe the object image and the AF state without the camera body 20 at hand, and therefore expands the photographing situations in combination with an unrepresented remote control unit. Also the object image data fetched by the image display control CPU 90 may be stored in an external image memory device 201 such as a memory card, through a coupling device A203 for coupling the body 20 with an external device.

In the above-explained structures, as the image data used for observation or storage are same as those for split-pupil focus detection obtained by the auto focusing photoelectric converter, a same photoelectric converting device can be used for both purposes. Thus such structures are very advantageous in cost and in space.

Also in the focus detecting device shown in FIG. 26, the presence of AF detection system control CPU 33, AF calculating CPU 40, lens drive control CPU 50 and image display control CPU 90 in independent manner allows to execute the control of the photoelectric converting device, focus detecting calculation, lens drive control and display control in mutually overlapping manner in time, thereby improving the response of the focus detecting operation.

In the following explained is another embodiment of the focus detecting device, with a modified focus detecting optical system.

Figure 44:
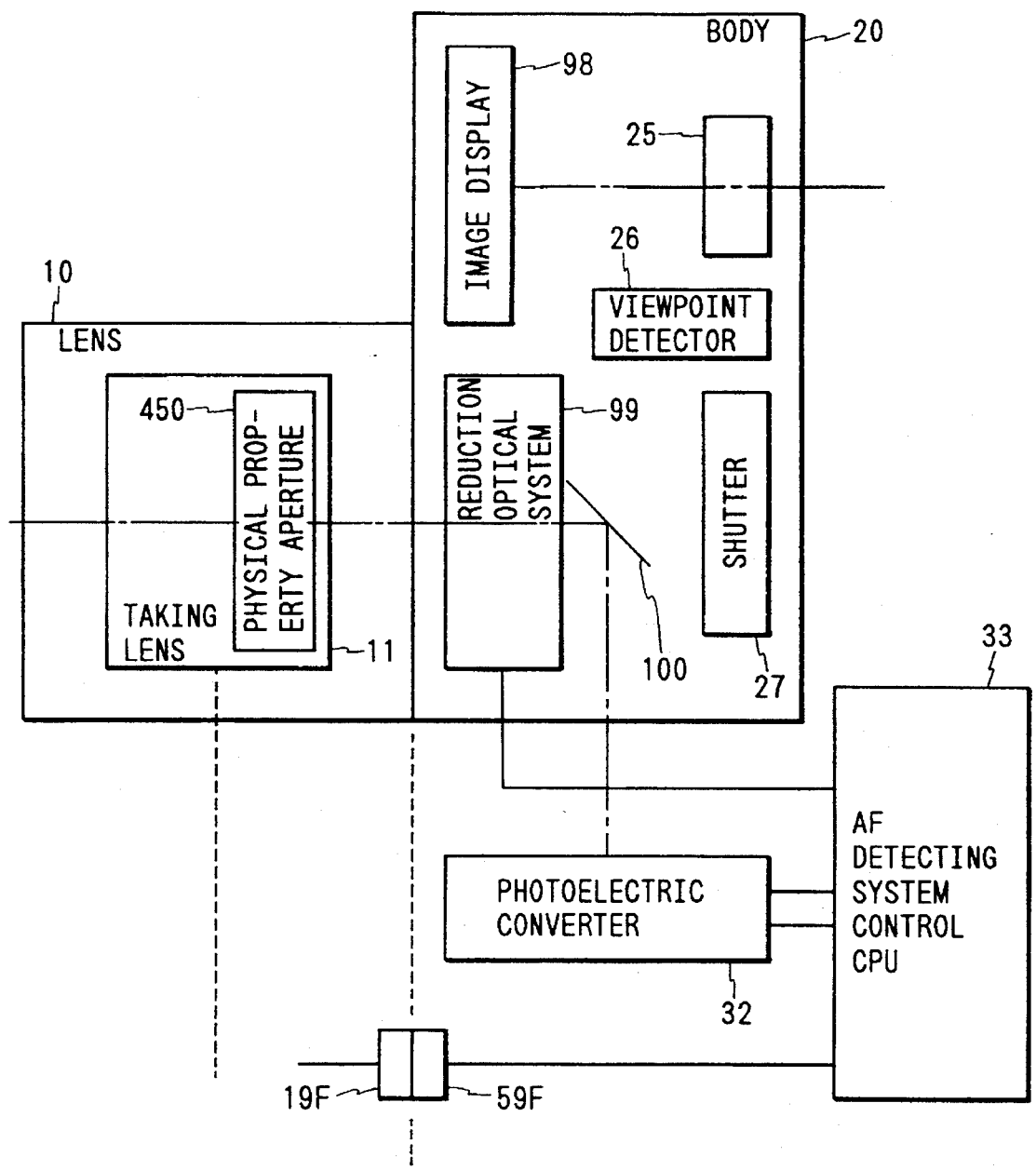
FIG. 44 is a block diagram of another embodiment of the focus detecting device of the present invention.

FIG. 44 is a block diagram of a focus detecting device employing, as the split-pupil focus detecting optical system, an optical system in which a physical diaphragm 450 composed of an electrooptical device such as an electrochromic device in the light path of the phototaking optical system 11, thereby effecting mechanical pupil splitting in front of the primary image plane without the refocusing in the optical system in FIG. 1, wherein same components as those in FIG. 26 are omitted for the purpose of simplicity.

FIG. 45 is a perspective view of said focus detecting optical system alone, wherein a physical diaphragm 450 forms focus detecting pupils 305A, 305B, and light beams passing through said pupils are transmitted by a reduction optical system 99 and form object images on a photoelectric converting device 32, having a two-dimensional photosensor area 304D positioned equivalent to the film plane. In such optical system, the pupils 305A, 305B are alternately switched on time-divided basis by the physical diaphragm 450, and a pair of image signals obtained from the photoelectric converting device 32 respectively corresponding to thus switched pupils 305A, 305B are subjected to the focus detecting calculation in a similar manner as explained in the foregoing, thereby determining the defocus amount of the phototaking lens 11.

Referring to FIG. 44, in a state where the lens 10 is mounted on the camera body 20, a light beam from the object is transmitted by a physical diaphragm 450 provided in the phototaking lens 11 and a reduction optical system 99 insertable into the optical path in the camera body 20, then reflected by a mirror 100 and guided, as a light beam for focus detection, to a photoelectric converting device 32 positioned on a plane conjugate with the film plane. Said physical diaphragm 450 is provided for switching the focus detecting pupils on time-divided basis, and is so constructed as to switch the form of aperture as shown in FIGS. 46A and 46B on time-divided basis and to function as an ordinary phototaking diaphragm with a selected aperture value at the exposure to the film, under the control of the AF detection system controlling CPU 33 through a lens contact 19F and a body contact 59F provided in the mounting portion of the camera body 20 and the lens 10. Also the information on the form and position of the focus detecting pupils 305A, 305B of the physical diaphragm 450 at the auto focusing operation is transmitted from the lens CPU 12 to the camera body 20, for use in the detection of vignetting or in the focus detecting calculation. The reduction optical system 99 is provided for matching the image size with the size of the two-dimensional photosensor area of the photoelectric converting device 32 for auto focusing, and, is retracted, together with the mirror 100, from the optical path at the exposure to the film, under the control by the AF detection system controlling CPU 33. It is to be noted that said reduction optical system 99 is not an essential component.

The photosensor area 304D of the photoelectric converting device 32 is constructed, for example, as shown in FIG. 47A.

Referring to FIGS. 47A to 47E, charges generated in a photoelectric converting element array 500, composed for example of photodiodes, are temporarily stored, through gates 501, 502, in charge accumulating element array 503, 504, then transferred through gates 505, 506 to charge transfer units 507 composed for example of CCD's, and are released from the device 32 by the function of said charge transfer units 507.

In the following there will be explained the function of the focus detecting device shown in FIG. 47A, employing the photoelectric converting device 32 of a structure shown in FIG. 44, with reference to timing charts shown in FIGS. 48A to 48C and potential charts in FIGS. 47B to 47E, illustrating the potential structure of the photoelectric converting device 32.

In the processing of paired image signals obtained from the photoelectric converting device 32 in synchronization with the switching of the focus detecting pupils 305A, 305B controlled on time-divided basis by the physical diaphragm 450, a pair only of said image signals may result in an error in the focus detection for an object changing in time, such as a moving object, because such paired image signals are not obtained simultaneously. However, the simultaneous character of such paired image signals can be improved by inserting, during the charge accumulating time of the photoelectric converting device 32 shown in FIG. 48C, plural phases P1 and P2 alternately as shown in FIGS. 48A and 48B. During the phases P1 shown in FIG. 48A, the focus detecting pupil 305A is selected by the physical diaphragm 450 as shown in FIG. 46A and the potential of the gate 501 is lowered as shown in FIG. 47B to accumulate the charges generated in the photoelectric converting element array 500 in the charge accumulating array 503. In this state the potentials of the gates 502, 505 and 506 are selected high. Also during the phases P2 shown in FIG. 48B, the focus detecting pupil 305B is selected by the physical diaphragm 450 as shown in FIG. 46B and the potential of the gate 502 is lowered as shown in FIG. 47C to accumulate the charges generated in the array 500 in the charge accumulating array 504. In this state the potentials of the gates 503, 505 and 506 are selected high.

After repeating the phases P1 and P2 plural times, the charge accumulation is terminated and charge reading phases P3 and P4 are initiated. During said phase P3, the potential of the gate 505 is lowered to transfer the charges accumulated in the charge accumulating element array 507 to the charge transfer unit 507 in parallel manner. Subsequently the charges are transferred to the exterior by the function of said charge transfer unit 507. The phase P4 is initiated when the phase P3 is terminated by the completion of transfer of all the charges, accumulated in the array 503, by the function of the charge transfer unit 507. In the phase P4, the potential of the gate 506 is lowered to transfer the charges accumulated in the charge accumulating element array 504 to the charge transfer unit 507 in parallel manner. Subsequently the charges are transferred to the exterior by the function of said charge transfer unit 50 7. An accumulation-readout cycle is completed by the termination of the phase P4, upon completion of transfer of all the charges, accumulated in the array 504, by the function of the charge transfer unit 507.

The high-speed switching of the pupils 305A, 305B by the physical diaphragm 450 and of the gates of the photoelectric converting device 32 in the course of the accumulating time inevitably generates crosstalks (leakage of light beam or charge) between the image signals. Based on the ideal paired image signals f(x, y), g(x, y) free of such crosstalk, the paired image signals F(x, y), G(x, y) involving such crosstalks can be represented by the equations (17):

$$F(x, y)=a \times f(x, y)+b \times g(x, y)$$

$$G(x, y)=b \times f(x, y)+a \times g(x, y) \quad (17)$$

wherein a and b are constants and can be known by measurements in advance. Consequently, by modifying the equations (17), there can be determined the image signals f(x, y), g(x, y) free of crosstalks according to the equation (18):

$$f(x, y)=\{b \times F(x, y)-a \times G(x, y)\}/(b-a)$$

$$g(x, y)=\{a \times F(x, y)-b \times G(x, y)\}/(a-b) \quad (18)$$

The focus detecting calculation can be conducted in the same manner as explained in the foregoing, based on thus obtained paired image signal free from crosstalks.

As explained in the foregoing, the focus detecting device shown in FIG. 44, employing a split-pupil optical system without reimaging as the focus detecting optical system, does not require a space in the camera body for focus detection, thereby allowing the compactization of the camera body and the cost reduction. Also the space in the lens can be saved as the physical diaphragm is used both for the AF diaphragm and the phototaking diaphragm.

As explained in the foregoing, the focus detecting device of the present invention is capable appropriately processing the object image signals based on the shape and position of the diaphragms in and the loss in peripheral light amounts in the phototaking optical system and in the focus detecting optical system, thereby, for example, limiting the area of or correcting the image signal to be employed in the focus detecting calculation, whereby the focus detection can be achieved without undesirable influence even if the peripheral light amount is significantly lowered to a level that would normally affect the focus detecting operation.

TABLE 1

AF Area Selection

| AF Area | Algorithm |
|---|---|
| Viewpoint Detection | Average Priority |
| Center Spot | Center Priority |
| Selected Spot | Average Priority |
| Center Spot → Wide | Minimum Focusing Priority → Present Condition Priority |
| Wide | Minimum Focusing Priority → Present Condition Priority |
| Horizontal | Minimum Focusing Priority → Present Condition Priority |
| Vertical | Minimum Focusing Priority |

TABLE 2

Af Object Selection

| AF Area | Algorithm |
|---|---|
| Center Spot | Center Priority |
| Center Spot | Minimum Focusing Priority |
| Center Spot → Wide | Center Priority → Present Condition Priority |
| Wide | Minimum Focusing Priority → Present Condition Priority |
| Wide | Average Priority |
| Wide | Maximum Focusing Priority |

TABLE 3

Light Metering Mode

| Mode | AF Area | Algorithm |
|---|---|---|
| Center Spot | Center Spot | Center Priority |
| Selected Spot | Selected Spot | Minimum Focusing Priority |
| Partial | Center Spot → Wide | Center Priority → Present Condition Priority |
| Center Weighted | Center Spot → Wide | Center Priority → Present Condition Priority |
| Multi | Wide | Minimum Focusing Priority → Present Condition Priority |

TABLE 4

AE Mode

| Mode | AF Area | Algorithm |
|---|---|---|
| Aperture Priority | Center Spot → Wide | Center Priority → Present Condition Priority |
| Shutter Speed Priority | Wide | Minimum Focusing Priority |
| Programmed | Wide | Minimum Focusing Priority → Present Condition Priority |

TABLE 5

Film Winding Mode

| Mode | AF Area | Algorithm |
|---|---|---|
| Single Frame | Center Spot | Center Priority |
| Continuous High Speed | Wide | Minimum Focusing Priority → Present Condition Priority |
| Continuous Low Speed | Center Spot → Wide | Minimum Focusing Priority → Present Condition Priority |
| Self-Timer | Wide | Minimum Focusing Priority |

TABLE 6

Photographing Mode

| Mode | AF Area | Algorithm |
|---|---|---|
| Sports | Wide | Minimum Focusing Priority Present Condition Priority |
| Portrait | Center Spot | Minimum Focusing Priority |
| Snap | Wide | Minimum Focusing Priority Present Condition Priority |
| Landscape | Center Spot | Center Priority |
| Close-Up | Center Spot | Center Priority |

TABLE 7

Focus Mode

| Mode | AF Area | Algorithm |
|---|---|---|
| Single | Center Spot | Center Priority |
| Continuous | Wide | Minimum Focusing Priority → Present Condition Priority |
| Focus Tracking | Center Spot → Wide | Minimum Focusing Priority |
| Power Focus | Wide | Minimum Focusing Priority → Present Condition Priority |
| Manual | Center Spot | Center Priority |

TABLE 8

Passing Time After Lightly Pressing ON

| Passing Time | AF Area | Algorithm |
|---|---|---|
| T < T1 | Center Spot | Minimum Focusing Priority |
| T1 ≦ T | Wide | Present Condition Priority |

TABLE 9

| Film-to-Object Distance Information | | |
|---|---|---|
| Film-to-Object Distance | AF Area | Algorithm |
| Short Distance | Center Spot | Center Priority |
| Middle | Center Spot → Wide | Center Priority → Present Condition Priority |
| Long Distance | Wide | Minimum Focusing Priority → Present Condition Priority |

TABLE 10

| Magnification Information | | |
|---|---|---|
| Magnification | AF Area | Algorithm |
| Large | Center Spot | Center Priority |
| Middle | Center Spot → Wide | Center Priority → Present Condition Priority |
| Small | Wide | Minimum Focusing Priority → Present Condition Priority |

TABLE 11

| Focal Length Information | | |
|---|---|---|
| Focal Length | AF Area | Algorithm |
| Macro | Center Spot | Center Priority |
| Short | Wide | Minimum Focusing Priority → Present Condition Priority |
| Long | Center Spot → Wide | Center Priority → Present Condition Priority |

TABLE 12

| Aperture Value | AF Area | Algorithm |
|---|---|---|
| Small | Center Spot | Center Priority |
| Large | Wide | Average Priority |

TABLE 13

| Shutter Speed Information | | |
|---|---|---|
| Shutter Speed | AF Area | Algorithm |
| High Speed | Wide | Minimum Focusing Priority → Present Condition Priority |
| Low Speed | Center Spot | Center Priority → Present Condition Priority |

TABLE 14

| Luminance Information | | |
|---|---|---|
| Luminance | AF Area | Algorithm |
| High Luminance | Center Spot | Center Priority |
| Low Luminance | Wide | Minimum Focusing Priority |

TABLE 15

| Electronic Flash Information | | |
|---|---|---|
| Electronic Flash | AF Area | Algorithm |
| Emission | Wide | Minimum Focusing Priority |

TABLE 15-continued

| Electronic Flash Information | | |
|---|---|---|
| Electronic Flash | AF Area | Algorithm |
| No Emission | Center Spot | Center Priority |

TABLE 16

| Aberration Information | | |
|---|---|---|
| Difference Between Axial and Peripheral | AF Area | Algorithm |
| Large | Center Spot | Center Priority |
| Small | Wide | Minimum Focusing Priority → Present Condition Priority |

TABLE 17

| Body Position Information | | |
|---|---|---|
| Vertical Position/ Horizontal Position | AF Area | Algorithm |
| Vertical Position | Vertical | Minimum Focusing Priority |
| Horizontal Position | Horizontal | Minimum Focusing Priority → Present Condition Priority |

TABLE 18

| Object Pattern Information | | |
|---|---|---|
| Contrast | AF Area | Algorithm |
| High | Center Spot | Center Priority |
| Low | Wide | Minimum Focusing Priority → Present Condition Priority |

TABLE 19

| Defocus Information | | |
|---|---|---|
| Defocus | AF Area | Algorithm |
| Small | Center Spot | Present Condition Priority |
| Large | Wide | Minimum Focusing Priority |

TABLE 20

| AF Area Selection | |
|---|---|
| AF Area | Focus Mode |
| Viewpoint Detection | Continuous |
| Center Spot | Single |
| Selected Spot | Single |
| Center Spot → Wide | Focus Tracking |
| Wide | Continuous |

TABLE 21

| AF Object Selection | |
|---|---|
| Algorithm | Focus Mode |
| Center Priority | Single |
| Minimum Focusing Priority | Focus Tracking |

TABLE 21-continued

AF Object Selection

| Algorithm | Focus Mode |
|---|---|
| Center Priority → Present Condition Priority | Continuous |
| Minimum Focusing Priority → Present Condition Priority | Continuous |
| Average Priority | Continuous |
| Maximum Focusing Priority | Single |

TABLE 22

Light Metering Mode

| Mode | Algorithm |
|---|---|
| Centre Spot | Single |
| Selected Spot | Single |
| Partial | Continuous |
| Centre Weighted | Continuous |
| Multi | Focus Tracking |

TABLE 23

AE Mode

| Mode | Focus Mode |
|---|---|
| Aperture Priority | Single |
| Shutter Speed Priority | Focus Tracking |
| Programmed | Continuous |

TABLE 24

Film Winding Mode

| Mode | Focus Mode |
|---|---|
| Single | Single |
| Continuous High Speed | Focus Tracking |
| Continuous Low Speed | Focus Tracking |
| Self-Timer | Continuous |

TABLE 25

Photographing Mode

| Mode | Focus Mode |
|---|---|
| Sports | Focus tracking |
| Portrait | Single |
| Snap | Continuous |
| Landscape | Single |
| Close-up | Continuous |

TABLE 26

Passing Time After Lightly Pressing ON

| Passing Time T | Focus Mode |
|---|---|
| T < T1 | Continuous/Focus Tracking |
| T1 ≦ T | Single |

TABLE 27

Film-to-Object Distance Information

| Film-To-Object Distance | Focus Mode |
|---|---|
| Short Distance | Single |
| Middle | Continuous |
| Long Distance | Focus Tracking |

TABLE 28

Magnification Information

| Magnification | Focus Mode |
|---|---|
| Large | Single |
| Middle | Continuous |
| Small | Focus Tracking |

TABLE 29

Focal Length Information

| Focal Length | Focus Mode |
|---|---|
| Macro | Manual/PF |
| Short | Single |
| Long | Continuous/Focus Tracking |

TABLE 30

Aperture Value Information

| Aperture Value | Focus Mode |
|---|---|
| Small | Single |
| Large | Continuous/Focus Tracking |

TABLE 31

Shutter Speed Information

| Shutter Speed | Focus Mode |
|---|---|
| High Speed | Continuous/Focus tracking |
| Low Speed | Single |

TABLE 32

Luminance Information

| Luminance | Focus Mode |
|---|---|
| High Luminance | Continuous/Focus Tracking |
| Low Luminance | Single |

TABLE 33

| Electronic Flash Information | |
|---|---|
| Electronic Flash | Focus Mode |
| Emission | Single |
| No Emission | Continuous/Focus Tracking |

TABLE 34

| Aberration Information | |
|---|---|
| Differnece Between Axial And Peripheral | Focus Mode |
| Large | Manual/PF |
| Small | Continuous/Focus Tracking |

TABLE 35

| In-Focus Information | |
|---|---|
| In-Focus | Focus Mode |
| During Out of Focus | Single |
| After In-Focus | Manual/PF |

TABLE 36

| Detection Propriety Information | |
|---|---|
| Propriety | Focus Mode |
| Possible | Single/Continuous |
| Impossible | Manual/PF |

TABLE 37

| Object Pattern Information | |
|---|---|
| Contrast | Focus Mode |
| High | Continuous/Focus Tracking |
| Low | Single |

TABLE 38

| Defocus Information | |
|---|---|
| Defocus | Focus Mode |
| Small | Single |
| Large | Continuous |

I claim:

1. A focus detecting device comprising:

a phototaking optical system;

a split-pupil device which switches light beams passing through different areas of an exit pupil of said phototaking optical system on time-divided basis to form two images of an object on time-divided basis;

a sensor of a charge accumulating type for photoelectric-converting each image of said object to generate an image signal;

an accumulation controlling device which controls a charge accumulating operation of said sensor, said accumulation controlling device making said sensor effect alternately the charge accumulation operation in relation to each image of the object synchronized with the split-pupil device; and a focus detecting device which detects a focus condition of said phototaking optical system based on two image signals generated by alternately effecting charge accumulation plural times.

2. A focus detecting device according to claim 1, said sensor having two accumulating portions for accumulating a charge in accordance with each of two images of the object; and said accumulation controlling device making said sensor effect charge accumulation for a charge accumulating time in accordance with a brightness of the object for each image of the object and dividing said charge accumulating time into plural periods making said sensor effect alternately the charge accumulating operation in relation to each image of the object synchronized with the split-pupil device, so as to accumulate alternately a charge in said two accumulating portions.

3. A focus detecting apparatus comprising:

a photographic optical system which forms an object image on an image field;

a charge accumulation type sensor arranged on a plane in the vicinity of said image field for photoelectric-converting said object image to generate an image signal;

an aperture device which alternatively passes light through a first area of an exit pupil of said photographic optical system or light through a second area different from said first area of an exit pupil of said photographic optical system a plurality of times; and a focus detecting device which detects a focus condition of said photographic optical system based on a first image signal obtained from said sensor while the light is passed through said first area and a second image signal obtained from said sensor while the light is passed through said second area.

4. A focus detecting apparatus comprising:

a photographic optical system which forms an object image on an image field;

a charge accumulation type sensor arranged on a plane in the vicinity of said image field for photoelectric-converting said object image to generate an image signal;

an aperture device which alternatively passes light through a first area of an exit pupil of said photographic optical system or light through a second area different from said first area of an exit pupil of said photographic optical system;

a compensating device which compensates a first image signal obtained from said sensor while the light is passed through said first area and a second image signal obtained from said sensor while the light is passed through said second area, so that a cross-talk component included in said first image signal and said second image signal is discriminated; and a focus detecting device which detects a focus condition of said photographic optical system based on said first image signal compensated by said compensating device and said second image signal compensated by said compensating device.

* * * * *